(12) United States Patent
Studor et al.

(10) Patent No.: US 8,515,574 B2
(45) Date of Patent: Aug. 20, 2013

(54) SYSTEM AND METHOD FOR MANAGING THE GENERATION OF BREWED BEVERAGES USING SHARED RESOURCES

(75) Inventors: Charles F. Studor, Austin, TX (US); J. Kevin Nater, Austin, TX (US); Marwan M Hassoun, Austin, TX (US)

(73) Assignee: Briggo, Inc., Austin, TX (US)

( * ) Notice: Subject to any disclaimer, the term of this patent is extended or adjusted under 35 U.S.C. 154(b) by 0 days.

(21) Appl. No.: 13/359,063

(22) Filed: Jan. 26, 2012

(65) Prior Publication Data
US 2012/0156344 A1 Jun. 21, 2012

Related U.S. Application Data

(63) Continuation of application No. 13/328,571, filed on Dec. 16, 2011.

(60) Provisional application No. 61/423,593, filed on Dec. 16, 2010.

(51) Int. Cl.
| | |
|---|---|
| *G06F 17/00* | (2006.01) |
| *G05B 15/00* | (2006.01) |
| *G05B 19/00* | (2006.01) |
| *G05B 21/00* | (2006.01) |
| *G06Q 20/00* | (2012.01) |
| *A47J 31/40* | (2006.01) |
| *A23F 5/00* | (2006.01) |

(52) U.S. Cl.
USPC ............. 700/231; 700/239; 700/266; 705/16; 99/280; 426/433

(58) Field of Classification Search
None
See application file for complete search history.

(56) References Cited

U.S. PATENT DOCUMENTS

| | | | |
|---|---|---|---|
| 2,814,317 | A | 11/1957 | Gale |
| 4,628,974 | A | 12/1986 | Meyer |
| 5,000,345 | A | 3/1991 | Brogna et al. |
| 5,727,609 | A | 3/1998 | Knight et al. |
| 6,053,359 | A | 4/2000 | Goulet et al. |
| 6,135,169 | A | 10/2000 | Sandei et al. |
| 6,158,328 | A | 12/2000 | Cai |

(Continued)

FOREIGN PATENT DOCUMENTS

WO 2011116247 A2 9/2011

OTHER PUBLICATIONS

PCT/US2011/065543 International Search Report; Mailing Date: Aug. 29, 2012; 5 pages.

*Primary Examiner* — Jill Warden
*Assistant Examiner* — Charles D Hammond
(74) *Attorney, Agent, or Firm* — Reising Ethington P.C.

(57) ABSTRACT

A system that generates brewed beverages may receive requests to produce specified brewed beverages. The system may include a scheduler that initiates and controls the performance of one or more chemical or mechanical processes to produce the beverages. While one chemical or mechanical process for producing a beverage is being performed, other processes may be performed for production of the beverage or another beverage. The scheduler may determine the time at which to perform each process, the time at which a beverage should be presented, the resources to be used to perform the processes, or the time at which to perform a cleaning process, dependent on an actual or expected demand for beverages, or dependent on a target time for beverage retrieval. Shared resources may be applied to the production of beverages for high priority orders, while partially completed beverages for lower priority orders are staged for subsequent advancement.

19 Claims, 23 Drawing Sheets

(56) References Cited

U.S. PATENT DOCUMENTS

| | | |
|---|---|---|
| 6,497,343 B1 | 12/2002 | Teetsel, III |
| 6,726,947 B1 | 4/2004 | Gutwein et al. |
| 6,759,072 B1 | 7/2004 | Gutwein et al. |
| 6,786,138 B2 | 9/2004 | Johnson et al. |
| 7,401,613 B2 | 7/2008 | Carhuff et al. |
| 7,469,627 B2 | 12/2008 | Li |
| 7,487,711 B2 | 2/2009 | Carbonini |
| 7,577,498 B2 | 8/2009 | Jennings et al. |
| 7,580,859 B2 | 8/2009 | Economy et al. |
| 8,032,251 B2 | 10/2011 | Monn |
| 8,047,125 B2 | 11/2011 | Bazin et al. |
| 2003/0070555 A1 | 4/2003 | Reyhanloo |
| 2003/0236706 A1 | 12/2003 | Weiss |
| 2004/0177762 A1 | 9/2004 | Gutwein et al. |
| 2004/0197444 A1 | 10/2004 | Halliday et al. |
| 2005/0034606 A1 | 2/2005 | In Albon |
| 2005/0125317 A1 | 6/2005 | Winkelman et al. |
| 2006/0005712 A1 | 1/2006 | Greenwald et al. |
| 2006/0037353 A1 | 2/2006 | Smestad et al. |
| 2006/0149415 A1 | 7/2006 | Richards |
| 2006/0224450 A1 | 10/2006 | Moon |
| 2007/0061487 A1 | 3/2007 | Moore et al. |
| 2007/0106565 A1 | 5/2007 | Coelho |
| 2007/0215239 A1 | 9/2007 | Dorney |
| 2008/0050480 A1 | 2/2008 | Majer |
| 2008/0116262 A1 | 5/2008 | Majer |
| 2008/0201241 A1* | 8/2008 | Pecoraro ................. 705/27 |
| 2009/0095165 A1 | 4/2009 | Nosler et al. |
| 2009/0117240 A1 | 5/2009 | Crescenzi |
| 2009/0136632 A1 | 5/2009 | Gutwein et al. |
| 2009/0158937 A1* | 6/2009 | Stearns et al. ............. 99/280 |
| 2009/0202686 A1 | 8/2009 | Lavie et al. |
| 2009/0293733 A1 | 12/2009 | Martin et al. |
| 2010/0034942 A1 | 2/2010 | Illy et al. |
| 2010/0047407 A1 | 2/2010 | Carbonini |
| 2010/0198413 A1 | 8/2010 | De'Longhi |
| 2010/0198643 A1* | 8/2010 | Friedman et al. ............ 705/8 |
| 2010/0198726 A1 | 8/2010 | Doran et al. |
| 2010/0203209 A1* | 8/2010 | Fishbein et al. ........... 426/433 |
| 2010/0268378 A1 | 10/2010 | Sharpley |
| 2010/0272870 A1 | 10/2010 | Hsu et al. |
| 2011/0070349 A1 | 3/2011 | Burri et al. |
| 2012/0156337 A1 | 6/2012 | Studor et al. |
| 2012/0156339 A1 | 6/2012 | Studor et al. |
| 2012/0156343 A1 | 6/2012 | Studor et al. |

* cited by examiner

US 8,515,574 B2

SYSTEM AND METHOD FOR MANAGING THE GENERATION OF BREWED BEVERAGES USING SHARED RESOURCES

This application is a continuation of U.S. application Ser. No. 13/328,571, entitled "System and Method for Managing the Generation of Brewed Beverages Using Shared Resources," which was filed on Dec. 16, 2011, names Charles F. Studor, J. Kevin Nater, and Marwan M. Hassoun as inventors, and which claims priority to U.S. Provisional Application Ser. No. 61/423,593, entitled "Apparatus and Method for Brewed and Espresso Drink Generation", which was filed on Dec. 16, 2010, and which names Charles F. Studor, J. Kevin Nater, and Marwan Hassoun as inventors, the content of which is incorporated by reference herein in its entirety.

BACKGROUND

1. Field of the Disclosure

This disclosure relates generally to systems and methods for brewing and dispensing beverages, and more particularly to automated systems and methods for scheduling, producing, and dispensing brewed beverages using shared process modules, process profiling, customer profiling, and/or demand information.

2. Description of the Related Art

Most coffee consumed outside of the home requires either experienced baristas, or expensive automated espresso machines. Both require significant capital to equip the retail setting, as well as logistical challenges with hiring and training personnel. The resulting retail locations require ongoing operating costs that dominate the costs associated with delivering high quality coffee. Alternatively, vending machines remove much of the cost and management difficulties, but the coffee quality suffers.

SUMMARY

In various embodiments, a system that generates brewed beverages by performing one or more chemical and/or mechanical processes may receive requests to produce specified brewed beverages through any input mechanism of the system, including, but not limited to, an input device that is co-located with the process modules for producing the beverages or an interface mechanism that receives requests made through a remote communication mechanism (e.g., a web interface or smartphone application). For example, an order for one or more specified beverages may represent a single transaction that includes an expected or requested beverage pick up time, or an order for one or more specified beverages may represent a regular or standing order that includes a pre-determined schedule of two or more times at which the specified brewed beverage(s) will be retrieved. As used herein, the term "brewed beverage" may refer to any beverage produced, at least in part, by an organic extraction process (including, but not limited to, espresso, coffee, tea, or chai), and which may or may not be combined with one or more other ingredients (including, but not limited to, milk, soy milk, almond milk, flavorings, syrups, sweeteners or other additives).

In some embodiments, the system may include a master controller that initiates and controls performance of the chemical and/or mechanical processes to produce the specified brewed beverages. The master controller may adaptively apply various process accelerators (e.g., pressure, ultrasonic energy, steam, temperature, and/or the position of a vessel containing the beverage or a component thereof) during the performance of one or more of the chemical or mechanical processes to accelerate the process or to achieve a desired qualitative or quantitative characteristic for a brewed beverage or a component thereof.

In some embodiments, the adaptive application of process accelerators to one of the chemical or mechanical processes may be dependent on a multiple-variable process profile developed for the process and/or a specified beverage. A process profile may map a result of the process to the values of multiple variables (e.g., temperature, pressure, volume, or various characteristics of the input ingredients) over the time it takes to perform the process, and may be used to optimize the process to achieve a desired qualitative characteristic of the beverage or a component thereof. For example, in one embodiment the pressure in a steam wand and/or the depth of the wand may be varied during a process to froth milk in order to produce frothed milk having a desired temperature. In another example, the release of carbon dioxide from grinds may be accelerated by the application of ultrasonic energy during the espresso process, in some embodiments.

In some embodiments, while one chemical or mechanical process for producing a beverage is being performed, other chemical and/or mechanical processes may be performed for the production of one or more other beverages. In some embodiments, a master controller (or scheduler) in the system may determine the time at which to perform each of the chemical and/or mechanical processes used to produce a particular brewed beverage, the time at which a finished beverage should be presented for pick up (e.g., by a customer), and/or the resources to be used to perform the processes dependent on an actual or expected demand for beverages, and/or dependent on a requested or target time for retrieval of the beverage. For example, in some embodiments, the scheduler may speculatively and/or preemptively schedule the production of various beverages based on a customer-specific demand history or a system-specific demand history.

In some embodiments, shared resources may be applied to the production of beverages for high priority orders (e.g., orders placed at the location of the beverage generation system), while partially completed beverages for lower priority orders (e.g., remotely placed orders, standing orders, pre-orders, or speculatively placed orders) are staged for subsequent advancement through the beverage generation process.

In some embodiments, determining when to present a completed brewed beverage may include determining whether a customer on whose behalf the beverage was made is currently in the vicinity of the beverage generation system and is ready and able to retrieve the brewed beverage. If the customer is not ready or able to retrieve a completed beverage, it may be stored in a staging area that is maintained at a particular temperature until the customer is ready to retrieve it.

Figure 1:
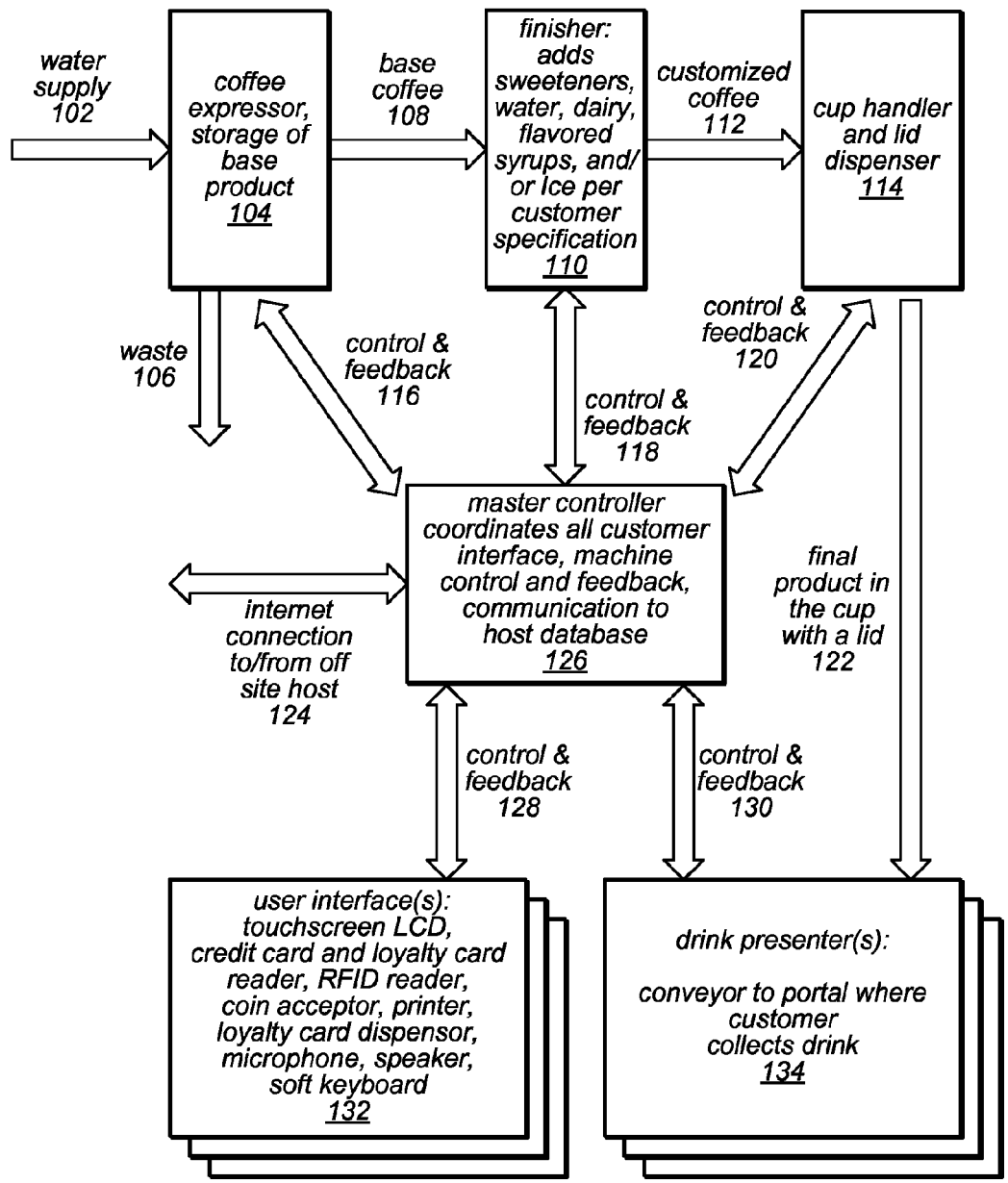
FIG. 1 illustrates a block diagram of a system for brewing and dispensing coffee, according to one embodiment.

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The system and methods described herein, and the business model they suggest, may reduce the capital requirements and operating costs, yet produce a quality of coffee that rivals custom coffee shops. This may enable rapid scaling of the operation to many locations with minimal capital and employees.

This system described herein may in some embodiments be implemented as a fully automated kiosk used to serve brewed beverages (e.g., hot or cold brewed beverages), one of which may be coffee. The system may reduce the fixed overhead associated with serving high quality beverages as well as the capital required to create a point of sale (POS) or kiosk unit. The system and methods described herein may create a high quality coffee drink while eliminating the need for expert barristers, and may maximize the intervals between services by a technician. Various factors affecting the quality of hot beverages include consistency in the brew cycle, consistency in water temperature, the final service temperature, the rate at which the water passes through the coffee grounds, and the multi-stage filtering process.

The rate at which the water flows through the grounds is closely tied to the filter system. If the water remains in contact with the grounds for too long a time, it becomes bitter. If it passes too quickly through the grounds, it lacks robust flavor. In addition, a filter that allows the water to pass quickly also allows fine grounds to pass through the filter into the final product. Those grounds continue to "brew" in the finished product, releasing compounds that turn the coffee bitter over time. Paper filters that catch the fine grounds often cause the water to remain in contact with the coffee for too long, causing bitter flavors. In some cases, paper filters can themselves add unwanted flavors, or can trap or filter out some of the flavorful oils that otherwise produce a quality "mouth feel" in the final product. Paper filters also present maintenance challenges and costs related to the material and replacement labor. Metal gold filters alone provide good water flow, but they allow fine grounds to remain with the final coffee product and may turn the coffee bitter and/or gritty when consumed. The system and methods described herein for generating brewed beverages may reduce or eliminate any adverse effects on the taste of the beverages that are introduced by these and other commonly used filters.

The systems described herein for brewing and dispensing coffee and/or other beverages may use customer profiling to select beverages to be produced and presented to the customer and/or messages to be displayed to the customer, based on stored customer-specific information. The systems for brewing and dispensing coffee may include a user interface mechanism that receives input identifying a given customer. The systems may include a controller that selects one of a plurality of standard or custom drink recipes dependent on the identity of the given customer, and initiates production of a brewed beverage using the selected drink recipe, in some embodiments. For example, the input identifying the given customer may be received from a card reader, a radio frequency identification reader, a video capture device, a microphone, a keyboard, a soft keyboard, or a touch screen, in various embodiments. Each standard or custom drink recipe may specify an amount of two or more ingredients in a respective brewed beverage (e.g., water, coffee grounds, flavorings, dairy products, etc.)

In selecting the drink recipe, the controller may be configured to access information indicating one or more drink preferences of the given customer from a data structure that stores customer-specific information. In some embodiments, the data structure may be stored on a loyalty card, debit card, or gift card and may be accessed using the user interface mechanism. In other embodiments, the data structure may be stored on a remote system, and the system may include an interface configured to communicate with the remote system to retrieve this and/or other customer-specific information stored in the data structure. For example, in some embodiments, the data structure may be a central database accessible to a plurality of systems for brewing and dispensing coffee, and the database may store customer-specific information for a plurality of customers. The customer-specific information may also include one or more of: a customer identifier, account information, a purchase history, one or more custom drink recipes, one or more preferred standard drink recipes, a history of received messages, or an email address. In some embodiments, the user interface mechanism may be used to display all or a portion of the customer-specific information.

In some embodiments, the controller may be configured to select one or more messages to be displayed to the given customer dependent on the identity of the given customer, and these messages may be displayed using the user interface mechanism. In some embodiments, the user interface mechanism may also display the temperature of a brewed beverage, the temperature having been determined by the controller. In some embodiments, the user interface mechanism may be configured to detect the presence of the given customer, e.g., using an RFID reader or proximity sensor. The user interface may be further configured to receive input indicating the selection of a standard drink recipe previously ordered by the given customer, a custom drink recipe previously ordered by the given customer, and/or a customization of a standard or custom drink recipe previously ordered by the given customer. A drink customization may include an ingredient to be added to the standard or custom drink recipe, an ingredient to be removed from the standard or custom drink recipe, or a change in an amount of an ingredient of the standard or custom drink recipe, in some embodiments.

One embodiment of a system for brewing and dispensing coffee is illustrated by the block diagram in FIG. 1. In some embodiments, the entire assembly may be housed in a standalone kiosk, or a walkup kiosk attached to another structure or some other housing. At a system level, various combinations of the components illustrated in FIG. 1 and other components may allow for a fully automated kiosk that goes from ground coffee or beans as an input to a fully lidded coffee cup. In other embodiments, any or all of the methods and mechanisms described here may be applied to systems located in offices that provide coffee for employees, in homes, or in other applications. They may also be applied to other applications where low overhead costs and low maintenance are priorities, but vending machine quality coffee is not sufficient.

As shown in the example illustrated in FIG. 1, the system may include a coffee expressor 104, which takes water as an input (e.g., from a water supply 102), brews coffee using any or all of the component and techniques described herein, and stores base coffee product. The water may be supplied directly from a city water supply, or it may be stored in a storage tank that is located such that gravity provides the flow of water to the expressor and/or to an initial filter stage. The system may also include a finisher 110, which takes the base coffee product 108 as an input and customizes the coffee product, such as by adding sweeteners, diary (e.g., cold or steamed/frothed milk), flavored syrups, and/or ice, per the customer's specification. The system may also include a cup handler and lid dispenser 114, which takes the customized coffee product 112 as an input and packages it as a final product in a cup with a lid 122.

Waste produced by the system (e.g., waste produced by the coffee expressor portion of the system, shown as 106 in FIG. 1) may be directed to a city waste water service, or it may go through a screen filter stage such that only the liquid waste is directed to the city waste water service and the resulting dry waste grounds are collected when the unit is serviced. Additionally, a waste tank may be employed, e.g., when city wastewater service is not available.

As shown in the example illustrated in FIG. 1, the system may include one or more user interfaces 132. For example, user interfaces 132 may include one or more of a liquid crystal display (LCD), a touch screen LCD (e.g., a 15-inch touch screen LCD), a cathode ray tube (CRT), a plasma display, or any other display/monitor device, a credit card and loyalty card reader, a radio frequency identification (RFID) reader, a coin acceptor, a printer, a loyalty card dispenser, a microphone, a speaker, a keyboard, and/or a soft keyboard). In some embodiments, an interactive display may accept customer orders, and may interact with a master controller 126, a coin/credit card acceptor, and/or a receipt printer. In some embodiments, a gift card/reward card dispenser may be included, and may be controlled by the master controller 126. In some embodiments, multiple order entry touch screens may exist on one kiosk, and/or the main extraction and storage tank may serve multiple dispensing stations within the same kiosk. Additional displays may be employed for point of sale advertising, in some embodiments.

Other embodiments may include any or all of these user interfaces or any other user interface configured to allow a customer or technician to interact with the system. For example, the customer or technician may be prompted to input data (e.g. data indicating a selection of a function, operation, or customization to be performed, or selection of a brewed beverage to be produced) by a message displayed by the user interface mechanism. As shown in this example, the system may also include a drink presenter 134, which may provide a conveyor to a portal at which the customer may retrieve the final product (e.g., a particular brewed beverage).

As shown in the example illustrated in FIG. 1, the system may include a central master controller 126, which may coordinate all customer interfaces, machine controls and feedback (e.g., control and feedback illustrated at 116, 118, 120, 128, and 130 in FIG. 1), and communication to a host server and/or database. For example, all valves, heaters, pumps, servo motors, flow control mechanisms, and/or other mechanical components of the system may controlled by the master controller, as described below. In addition, the status of any or all components of the system may be observable by a remote host through the master controller and/or an interface thereof. For example, in some embodiments, the master controller may communicate with a host server and/or database at a remote location through an Internet connection, such as that illustrated as element 124 in FIG. 1. The operations of the master controller and other components of the system are described in more detail below, according to various embodiments.

The system described herein (specifically, the coffee expressor portion of the system) may in some embodiments include a "selection box" that interrupts the flow of the extracted coffee, as described in more detail below. Such a selection box may also allow for automatic cleaning of the rotating initial filter. In some embodiments, the system may include a first stage gravity filter and a second stage gravity filter or storage tank (e.g., a storage tank that also serves as a second stage gravity filter). Additional components not illustrated in FIG. 1 may perform other functions as part of producing a brewed beverage and/or may provide final customization and delivery of the end product.

In some embodiments, the system described herein may use a three-stage filter process that allows the coffee to pass through the grounds at the appropriate rate using an initial gold metal filter. The coffee may then pass through two additional filter stages using gravity filters before the end product is customized as specified by the end customer with additional water, syrup, sweetener, ice, and/or dairy to create the final product for serving. In some embodiments, a selection box may be used to cut off the flow of coffee exiting the initial gold metal filter as the brewed or "expressed" coffee enters the first gravity filter. Once in place, the selection box may redirect the flow of coffee exiting the initial gold filter into a waste container at the moment when the water has been in contact with the grounds long enough to get the maximum yield, yet before any bitter flavors begin to be extracted. This may allow for only the least-bitter "first press" coffee to enter the first gravity filter.

In some embodiments, a selection box may also serve during the cleaning cycle of the gold filter. The sliding selection box may be thought of as having a shoe box shape, and may be made of stainless steel or other non-corrosive material, with no top and no end panels, only the long sides. With the selection box located under the gold filter, the gold filter may be rotated and water jets may be sprayed at both the interior and exterior of the filter. The used grounds may flow out of the inverted filter, onto the selection box (which may be mounted at an acute angle, such as 45°), and the grounds and cleaning water may then flow into the waste container. The gold filter may be rotated back into its original position and reloaded with grounds from a container, hopper, or a grinder. This process may be repeated multiple times to fill the current gravity filter. Once the current first gravity filter is full, a rotating funnel located below the selection box may be repositioned to the next first gravity filter. That next first gravity filter may be emptied into the storage tank, its waste discarded, and that next first filter is ready for the next express (brew) cycle.

In some embodiments, the coffee may flow from the gold filter into the first gravity filter. Once in the first gravity filter, the coffee may be allowed to rest for a predetermined amount of time (e.g., for 10 minutes or longer). The first gravity filter may be a cylindrical tube, with two valves, one located at the bottom of the tube, and another that directs coffee out of the gravity filter into a vertical tube in the storage tank. The valve may be located near the bottom of the first gravity filter, e.g., a few inches from the bottom of the first gravity filter. In some embodiments, the bottom of the gravity filter may be formed in a cone shape to direct the grounds to the lowest point in the gravity filter.

During the resting period, the fine grounds suspended in the coffee may fall out of solution and rest at the bottom of the gravity filter. The coffee may be drained out of the first gravity filter into the second gravity filter, which may also be referred to as the storage tank. The drain used in the first gravity filter that is connected to the storage tank may be located near the base of the first gravity filter, e.g., a few inches above the base of the first gravity filter. After the filtered coffee is drained into the storage tank, the remaining coffee and fine grounds in the first filter may be drained to a waste container. In some embodiments, there may be a multitude of first gravity filters. For example, in one embodiment, ten first gravity filters may be used and they may form a ring around the storage tank. In such embodiments, a selection funnel may direct the coffee out of the gold filter into one of these first gravity filters. Once one gravity filter is filled, the selection funnel may be rotated to another gravity filter. That next gravity filter may be emptied into the storage tank. With its waste discarded, it may be ready to receive another batch from the gold filter. In some embodiments, it may take on the order of one minute to process coffee through the gold filter and to perform the cleaning and reloading cycles. In this example, when the gold filter is working 100% of the time, it may be able to fill ten first gravity filters and still allow each gravity filter to have ten minutes of settling time before it is emptied into the storage tank and the waste disposed. Depending on the ratio of the volume of the first gravity filter and the volume expressed through the gold filter, multiple passes through the gold filter may be needed to fill the first gravity filter. The number of first gravity filters, setting time, and cycle time may vary, in different embodiments.

Conceptually, the same process used in the first gravity filter may be applied in a second gravity filter or storage tank. In some embodiments, the storage tank may actually provide two additional gravity filter stages: one in the entry tubes that are connected to the external first stage gravity filters, and a second one in the main body of the storage tank, where additional settling may occur. The finest of grounds may be expelled out the bottom of the storage tank, in some embodiments.

In some embodiments, both the first and second gravity filters may be maintained at a pre-determined optimum serving temperature, such as between 120° F. and 160° F. For example, in one embodiment, the temperature may be maintained by maintaining the environment surrounding the two filters at 140° F. The indirect heating process may keep the final product from ever being in contact with heating elements that could add bitterness to the end product. This may also be achieved with blanket heaters or other indirect means, in various embodiments. In some embodiments, the temperature at which the tanks are maintained may be determined and controlled in a manner such that the system provides beverages at a suitable exit temperature, i.e. one that meets both health standards and customer acceptance standards.

In some embodiments, as the coffee enters the second gravity filter or storage tank, it may enter a vertical tube. As it enters, the new coffee may expel the existing contents of the tube out of a valve or hole located near the bottom of the tube. The coffee that was in the tube may have had a second period (e.g., an additional ten minutes) to do an additional gravity filter operation. In one embodiment, there may be ten of these tubes inside the storage tank, and each one may be associated with one of ten first gravity filters. The tubes may contain a valve at the bottom that is opened to drain out waste and allow the tubes to serve as storage during low demand periods. The drain in the tube that allows the coffee to enter the storage tank may be located near the bottom of the tube. In some embodiments, the bottom of the tube may be located near the bottom of the storage tank so that the fine grounds do not get reintroduced to the body of the coffee stored in the storage tank. In some embodiments, the contents at the bottom of the tube may be expelled directly into the waste container.

In some embodiments, the finest grounds that fall out of solution may rest at the bottom of the storage tank. As noted above, the bottom of the storage tank may be formed in a conical shape, in such embodiments. At the lowest point of the cone there may be a drain valve. The drain valve may be opened periodically to allow the finest of grounds to exit the storage container, keeping them from turning the coffee in the storage tank bitter. In some embodiments, baffles may be used to minimize currents induced when releasing coffee from one gravity filter to another.

In some embodiments, the storage tank may then contain the core product that may be customized and dispensed. For example, the contents of the storage tank may be used as a base product in a way similar to the way espresso coffee is used as a base for many final products, such as Americano, cappuccino, etc. In some embodiments, a software program may be employed to analyze the amount of time that the coffee has been in the tank, along with historical demand data, to determine if and when the system should be flushed and new coffee introduced.

In some embodiments, a final customization step may be associated with the delivery of the end product. When the coffee is ready to be delivered, a valve located a few inches from the bottom of the storage tank may be opened to deliver the appropriate amount of coffee. The coffee may be delivered either directly into a coffee cup, or into a container where additional liquids such as additional hot water, hot milk, cold milk, sweeteners, or flavored syrups, or dried creamer, ice, or other items are added to customize the drink before delivery into the final cup, in various embodiments. The coffee cups may be manipulated by a cup-handling machine such as that described in expired U.S. Pat. Nos. 4,989,753 and 5,000,345, or by any other suitable standard or custom cup handling mechanism. Once the mixture is complete, lids may be applied to the cups using a lid applicator similar to that described in expired U.S. Pat. No. 4,949,526, or by any other suitable standard or custom lid applicator mechanism.

In some embodiments, the system may support the dispensing of hot milk, either as a final product or as an ingredient in another beverage. To support hot milk dispensing, cold milk may be stored in refrigerated tanks. When needed, a valve may be open, causing the milk to flow through a preheated pipe. The pipe may have an air vent at a point elevated above the valve. As the milk flows through the heated pipe, heat may be transferred to the milk. When the milk exits the pipe, it may be at the service temperature. Note that, as described in more detail below, in other embodiments the system may include one or more frothing units to provide steamed, frothed milk as an ingredient in various hot beverages.

Once the desired amount of milk is dispensed, the valve at the storage tank may be closed, the remaining milk may be drained from the heater pipe, and a second selection box (similar to the one used at the gold filter) may interrupt the flow of milk into the customer's cup. Once the flow is interrupted, a cleaning cycle may begin for the heater. During the cleaning cycle, hot water may be allowed to flow into the top of the heater pipe at a location very close to the milk valve. Water may be allowed to flow through the pipe and the waste may be directed away from the customer's cup. The water valve may be closed once the heater pipe is rinsed. After a period of time, the selection box may be moved back into its resting position and the heater pipe may be pre-heated for the next service. Note that in various embodiments, this process and equipment may be repeated/duplicated for each type of milk (e.g., whole, soy, low-fat, non-fat, etc.), or there may be multiple sources to the pipe heater, which would share one heater. Similarly, the system may include multiple instances of the frothing unit described below, some of which may be used to provide a specific type of milk (e.g., whole, soy, low-fat, non-fat, etc.), or a single frothing unit may be a shared resource usable to steam and/or froth two or more different types of milk.

In various embodiments, a master controller (which is sometimes referred to herein as a scheduler) may control all servos, actuators, valves, and various sensors of the system during production of drinks by the system. The master controller may also be configured to receive and analyze data collected by these sensors to determine the state of the machine, raw material volumes on hand, current activity, etc. This data may be periodically (or on demand) uploaded by the master controller to a host server that presents data on a multitude of machines to the operator. For example, the master controller may be configured to monitor weights in containers, monitor temperatures, control heating elements, check for faults, control a touch screen interface, and communicate through the Internet or by phone to report status and to communicate alerts to a host computer. The master controller may also be configured to accept queries from the host and/or to validates credit cards and gift cards through interaction with a host database, in some embodiments. In various embodiments, additional levels of hierarchy may be implemented such that different hosts may be configured to communicate with various subsets of all operating systems. For example, there may be one host server configured to communicate with multiple instances of the coffee brewing system in a particular region, or associated with a given operator, or having any other common attribute(s). A plurality of such host servers may be configured to communicate with a central host (e.g., a company-wide host server), in some embodiments.

Figure 2:
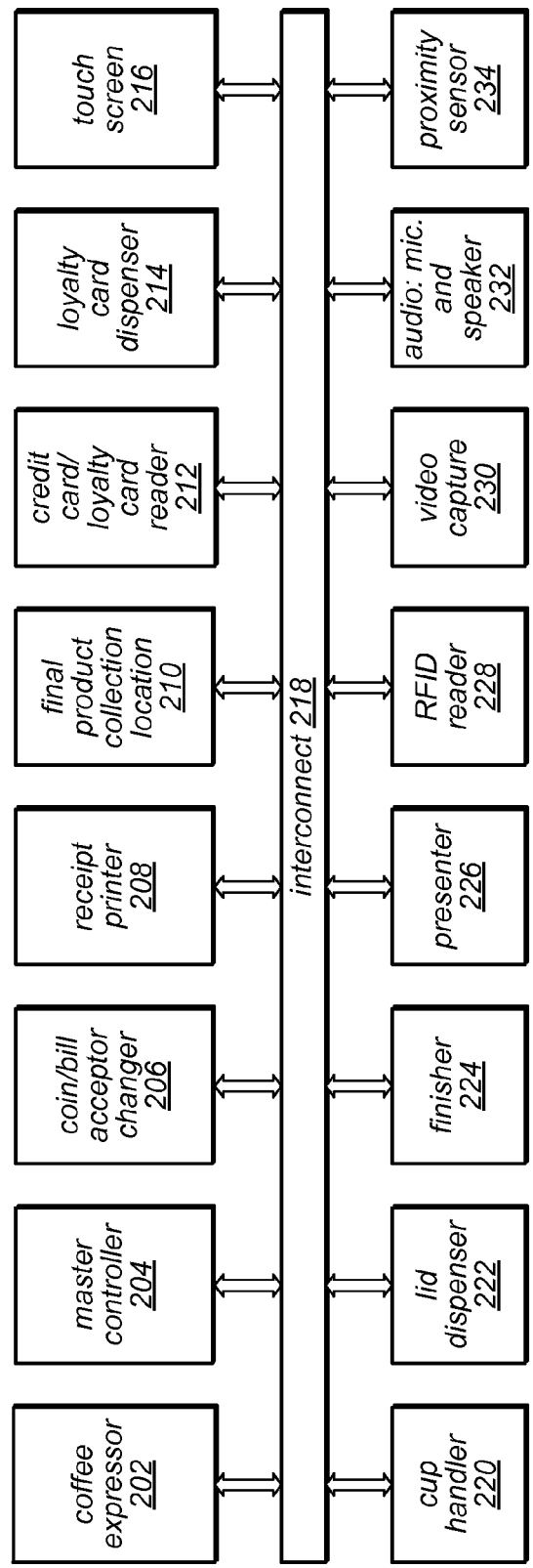
FIG. 2 illustrates various interconnected components of a system for brewing and dispensing coffee, according to one embodiment.

FIG. 2 illustrates various interconnected components of the system described herein, according to one embodiment. In this example, all of the illustrated components, many of which are described herein, are connected to a central interconnect 218 (e.g., a communication bus). It is through this interconnect that the master controller 204 may receive feedback and other inputs from the other components of the system (e.g., coffee expressor 202, cup handler 220, lid dispenser 222, finisher 224, presenter 226, and/or final product collection location 210) and may issue commands (e.g., in the form of machine instructions or signal values) to those components. In various embodiments, one or more user interfaces, such as a touch screen 216, proximity sensor 234, audio interface 232 (including a microphone and/or speaker), video capture device 230, RFID reader 228, receipt printer 208, coin/bill acceptor/changer 206, credit card/loyalty card reader 212, and/or loyalty card dispenser 214, may provide a customer interface and/or maintenance interface, as controlled by the master controller 204. While the master controller 204 is illustrated as a single component in FIG. 2, in some embodiments, the functionality of the master controller described herein may be partitioned between two or more components that together provide this functionality. For example, in some embodiments, the master controller may include a separable motor and/or valve controller that is dedicated to controlling the valves, motors, and other mechanical elements of the system. This separable component may include trim controllers, for example. Various functions of the master controller may be implemented by hardware, software, or by a combination of hardware and software, in various embodiments.

In some embodiments, the system described herein may be configured to support various business processes. For example, a customer loyalty process may be employed whereby the customer purchases a loyalty "debit card". The unique id of the debit card once inserted in the system (and read by a loyalty card reader) may be compared to a central database (e.g., on a remote host system). For example, in some embodiments, a plurality of kiosks may be configured to communicate with a central database on a remote host system and to store information in the central database and/or retrieve information from the central database to share customer profile information (e.g., customer-specific preferences and purchase histories) between the kiosks. In one embodiment, the previous "n" purchases from the debit card may be displayed with each drink's customization (i.e. drink type, quantity of syrup, sweetener type and quantity, dairy additive and quantity) and cost along with the value left on the debit card. In some embodiments, the loyalty cards may also be dispensed and/or refilled at the system and may double as gift cards. Loyalty cards may also be refilled online, in some embodiments.

In some embodiments, customers having loyalty cards may be able to share their favorite drink combination with their friends. In such embodiments, each loyalty debit card may be associated with customer identifier and/or another identifier of a user account, e.g., an email account/address. Users may be able to login into a web site hosted by the central server from home or their cell phone. From there, among other things, they may view their recent purchases, give a name to any of their recent orders, and then forward their "drink file" (named for example drinkname.exc) to friends either by email, to a phone, or through a social networking sites. In some embodiments, the host system may track the distribution and/or reuse of customers' drink recipes, and rewards (e.g., free drinks) may be awarded to creators of highly used recipes. In some embodiments, the files in which drink recipes are stored may adhere to a particular file format, and/or the contents of those files (the recipes) may follow a particular syntax for specifying drink recipes (e.g., a file format and/or syntax readable by the master controller).

In some embodiments, messages may be delivered to customers during the customization and product delivery time. These messages may follow standard story boards, and may be customized for the individual customer. The system may be configured to deliver a sequence of messages, and the last step in that sequence that was displayed to the customer may be stored each time the customer visited any of the kiosks. For example, an indicator of the last message displayed may be thought of as a "bookmark" in the corresponding storyboard. Such a bookmark indicator may be stored in profile data associated with the customer to indicate the point in the sequence at which the most recent interaction with the customer ended. In such embodiments, each time the customer visits one of the kiosks, they may receive new information that is in context with the previous information that they received (e.g., that begins at the point of a previously stored bookmark indicator), or in the context of a previous or current drink order (e.g., dependent on the drink recipe, drink customizations, or other options selected by the customer when visiting the kiosk). The information may also be tailored based on the particular tastes of the customer. In some embodiments, philanthropic choices may be presented to the customer, i.e. to select one of "n" non-profits that they would wish to be supported on their behalf. For example, the screen may display the names and/or logos of ten non-profits being supported in the month. The customer may be able to select one or more and be presented with information about them (e.g., by selecting an active link displayed within a message on a touch screen). Active links may also be used in other messages (e.g., advertising messages or other types of story boards) to allow the customer to access additional information according to their preferences. These choices may lead to further tailoring of the message(s) presented to the customer on this or another visit.

Making Multiple Beverages with One Apparatus

In various embodiments, the systems and methods described herein may allow a single apparatus to brew multiple types of beverages, as well as espresso. For example, the apparatus may include a variety of process modules, each of which performs a chemical or mechanical process that contributes to the production of brewed beverages and/or to the efficient operation of the apparatus itself. Note that in some cases, temperature and pressure may be catalysts to various ones of the chemical and mechanical processes performed by the beverage generation apparatus. In some embodiments, the introduction of ultrasonic energy to a chemical or mechanical process may reduce the required temperature and/or pressure to perform the process. This may, in turn, alter the chemical/mechanical process and/or may alter the end flavor of the beverage, e.g., by avoiding negative side effects that can be caused by excessive temperature and/or pressure. In some embodiments, the application of ultrasonic energy at specific points in time (e.g., during the extraction process) may be used to accelerate, amplify, or emphasize the process, which may enhance the beneficial chemical and/or mechanical reactions, while de-emphasizing detrimental processes. For example, through fine control of the rate of extraction through an entire extraction process the flavor profile of the resultant espresso product may be fine-tuned. In other words, by adaptively applying an ultrasonic process, the beverage generation apparatus may be able to reduce the temperature at which beverages are made. The resulting lower-temperature beverage generation process may not draw out any unappetizing compounds, and may thus reduce or eliminate bitter tastes that might otherwise be introduced into the beverages that are produced.

In some embodiments, adaptively changing the pressure at specific points in time during one of the chemical and/or mechanical processes may also be used for fine-tuning the beverage generation process and/or its results. For example, in one embodiment, a single filter plate may be used for, but the pressure in the system may be changed (for a particular process or during the course of a particular process) in order to make brewed beverages, espresso, or other drinks. In another example, a process for brewing tea may have a different pressure and temperature profile than a process for brewing coffee, but both may utilize the same beverage generation apparatus and/or various ones of the process modules included therein. In general, any organic extraction process may be performed efficiently using the systems and method described herein and may be further customized by the system for a particular intended result, e.g., based on customer preference and economic benefits.

Figure 3:
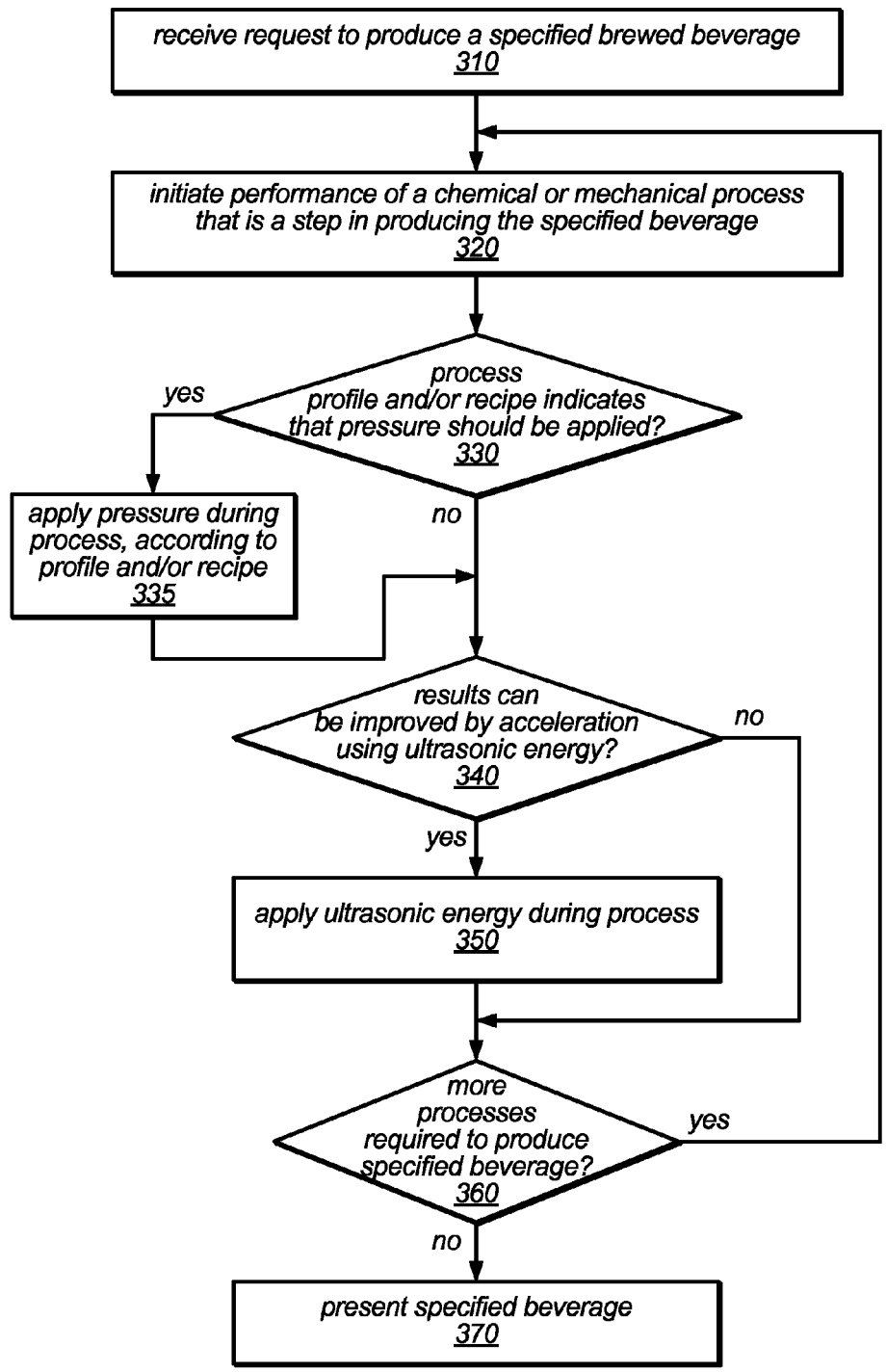
FIG. 3 is a flow diagram illustrating one embodiment of a method for producing different types of beverages by adaptively applying one or more chemical or mechanical processes to raw ingredients.

One embodiment of a method for producing different types of beverages by adaptively applying one or more chemical or mechanical processes to raw ingredients is illustrated by the flow diagram in FIG. 3. As illustrated in this example, the method may include receiving a request to produce a specified brewed beverage, as in 310, and initiating the performance of a chemical or mechanical process that is a step in producing the specified beverage from the raw ingredients for the beverage, as in 320. If a recipe for producing the specified beverage or a profile associated with the chemical or mechanical process indicates that pressure should be applied during the performance of the process, shown as the positive exit from 330, the method may include applying pressure while performing the process, according to the applicable process profile and/or beverage recipe, as in 335. For example, in some embodiments, a chemical or mechanical process may be adapted for application to the production of specific beverages and/or for the production of various beverages under specific environmental or machine conditions by applying a fixed or variable amount of pressure to the process. If no applicable recipe or process profile exists for the beverage or process, or if a recipe or process profile does not indicate that pressure (e.g., pressure other than a default or standard amount of pressure applied during the process) should be applied during the process, shown as the negative exit from 330, no additional pressure should be applied during the process.

As described herein, in some embodiments, the results of a chemical or mechanical process may be improved by accelerating the process (e.g., using ultrasonic transducers). As illustrated in FIG. 3, if the results of the process can be improved by accelerating the process using ultrasonic energy, shown as the positive exit from 340, ultrasonic energy (e.g., a fixed or variable amount of ultrasonic energy) may be applied during the process, as in 350. If the results of the chemical or mechanical process cannot be improved by the application of ultrasonic energy, or if the system does not include ultrasonic transducers configured to accelerate the particular chemical or mechanical process, shown as the negative exit from 340, no ultrasonic energy may be applied during the process. If additional processes are required to produce the specified beverage, shown as the positive exit from 360, the operations illustrated in 320-350 of FIG. 3 may be repeated for each of the chemical and/or mechanical processes performed in producing the specified beverage. This is illustrated in FIG. 3 by the feedback from 360 to 320. Once all of the processes required to produce the specified beverage have been performed, shown as the negative exit from 360, the method may include presenting the specified beverage for retrieval, as in 370.

Figure 4:
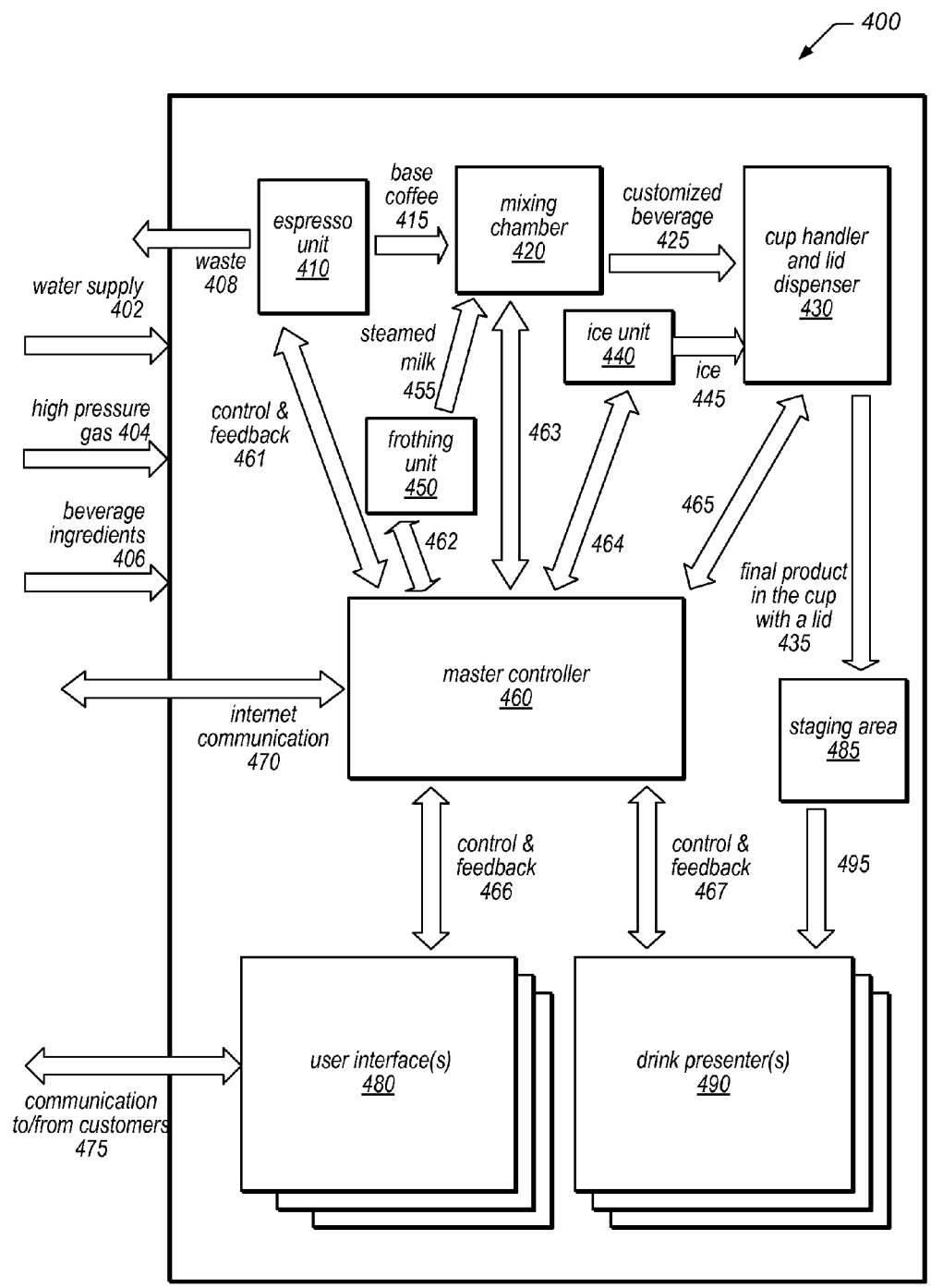
FIG. 4 is a block diagram illustrating one embodiment of a system for producing and dispensing brewed beverages.

One embodiment of a system for producing and dispensing brewed beverages is illustrated by the block diagram in FIG. 4. In various embodiments, the entire assembly (illustrated as system 400) may be housed in a stand-alone kiosk, may be configured as a walkup kiosk attached to another structure, or may be contained in another type of housing. At a system level, various combinations of the components illustrated in FIG. 4 and other components may allow for a fully automated kiosk that generates a brewed beverage using ground coffee or beans as an input and producing a beverage in a lidded coffee cup. In some embodiments, the components illustrated in FIG. 4 may be similar to corresponding components illustrated in FIG. 1, e.g., they may perform the same (or similar) functions as the corresponding components of FIG. 1. In various embodiments, any or all of the methods and mechanisms described here may be applied to systems located in offices that provide coffee for employees, in homes, or in other applications. As previously noted, they may also be applied in other situations in which low overhead costs and low maintenance are priorities, but vending machine quality coffee is not sufficient.

As shown in the example illustrated in FIG. 4, system 400 may receive external inputs to the beverage production processes, including water (e.g., through water supply 402), high-pressure gas (404), and beverage ingredients (406). In other embodiments, these inputs to the beverage production processes may be sourced from within system 400 (e.g., from an internal water tank, internal gas tank, and/or internal ingredient storage tanks). System 400 may include an espresso unit 410 (which may produce a coffee base 415), a frothing unit 450 (which may heat and/or froth milk and provide it as steamed milk 455), and a mixing chamber 420 (in which a base coffee 415, steamed milk 455, and/or other beverage ingredients 406 may be combined to produce a customized beverage 425). If beverage 425 is an iced drink, ice unit 440 of system 400 may provide ice 445 to a cup handler and lid dispenser 430, where the ice 445 may be dispensed into cup along with customized beverage 425.

As illustrated in this example, espresso unit 410 may take water as an input (e.g., from a water supply 402), may brew coffee using any or all of the components and techniques described herein, and may store base coffee product 415 prior to its use in other stages of the beverage production flow. As in the previous example, the water may be supplied directly from a city water supply, or it may be stored in a storage tank that is located such that gravity provides the flow of water to espresso unit 410. In this example, mixing chamber 420 may receive the base coffee product 415 as an input and may customize the beverage, such as by adding sweeteners, diary (e.g., cold or steamed/frothed milk), water, flavored syrups, or other ingredients, per the customer's specification. The cup handler and lid dispenser 430 may receive the customized coffee product 425 as an input and may package it (in some cases along with ice 445) as a final product in a cup with a lid (shown as 435). As illustrated in this example, the final product 435 may be stored in a staging area 485 prior to being presented to a customer at one of several drink presenters 490 as a delivered product 495. In other embodiments partially completed beverages and/or components thereof (e.g., base coffee or various combinations of ingredients) may be temporarily stored in a work-in-progress (WIP) staging area (not shown).

Waste produced by the system (e.g., waste produced by an espresso unit 410, shown as 408 in FIG. 4) may be directed to a city waste water service, or it may be passed through a screen filter stage such that only the liquid waste is directed to the city waste water service and the resulting dry waste grounds are collected when the unit is serviced. In some embodiments, a waste tank may be employed, e.g., when city wastewater service is not available.

As illustrated in FIG. 4, the system may include one or more user interfaces 480, through which various users (e.g., customers or technicians) may communicate with system 400, as in 475. For example, user interfaces 480 may include one or more of a liquid crystal display (LCD), a touch screen LCD (e.g., a 15-inch touch screen LCD), a cathode ray tube (CRT), a plasma display, or any other display/monitor device, a credit card and loyalty card reader, a radio frequency identification (RFID) reader, a coin acceptor, a printer, a loyalty card dispenser, a microphone, a speaker, a keyboard, and/or a soft keyboard. In some embodiments, an interactive display may accept customer orders, and may interact with a master controller 460, a coin/credit card acceptor (not shown), and/or a receipt printer (not shown) in order to process transactions for various orders. In some embodiments, a gift card/reward card dispenser may be included, and may be controlled by the master controller 460. In some embodiments, multiple order entry touch screens may exist on one kiosk, and/or the main extraction and storage tank may serve multiple dispensing stations within the same kiosk. Additional displays may be employed for point of sale advertising, in some embodiments.

Other embodiments may include any or all of these user interfaces or any other user interface configured to allow a customer or technician to interact with the system. For example, the customer or technician may be prompted to input data (e.g. data indicating a selection of a function, operation, or customization to be performed, or selection of a brewed beverage to be produced) by a message displayed by the user interface mechanism. As shown in this example, the system may also include one or more drink presenters 490, each of which may provide a conveyor to a portal at which a customer may retrieve a delivered 495 product (e.g., a particular brewed beverage).

As in the previous example, the system may include a central master controller (shown as 460), which may schedule all beverage production processes dependent on inputs from various user interfaces, on machine feedback, and on communication received from a host or host database, and may coordinate all customer communications, machine controls, and feedback (e.g., control and feedback illustrated at 461, 462, 463, 464, 465, 466, and 467 in FIG. 4), and communication to a host server and/or database thereof. For example, all valves, heaters, pumps, servo motors, flow control mechanisms, actuators, and/or other mechanical components of the system may controlled by the master controller, as described herein. In some embodiments, various mechanical components may include one or more ultrasonic transducers (not shown). In such embodiments, master controller 460 may control the application of ultrasonic energy to various processes performed by system 400 by activating particular ones of those ultrasonic transducers.

In addition, the status of any or all components of the system may be observable by a remote host through the master controller and/or an interface thereof. For example, in some embodiments, the master controller may communicate with a host server and/or database at a remote location through an Internet connection, such as that illustrated as element 470 in FIG. 4. The operations of the master controller (sometimes referred to herein as a scheduler) and other components of the system are described in more detail herein, according to various embodiments.

Figure 5:
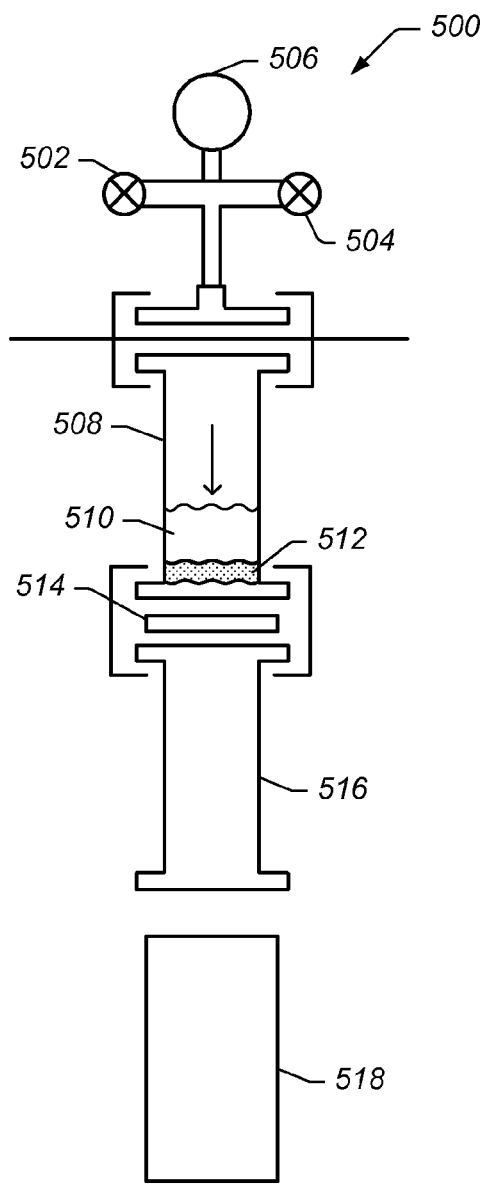
FIG. 5 is a block diagram illustrating one embodiment of an espresso unit, as described herein.

One embodiment of the espresso unit described herein (espresso unit 500) is illustrated by the block diagram in FIG. 5. In this example, the brewing chamber (which may also be referred to as a brew tube) is shown in the brewing position. As illustrated in this example, the brewing mechanism may include two chambers (508 and 516), which are separated by a filter (514). Above the top chamber (508) is a seal mechanism (506) with two ports (502 and 504), one of which (502) is used to supply hot water (e.g., 200° F. water), and the other of which (504) is used to apply high-pressure air (e.g., air pressurized to between 0-9 bars, as controlled by software executing on the master controller). In some embodiments, espresso unit 500 may include additional ports to exhaust the pressurized air after extraction (not shown). In this example, the removable top seal (506) may be applied once the grounds are introduced to the top tube (508), and the grounds may be tamped by a mechanical tamper, resulting in compressed coffee (512). Water introduced into the top chamber (508) is shown in FIG. 5 as 510. As illustrated in this example, a container (518) may be positioned below espresso unit 500 to collect expressed coffee resulting from the expression of hot water 510 through compressed coffee 512.

Figure 6:
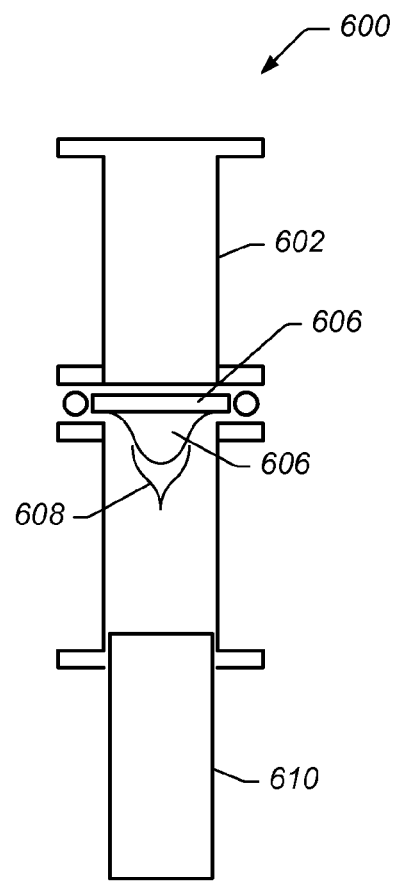
FIG. 6 is a block diagram illustrating an embodiment of an espresso unit that includes a sintered filter.

FIG. 6 illustrates another embodiment of an espresso unit (espresso unit 600), which includes a sintered filter, as well as an upper chamber (602) and a lower chamber (610). As illustrated in this example, a sintered filter may have a profile that encourages the formation of a stream of espresso (608) whose shape keeps the espresso from cooling down or being wasted on the sides of the lower chamber (610). For example, the sintered filter may include a higher density disk (e.g., a low porosity disk on the order of 0.10 along the top plane (shown as 604), and a higher porosity bulge (e.g., on the order of 100 that directs the coffee to the center (shown as 606). In some embodiments, the upper portion (606) may have a higher porosity as well, though it may not restrict the flow of the espresso stream during the espresso process.

In some embodiments, the use of incremental compaction may enable the brewing of different beverages and/or variations of a brewed beverage. Such incremental compaction of the coffee grinds may be used to maintain consistency throughout the coffee or espresso puck. Note that, as used herein, the term "puck" may refer to a compressed cylinder of ground coffee, including coffee that has been compacted using any of the methods or mechanisms described herein. Compacting incremental amounts of grinds may facilitate more efficient compaction and may result in smaller amounts of coffee being consumed per espresso shot. For example, in a typical expression process, in which an entire puck of coffee is compacted at once, only the top layer of coffee is actually compacted because the applied force is dissipated in the top layer of coffee, leaving the lower levels of the puck unaffected by the manual compaction process. In some embodiments, the systems described herein may dispense a portion of the coffee grinds to be used for an extraction operation into the brewing chamber. In such embodiments, a tamper may be used to compact that portion of the grinds, and then the process may be repeated until all the coffee grinds to be used for the extraction operation have been dispensed and compacted (e.g., in layers). In some embodiments, this incremental compaction mechanism may create a consistently compacted puck. The net effect of the incremental compaction mechanism may be that the compacted coffee more efficiently slows the water flow during extraction, and smaller amounts of coffee grinds may be required to create each espresso shot.

In some embodiments, the first layer of compacted coffee (e.g., the first layer of coffee compacted in an incremental compaction operation) may be used to create a blockage at the bottom of the brewing chamber. In such embodiments, at any time after the first layer has been compacted, hot water may be added to the chamber (e.g., before and/or after additional grinds are added to the chamber for further compaction). This may allow the same brewing mechanism that is used for the production of an espresso product to be used to brew a "French press" type product. Once a French press type coffee is brewed, the product may be forced through the compressed puck using the same high-pressure air source used in the espresso process (although the pressure may in some cases be reduced). In other words, the process for producing a French press type product may incorporate various elements of the espresso process.

Figure 7:
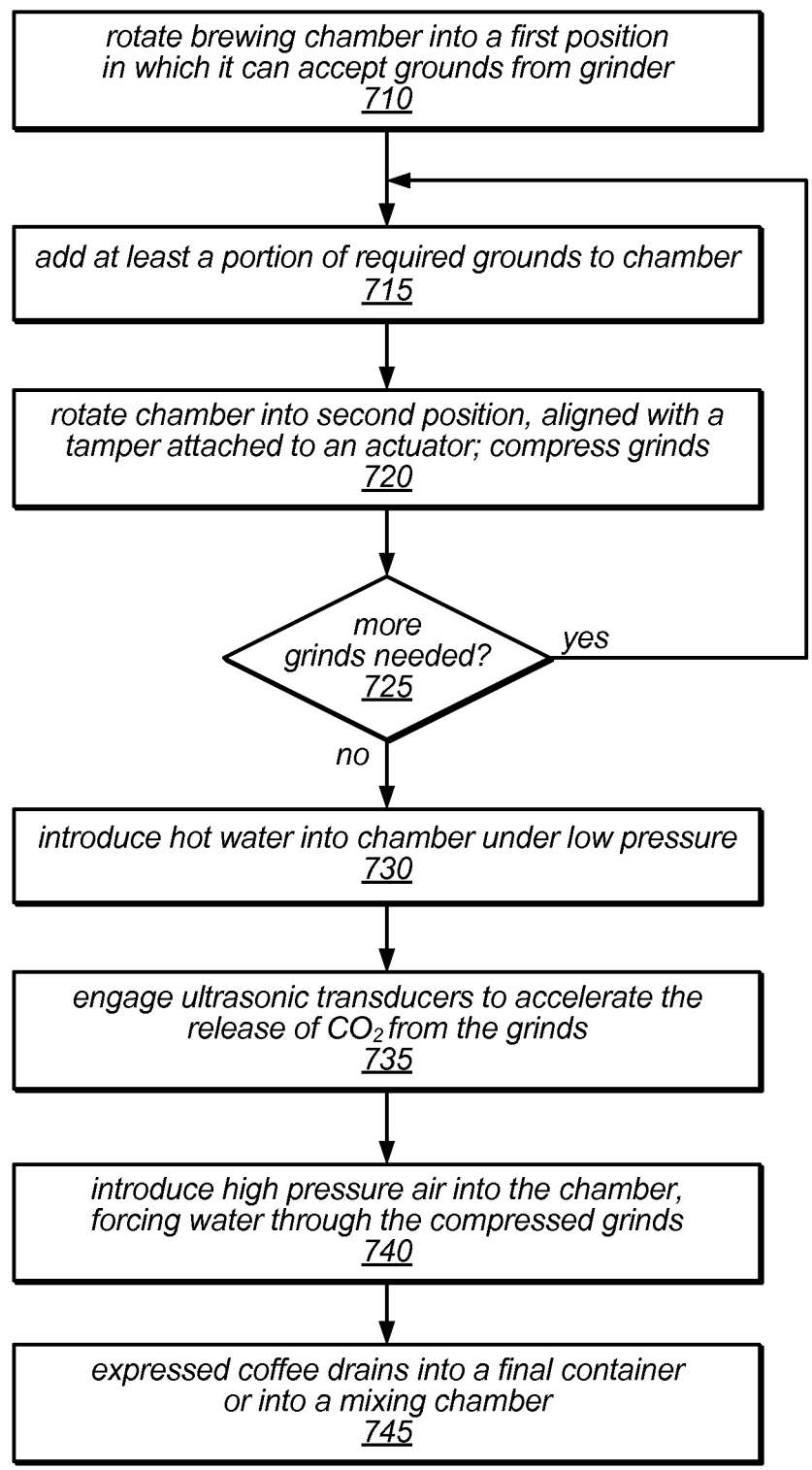
FIG. 7 is a flow diagram illustrating one embodiment of a method for producing espresso.

One embodiment of a method for producing espresso in a system such as those described herein is illustrated by the flow diagram in FIG. 7. As illustrated in this example, the method may include rotating a brewing chamber into a first position in which it can accept grounds (e.g., coffee grounds) from a grinder, as in 710, and adding at least a portion of the grounds required to produce a brewed beverage to the brewing chamber, as in 715. For example, in some embodiments, the grounds required to produce a given beverage may be incrementally added to and compacted in the brewing chamber, rather than being added all at once.

As illustrated in this example, the method may include rotating the brewing chamber into a second position, such that it is aligned with a tamper attached to an actuator. While the brewing chamber is in this position, the grinds may be compacted by the tamper, as in 720. If more grinds needed to produce the beverage, shown as the positive exit from 725, the method may include repeating the operations illustrated at 715-720 until the required amount of grinds have been added to the brewing chamber and compacted by the tamper. This is illustrated in FIG. 7 as the feedback from 725 to 715. Once the required amount of grinds have been added to the brewing chamber and compacted by the tamper, shown as the positive exit from 725, the method may include introducing hot water into the into brewing chamber under low pressure, as in 730.

In some embodiments, the method may include engaging one or more ultrasonic transducers to accelerate the release of CO2 from the grinds during a pre-infusion stage, shown as 735. As illustrated in this example, the method may include introducing high-pressure air into the brewing chamber, which may force the hot water through the compressed grinds, as in 740. For example, in some embodiments, air at 9 bars may be introduced into the brewing chamber during the production of espresso, or air at a slightly lower pressure may be introduced into the brewing chamber to perform a French press type process. Once the hot water has been forced through the compressed grinds, the method may include draining the expressed coffee (or coffee base) into a final container or into a mixing chamber, as in 745. Note that in other embodiments, a method for producing espresso may include an optional pre-heating operation in which the brewing chamber (or various portions thereof) are heated prior to one or more steps of an extraction process.

Figure 8:
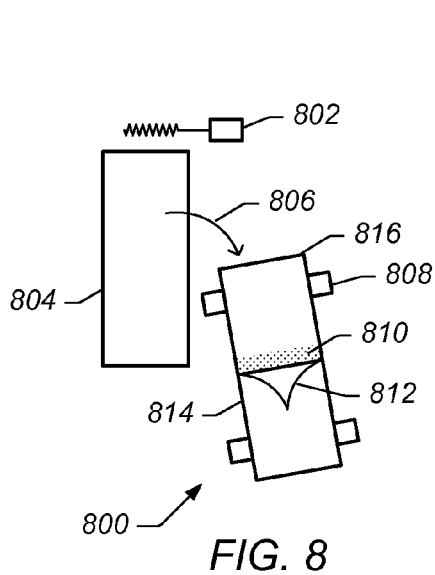
FIG. 8 is a block diagram illustrating some of the operations of an espresso unit during a first step of an espresso process, according to some embodiments.

Portions of an espresso process, such as that illustrated in FIG. 7, may be further illustrated by the block diagrams in FIGS. 8-12. For example, FIG. 8 illustrates some of the operations of an espresso unit during a first step of an espresso process, according to some embodiments. In this example, a brewing chamber 800 is rotated to a position in which a grinder (804) can dispense a prescribed amount of fresh ground coffee (806) into the upper chamber (816). After compression, the grinds (810) in the upper chamber (816) may form a coffee (or espresso) puck (shown as 908 in FIG. 9). In this example, a representation of a worm gear attached to a stepper or DC motor (shown as 802) is illustrated above grinder (804). This worm gear and motor may be used to drive an adjustment cam to adjust the size of the resulting grinds (806). For example, as the motor is engaged in one direction or the other, the grind size may be adjusted by rotating a collar on a threaded collar. The grinding plate attached to this collar may be raised or lowered, which may ultimately increase the grind size or reduce the grind size. In some embodiments, a master controller may cause the grinding plate to be raised or lowered in order to adjust the grind size based on the amount of time it takes (as has taken) to pull an espresso shot. For example, if the shot takes (or has taken) longer than a prescribed or expected amount of time, the grind size may be increased to allow the water to flow more freely through the coffee or espresso puck (e.g., puck 908 in FIG. 9) during the next espresso pull. If the shot took less than the prescribed or expected amount of time, the grind size may be decreased prior to the next espresso pull.

The brewing chamber 800 of the espresso unit illustrated in FIG. 8 also includes four ultrasonic transducers (e.g., ultrasonic transducer 808), two of which are attached to the upper chamber (816), and two of which are attached to the lower chamber (814). In some embodiments such transducers may be energized during the espresso process and/or during the cleaning process (e.g., to accelerate the processes or certain aspects thereof). The brewing chamber also includes a sintered filter (812) between the upper chamber (816) and the lower chamber (814). Not shown is FIG. 8 is an optional pre-heater that in some embodiments, may be attached to brewing chamber 800 (e.g., to the brew tube), or a process whereby hot water is passed through the brew tube before it is loaded with grinds. The use of such a pre-heating cycle may in some embodiments bring the brew tube up to a temperature high enough that the brew tube does not cool the brewing water when it is introduced to the brew chamber.

Figure 9:
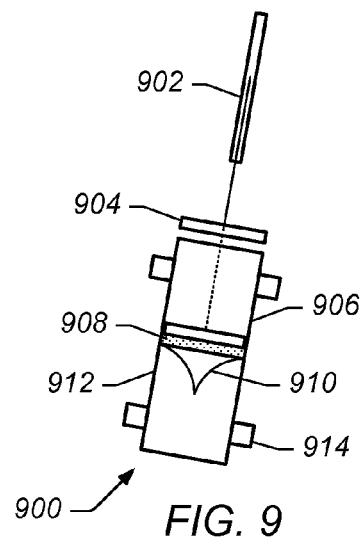
FIG. 9 is a block diagram illustrating some of the operations of an espresso unit during a second stage of an espresso process, according to some embodiments.

FIG. 9 illustrates some of the operations of an espresso unit during a second stage of an espresso process, according to some embodiments. In this example, the same brew tube illustrated in FIG. 8 (now illustrated as brewing chamber 900, which includes an upper chamber 906 and a lower chamber 912) has been rotated to an alternate position so that it is in alignment with a tamper (904) attached to an actuator (902). The dotted line shows the path along which tamper (904) travels as the actuator (902) is enabled. When the tamper (904) is depressed into the tube, the coffee grinds (e.g., grinds 810 in FIG. 8) are compressed in the same manner in which they would be pressed by a human barista to form a coffee or espresso puck (908). The tamper (904) may then be retracted to an elevation above the brew tube high enough to allow further rotation of the brew tube. The brew chamber may then be ready for the introduction of water on top of the puck (908) in the upper chamber (906).

As in the previous example, brew tube 900 includes four ultrasonic transducers (e.g., transducer 914). Not illustrated in FIG. 9 are air vents that may exist in the tamper 904 (which may also be referred to as a plunger) and that may allow the tamper (904) to be removed without disturbing the integrity of the coffee or espresso puck (908) when the tamper (904) is extracted. In some embodiments, the tamper (904) may be formed out of a block of Teflon to minimize the disturbance of the puck (908) when the tamper (904) is removed. Also not illustrated in FIG. 9 is the rotary action of the tamper (904) as it comes in contact with the coffee grinds when it is depressed. In some embodiments, this rotation may continue in the same direction as the tamper (904) is raised, while in other embodiments, the tamper may follow a combination of rotational movements in various directions when it is depressed. In some embodiments, such rotary actions of the tamper may form a smooth surface on the top of puck, which in turn may lead to a more uniform extraction of the coffee.

Figure 10:
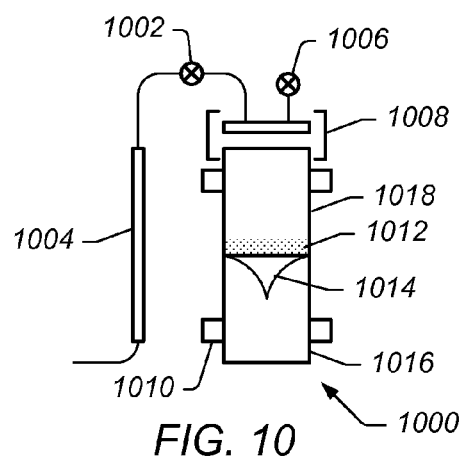
FIG. 10 is a block diagram illustrating some of the operations of the espresso unit during an extraction operation, according to some embodiments.

FIG. 10 illustrates a next step in an espresso process, according to some embodiments. Specifically, FIG. 10 illustrates some of the operations of the espresso unit during the actual extraction process. As in the previous examples, the brewing chamber 1000 illustrated in FIG. 10 includes an upper chamber (1018), and lower chamber (1016), a sintered filter (1014), and four ultrasonic transducers (e.g., transducer 1010). As illustrated in this example, an industrial water heater (e.g., an in-line water heater, shown as 1004) may supply hot water to a brewing chamber 1000 for use in the extraction process. The inline water heater may not be under high pressure, which may reduce the complexity of the system. In some embodiments, an industrial water heater may be part of a hot water loop that includes a small reservoir and a circulating pump. In some such embodiments such a system may be fed with hot water from a pre-heater tank in which the water is maintained at a temperature in the neighborhood of 140° F.) In this example, the top of the brew chamber 1000 is sealed, e.g., with a rotary actuator or some other efficient automatic sealing mechanism (shown as 1008). In some embodiments, the hot water may be under low pressure (e.g., on the order of 30 psi), in contrast to the hot water in a typical espresso machine (which may be maintained in a hot water tank pressurized to 9 bars). A valve (1002) may be opened to introduce the hot water into the upper chamber (1018) of the brewing chamber 1000.

Once the prescribed amount of water has been introduced to the upper chamber (1018), high-pressure air (which may already be available in the system for various actuators and/or fluid delivery systems) may be introduced to the brew chamber (e.g., through valve 1006). This may bring the air above the water (which is above the coffee or espresso puck 1012) up to approximately 9 bars of pressure. In some embodiments, this pressure may force the hot water through the coffee or espresso puck (1012). Note that, in contrast to the operation of a typical espresso machine, in some embodiments of the espresso unit described herein, the water is not introduced under high pressure, but rather the water is introduced under low pressure and the air is introduced under high pressure. The use of high-pressure air rather than high-pressure water may reduce the cost and complexity of the system while increasing its reliability, since air may be much easier to handle under high pressure than mineralized hot water.

Note that FIG. 10 illustrates one possible mechanism for sealing the brew tube, e.g., using a rotary actuator. Other embodiments may employ actuators with leverage to seal the brew tube. For example, actuators may apply horizontally opposing forces to drive a wedge shape that creates a vertical movement with significantly more force than the actuators alone may achieve. Not illustrated in FIG. 10 is an additional exhaust valve into the brewing chamber, or an alternative air pressure source for the brewing chamber when it used in a French-press process (e.g., a process in which the coffee is expelled under a lower pressure than the 9 bars of pressure that may be used in an espresso process). Note that while FIG. 10 shows water entering the brewing chamber through an industrial tube heater as part of a coffee brewing process, in some embodiments, the same industrial water heater (or another industrial water heater) may be used as part of a closed loop heater system, with or without a storage tank.

Figure 11:
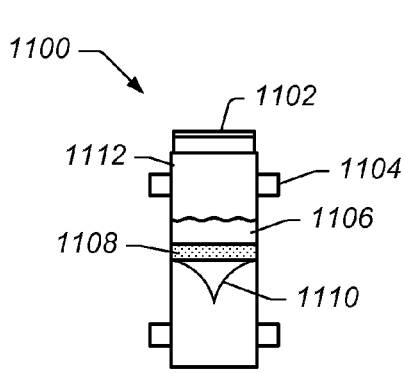
FIG. 11 is a block diagram illustrating water being dispensed into a brewing chamber under low pressure during an extraction process, according to some embodiments.

In the block diagram illustrated in FIG. 11, water is dispensed into the brewing chamber under low pressure (shown as water 1106 in brewing chamber 1100), such that there is no pressure in the chamber for the initial moments. This may allow carbon dioxide to escape the ground coffee when water first comes in contact with the ground coffee. This may be referred to as the pre-infusion stage. In some embodiments, ultrasonic transducers (such as transducer 1104 and/or other transducers attached to brew tube 1100) may or may not be engaged at this stage to accelerate the process of releasing carbon dioxide. In one example, approximately 2.5 oz of hot water (1106) may be dispensed into the upper chamber (1112) of a brewing chamber (1100) such as that illustrated in FIG. 11 to extract 2.0 oz of espresso when the water (1106) is forced through espresso puck 1108 and then through sintered filter 1110. In this example, approximately 0.5 oz of water may be retained in the coffee grounds.

Figure 12:
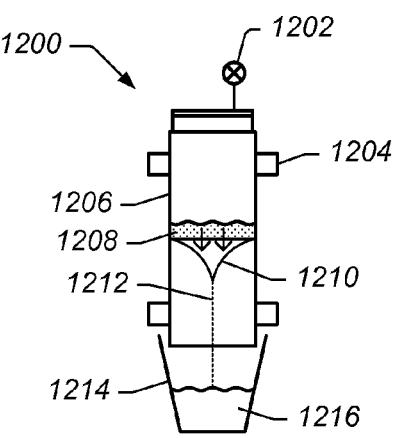
FIG. 12 is a block diagram illustrating the pressurization of an upper chamber of a brew tube as part of an espresso process, according to one embodiment.

FIG. 12 illustrates another step in an espresso process, according to one embodiment. In this example, the upper chamber (1206) of a brewing chamber 1200 is being elevated to 9 bars of pressure using pressurized gas (e.g., air or any of a variety of other available compressed gasses) that is introduced into the chamber through a pressurized gas valve 1202. In this example, pressurizing the upper chamber (1206) forces the espresso through the coffee puck (1208). The espresso (1212) then passes through sintered filter (1210) and drains into a cup (1214) that may or may not already include another liquid (e.g., milk product 1216). As previously noted, one or more ultrasonic transducers attached to the side of the brewing chamber (e.g., transducer 1204) may be activated a various points in the brewing cycle to accelerate specific reactions between the coffee and the water, in some embodiments.

Frothing Process

The frothing of milk (or milk products) generally requires a folding turbulence action/flow in which large bubbles are created and then re-incorporated back into the milk. The folding action destroys the larger bubbles, and the sizes of the bubbles are determined by the particular folding action performed. In some embodiments, the beverage generation apparatus described herein is configured to froth milk by employing a process that uses steam and an actuator to raise and/or lower the fluid (i.e. milk or a milk product). In some embodiments, a master controller (or a controller application executing on a processor) may send one or more pulses to a steam wand to control the pressure and temperature of the steam coming out of the steam wand, and/or may send one or more pulses to the steam wand to control the depth, pressure, angle, during, and/or temperature of the steam to create an optimum turbulence while heating and frothing the milk (i.e. folding the milk upon itself to destroy the bubbles) and creating a uniform microfoam (e.g., very fine bubbles that are evenly distributed through the drink).

In some embodiments, the steam wand may be fashioned from (or its exterior made of) machined Teflon (or another material having low thermal conductivity). The steam wand may include three or more holes that are offset to one side of the wand (and, therefore, the cup or other container in which the milk is being frothed) to create the folding turbulence. In some embodiments, the pressure may be built up slowly in the wand such that the milk is not blown away. The pulsing of a solenoid may be used to cause the steam pressure to increase, and as the wand goes into the milk, the positive pressure may keep the milk from entering the wand.

Figure 13:
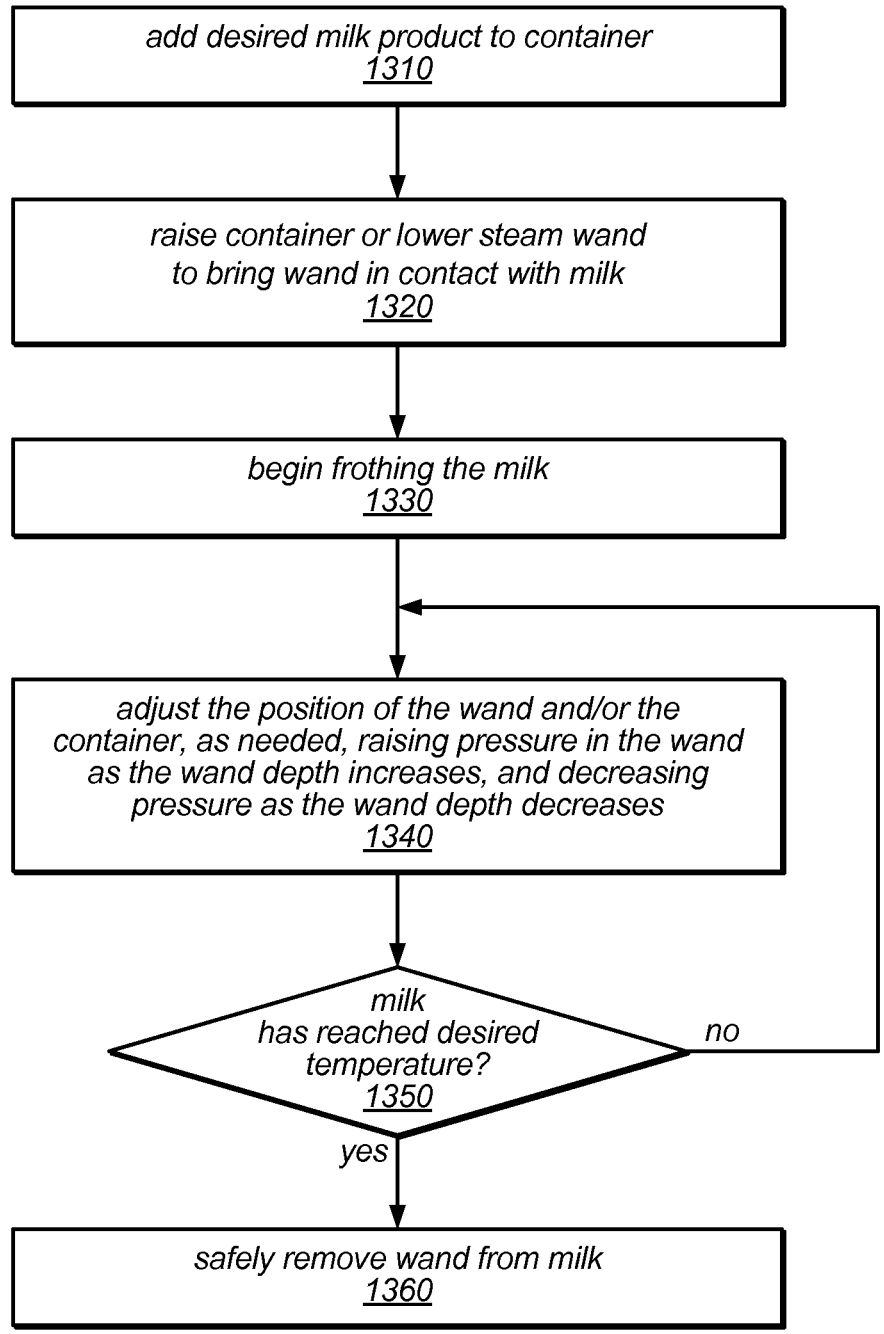
FIG. 13 is a flow diagram illustrating one embodiment of a method for frothing milk.

One embodiment of a method for frothing milk is illustrated by the flow diagram in FIG. 13. As illustrated in this example, the method may include adding a desired milk product (e.g., whole, soy, low-fat, non-fat, etc.) to a container, as in 1310, and raising the container or lowering a steam wand to bring the wand in contact with milk, as in 1320. As illustrated at 1330, once the steam wand is in contact with the milk, frothing may begin. During frothing (shown as 1340), the method may include adjusting the position of the wand and/or the container, as needed, e.g., by raising or lowering the container, raising or lowering the wand, adjusting the angle at which the container is held or moved (e.g. relative to the wand), and/or changing the speed at which such adjustments are made. In some embodiments, these adjustments may be made based on the volume of the container or the milk, the shape of the container, the current temperature of the milk (e.g., the initial temperature and/or the temperature as it changes during frothing), the fat content of the milk, or on other parameters that may affect the frothing process.

As the wand depth increases during frothing (e.g., by raising the container, lowering the wand, or changing the relative angles at which the container and wand are positioned), the method may include increasing the pressure in the wand in order to increase the temperature of the milk being frothed. This may, in turn, increase the turbulence in the milk and the folding effect on the liquid. As the wand depth decreases (either by lowering the container, raising the wand, or changing the relative angles at which the container and wand are positioned), the method may include decreasing the pressure in the wand. The pressure, wand depth, and/or position of the container or wand may be adjusted as needed until the milk overcomes its thermal inertia and the optimum temperature is reached. This is illustrated in FIG. 13 by the feedback from 1350 to 1340.

Once the milk has reached the desired temperature (shown as the positive exit from 1350), the method may include safely removing the wand from the milk, as in 1360. In some embodiments, safely removing the wand may include decreasing the pressure in the wand as the depth of the wand decreases (e.g., to avoid splashing as the wand is removed). For example, the pressure may be decreased, and then the wand depth may be decreased (either by lowering the container or raising the wand), or the pressure and depth may be decreased simultaneously, in different embodiments.

In some embodiments, the frothing process may be controlled via a microcontroller that controls the pressure in the steam wand and the depth of the steam wand with respect to the milk surface while monitoring the temperature of the milk. In such embodiments, the pressure and wand depth may be adaptively varied as a function of the temperature of the milk. In some embodiments, an ultrasonic distance-monitoring device may be used to determine the volume of the liquid (e.g., the milk product) in the cup (i.e. the volume of the milk being frothed). In embodiments in which the weight of the cup is known, a calculation may be made to determine the density of the liquid once it is converted into foam. This calculation may be used to determine and maintain the quality of the microfoam.

In some embodiments, the fat content of the milk product being frothed may be tracked as an indicator that changes the way the milk is frothed. In other words, the process for frothing the milk may be adapted dependent on the milk fat content. In some embodiments, for example, the time, intensity of the steam, and/or the depth profile of the steam wand over time (e.g., over the time it takes to perform the frothing process) may be tailored to the specific milk content (including the milk fat content) and/or milk volume involved in each individual frothing operation, and/or the desired temperature of the resulting microfoam. In some embodiments, a microcontroller (or an application executing thereon) may use a lookup table to determine a profile for the frothing process to determine a combination of depth changes, actual depths, and/or pressure changes to achieve a microfoam at a desired final temperature that has a specific microfoam texture.
Filter In various embodiments, one or more components or mechanisms may be employed in the beverage generation system to improve processes related to the filtration of the suspended solids. For example, the system may include a filter plate or another filter structure. Traditionally, the rate of flow of the water through a coffee puck is determined by the size of the coffee grinds and the process used to tamp the puck. However, in some embodiments, the control of the flow may be regulated using a 0.1µ grade (holes) stainless steel sintered metal filter disk. This filter may provide a more complete filtration while still enabling the "crema" associated with fine espresso to pass through the sintered filter. In other embodiments, another type of filter structure, such as a gradated portafilter may be employed. The filter in this structure is a plate that includes holes with a variety of different grades, e.g., a plate with hole sizes varying from microscopic (e.g. 0.1 micron holes) all the way up to visible holes. The gradation may allow the filter to more easily be cleaned by a reverse flow (e.g., reverse flow of water or a cleaning solution).

As described herein, in various embodiments, multiple types of drinks may be created using the same apparatus. For example, by using different sized grinds of coffee, the same equipment may be used to make different types of coffee (e.g., brewed coffee vs. espresso). For a brewed version, the grinds might not be compacted at all or they may be only partially compacted. For espresso, the grinds may be compacted. In some embodiments, the flow through the grinds may be changed by stacking filter plates (e.g., filter plates with similar or different hole sizes) and/or by rotating or aligning multiple filter plates.

In some embodiments, to facilitate the reliable performance of a sequence of operations by the beverage generation system, water in the system may be turned on and off via pressure and without moving parts (e.g., without any valves). For example, in such embodiments, there would be no flow under low pressure, while under high pressure the coffee would flow through the filter, or through the formed puck of coffee. In some embodiments, the application of the pressure during a process that employs a 1 micron filter may result in simply passing the water through the coffee puck without the need to further control the flow rate. However, during a process that employs a 0.1 micron filter (e.g., an espresso process) the system may further control the flow rate.

In some embodiments, in order to add structural integrity to a filter, the filter may have a bump at the bottom. This bump may also serve to direct the coffee or espresso that passes through the filter to the center of the filter to form a stream at the center of the filter. This may, in turn, help to maintain the quality of the crema.

Figure 14:
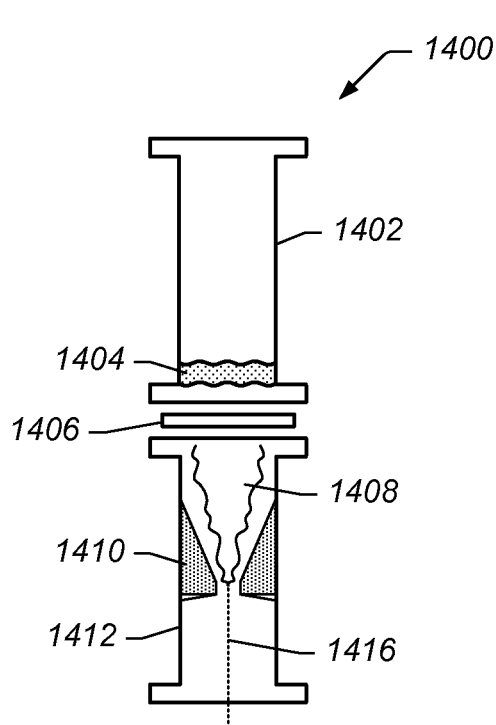
FIG. 14 is a block diagram illustrating the use of a solid funnel to direct coffee through the center of a brewing chamber during the brewing process, according to one embodiment.

In some embodiments, a funnel may be created by forming a sleeve within the bottom cylinder (i.e. the lower chamber) of a brewing chamber that is in the shape of a funnel, where the bottom side of the sloped section is solidly filled. As in the example described above, the solid funnel may be used to direct the coffee through the center of the brewing chamber during the brewing process. This is illustrated in FIG. 14 as solid funnel 1410, which directs espresso 1408 (expressed when water in upper chamber 1402 of brewing chamber 1400 is forced through puck 1404 and then filter 1406) through the center of lower chamber 1412 of brewing chamber 1400 to form a stream of espresso (shown as 1416).

Figure 15:
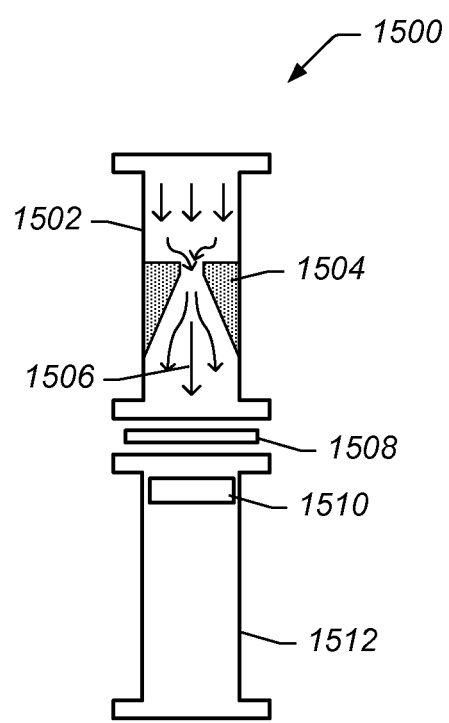
FIG. 15 is a block diagram illustrating a brewing chamber that includes a solid funnel and that is turned upside down for a cleaning process, according to one embodiment.

As illustrated in FIG. 15, when a brewing chamber 1500 that includes such a solid funnel (shown as 1504) is turned upside down for the CIP (clean-in-place) process, the water or cleaning solution (1506) can still flow in the (now upper) chamber (1502) to clean the brewing chamber without getting trapped underneath the top of funnel 1504. As illustrated in this example, in some embodiments, the bottom side of the solid funnel may be curved and/or sloped to eliminate (or at least minimize) the trapping of particulates and/or solution. As described herein, when the brewing chamber 1500 is in the cleaning position, water or cleaning solution from the CIP jets can flow down from (now upper) chamber 1504 through filter 1508 and into (now lower) chamber 1512 to dislodge and/or dissolve puck 1510 and/or to clean both the upper and lower chambers out.

Note that in some embodiments, as an alternative to a traditional latte process in which an espresso shot is created in one vessel, and milk is foamed in a separate vessel, the systems described herein may be used to foam the milk (which may or may not include other additives that have pre-dispensed into the milk) in a vessel (which may be the end user's cup or a separate vessel that is maintained clean using a CIP process) first, and then to dispense the espresso shot into the foam as the espresso shot is created. In some embodiments, this may contribute to the optimization of the caramelization process. In such embodiments, after the espresso shot has been dispensed, the system may perform a mixing process through mechanical vibration, or through the introduction of a stream of air or steam. This air or steam may be used to mix the espresso shot with the pre-steamed milk and any other ingredients that were pre-dispensed in the milk. In other embodiments, the espresso shot may be produced into a vessel first, and then the milk and/or other additives may be added before the steaming process. In such embodiments, the combined liquids may then be steamed and mixed together.

In some embodiments, various liquids may be dispensed out (e.g., at different points in a beverage generation process) at a point, which may enable latte art as well as a uniform flow of fluid (which may reduce cleaning needs). In some embodiments, the process of moving the cup around while creating the latte art may be sufficient to mix the ingredients in the drink. In some embodiments, the production of a single, thin stream of crema may allow the machine to create latte art, as described below. In some embodiments, the flow of the stream may be subsided at different points during the creation latte art in order to create more intricate designs. In one example, when a cup is on an XYZ actuator, the cup may be moved around in specific patterns to enable latte art, rather than the cup having to engulf the bottom lips of the cylinder. In other words, as the cup is moved around below the stream of espresso, any type of design may be created in any foamed milk already present in the cup. Creating latte art by moving the cup may keep the lips of the cylinder cleaner because the liquid may not run down the sides of the cylinder.

Note that in some embodiments, optimizing the thickness of a filter vs. the grind size may involve empirically matching the optimal grind size and the filter hole size. For example, as the thickness of the filter plate varies, the size of the holes (and/or the distribution profile of the holes) may be varied so that the water comes through the filter at the same rate across the plate (despite its thickness being uneven). Varying the size of the holes, and/or their distribution profile, may result in an even extraction across the coffee puck. In another embodiment, rather than having a filter with varying thickness, the system may employ a dual plate filter, in which a second filter plate is added to the original filter plate to cause the fluid to come to a point as it passes through the dual plate filter. In some embodiments, the second plate may not impede the flow, but may only affect its direction.

In some embodiments, the system may include a control loop that measures the amount of time it takes for a shot to come out and then adjusts the size of the grind accordingly. The container accepting the espresso may rest on a load cell or on another type of weighing device. In such embodiments, there may be an intended (or expected) target time for generation of the espresso shot. As the shot is extracted, the cup weight may be tracked along a time/weight profile. If the espresso shot extraction rate does not track the intended profile, a DC motor or stepper motor on the collar of the coffee grinder may be adjusted to change the grind size. If the shot is taking too long to extract, the grinder may be adjusted so that it dispenses a larger grind size. This may avoid over extraction, which may result in a bitter flavor in the final drink. For example, the larger grind size may allow the water to more freely move through the puck, and may shorten the time it takes to generate the espresso shot. Should the espresso shot happen too fast, the grinder may be adjusted with the same motor to reduce the grind size, which may slow down the process and avoid under extraction (which could result in a loss in body and/or flavor in the final drink).

In some embodiments, if there is a large shift in the shot time, this may indicate a fracture or structural flaw in the coffee puck. In such embodiments, the controller (or controlling software) may interpret a large shift in extraction time as an error. If so, the espresso shot may be dispensed to waste, and the process may be restarted. In some embodiments, the same load cell/sensor that is used in monitoring and/or controlling the espresso process may also be used to measure the quantity of dispensed ingredients by weight. In some embodiments, the existing load sensor may be used to validate the flow rate, and the controller (or controlling software) may control the grind size dependent on the flow rate observed over time.

Note that in embodiments in which both sintered plates and adjustments in the coffee grind size are used to control the espresso process, the grind size may be a second order effect (e.g., because of the sintered plate may have a larger effect on the results).

Note that tamping pressure may also a determining factor in the time it takes to generate an espresso shot. Human limitations in a traditional espresso process may introduce variability as well as a limitation on the amount of pressure that can used to create the puck. In some embodiments, the systems described herein may control the amount of pressure and the amount of time for which it is applied, which may increase the overall efficiency of the extraction process.

Note that in some embodiments, in order to enable the same equipment to be used to create multiple types of drinks with the same hardware, a motor may be used to make significant changes in the grinder settings depending on the type of brewing process used (e.g., espresso or a version of French press type product). In some embodiments, a database may store information about the size of the grind to be dispensed when producing a drink based on the type of drink to be produced. In some embodiments, the information stored in the database may represent a delta between a base process (e.g., a standard or default process) and a process that is specific to the type of drink being produced. In various embodiments, the base value may be changed via the control loop depending on the temperature of the drink, the type of coffee beans, or on other factors.

Ultrasonic Energy

In some embodiments, the same ultrasonic generator that is used in the espresso module (e.g., in the brewing process) may be utilized in the frothing station. For example, the ultrasonic generator may be used to clean the frothing structure (including, e.g., a steam wand and/or a temperature probe) by lowering the frothing structure into a cup of water or cleaning solution instead of lowering it into milk. The ultrasonic energy may be used to sterilize and/or wash the structure including the steam wand and temperature probe. This may provide a thorough cleaning of the frothing structure between uses.

As previously noted, in some embodiments the steam wand may be made of Teflon rather than stainless steel. A steam wand made of Teflon may have a lower thermal conductivity than a traditional stainless steel wand. In some embodiments, when steam passes through the Teflon wand, a protein layer may not form, since the outside of the wand may not reach the 140° F. temperature needed to create a protein layer on the wand. In some embodiments, the application of ultrasonic energy may enable the foaming of very small amounts of milk (as opposed to a steaming process, which typically requires larger quantities of milk to foam). This may minimize waste in the system and enable a wide variety of customized drinks. Note that the system may employ a single ultrasonic generator that generates different frequencies, since different applications of ultrasonic energy may require different frequencies.

In some embodiments, various liquid levels in the system (e.g., water, milk, expressed coffee) may be measured using ultra sound. Such measurements may be used as a backup process to prevent overflowing, and/or they may be used to regulate the depth of a steam wand as the liquid level is increasing in the cup (e.g., during a frothing operation). In some embodiments, a feedback loop from the ultrasonic sensor back to the master controller may control the vertical height of cup so that the depth remains at a prescribed level while the volume increases in cup.

Additional Process Details

The systems described herein may implement various processes that add reliability and reduce the overall operating cost of the machine as compared to existing beverage generation systems. Typically, an espresso machine dispenses hot water (approx 200° F.) from a tank that is also under 9 Bars of pressure. This creates a very hostile environment for the tank and for the associated valves and other pieces of equipment that are in contact with the high temperature water under high pressure. In addition, the water must contain a certain amount of mineral content to enable complete extraction of the coffee or tea. This mineral content can create films and/or cause corrosion on the mechanical components of the machine, which can lead to costly repairs and/or high maintenance costs. The systems described herein separate the two effects of temperature and pressure by maintaining the hot water under low pressure, adding the low pressure water to the coffee or tea grinds, and then adding a high-pressure gas (such as air) to the brewing chamber to create the pressure needed for proper extraction. Controlling high-pressure air by itself is a well-proven technology and requires little maintenance. Controlling hot water at low pressures is also known and can be done with considerably less maintenance and at a lower cost than controlling the high-pressure/high-temperature water used in typical espresso machines. The mechanisms described herein for separating high temperature inputs and high-pressure inputs are not limited to application in automated beverage kiosks, such as those described herein, but may be applied to any type of espresso, coffee, or tea producing machine, in different embodiments. They may also be applicable to other processes that typically require hot water under high pressure.

As previously noted, a load cell that is used to determine the rate of espresso generation may also be used to dispense ingredients by weight. For example, additives, milk products, and various combinations of milk products (e.g., combinations that create milk having products with a particular fat content) may be dispensed into a container using the same weight-measuring device to determine how much of each to dispense. For example, by combining different amounts of milk products that each include a different fat content, the system maybe able to create a milk product having any desired fat content, while minimize the types of milk that must be stored in the system. In some embodiments, ice may also be dispensed by weight. In other words, a load cell may be used to control dispensing liquid and/or solid additives, and may also provide feedback to tune the machine in order to maintain the process and/or the consistency of the output. For example, feedback from the load cell may be used to determine that the size of the grind should be adjusted after weighing the amount of espresso that is output over time.

In some embodiments, the filter employed in the systems described herein may have pores at 1 micron (rather than at 70 microns, as with some existing systems). Therefore, the filter may pull out more of the fine grind that could ruin the taste of the drink. The purity of the coffee and its shelf life may be directly dependent on the grind that is left in the beverage. The systems described herein may produce less waste than existing systems and, in some embodiments, may brew only what is needed (and only on demand). In some embodiments, even if more coffee is brewed than will be consumed at any given instant in time, the remaining beverage may have a longer shelf life than in existing systems due to the reduction of contaminants (e.g., grinds) in the beverage. Additionally, the coffee may be brewed faster than in existing systems by using the mechanisms described herein. In some embodiments, the use of a fine filter may also improve the shelf life of pre-brewed and cooled iced coffee.

In some embodiments, steam may only be created when it is needed. Typically, an espresso machine includes a steam generation tank in which the water and steam are maintained above the boiling point (e.g., at approximately 280° F.). This may create an even more toxic environment than the hot water tank used in typical espresso machines. The valves and equipment associated with the steam generation require constant maintenance on a typical espresso machine. In some embodiments, the systems described herein may employ an industrial steam generator, which may be more reliable than a steam generation tank because it is not constantly maintained under high temperature and pressure. The industrial steam generator may use less energy and have lower maintenance requirements than typical steam generation tank. For example, the valves for the industrial steam generator may be less expensive than in existing systems because they do not need to operate under constant high pressure. Instead, the systems described herein may not enter a high-energy mode until they sense the presence of a customer. In other words, the systems described herein may maintain the temperature of the apparatus below the boiling point, and may ramp up as the customer is potentially ordering a beverage. This may allow the system to consume an optimally low amount of energy.

In some embodiments, the beverage generation apparatus described herein may provide the ability to change the flavor of the resulting coffee. For example, the system may include multiple grinders and/or hoppers that dispense different beans and/or beans with different roast profiles, which may be directed into one of multiple brew tubes, and/or may be ground to one of multiple grind sizes. In some embodiments, a specific amount of coffee to be dispensed may be specified (which may determine the amount of time that the grinder is on). By controlling these and other variables, one machine may be used to produce many coffee bases. Various combinations of additives that may be selected on top of these options may give the customer a considerable number of options for a finished beverage. In addition, latte art may be created with espresso or additives using cup actuators and/or solid additives that are dispensed through similar actuators, in some embodiments.

In some embodiments, in order to sense the temperature of the brewed beverage, a sensor may be employed under the cup. To enable the sensor to work properly, the cup bottom may be made of different material than the rest of the cup. In some embodiments, the system may include a smart sensor that understands what type of material the cup bottom is made of, in order to enable proper temperature sensing.

In some embodiments, the beverage generation system described herein may be programmed or otherwise configured to maintain a certain stock of pre-prepared drinks such as iced coffee, iced espresso, iced tea, etc. In such embodiments, the may recognize when stock of a particular drink drops below a desired inventory level. During times when the machine is not fully occupied with preparing drinks for customers, or when the controller (or controlling software) recognizes that the machine should replenish its supply of certain pre-prepared drinks, the machine may be commanded to brew particular drinks. In some embodiments, the controller (or controlling software) may be cognizant of demand (e.g., current demand and/or historical demand for various beverages) and may cause the machine to speculatively or preemptively prepare a drink (e.g., iced tea or coffee, or even brewed coffee) on behalf of a customer or in order to fulfill on order for beverages that was place (e.g., pre-ordered) remotely (e.g., online or through a smartphone application). For example, the controller (or controlling software) may effect the production of brewed coffee in one-gallon boxes for a customer that pre-ordered the coffee online, and/or may effect the production of various beverages that it can store in anticipation of a imminent need for those drinks. In some embodiments, speculative or preemptive beverage generation (or brewing of a coffee or espresso base) may be performed when the machine is not otherwise occupied (e.g., during dead cycles).

In general, the beverage generation machines described herein may be capable of brewing and storing drinks and/or partially completed drinks or drink bases made from any "dried plant material". Demand for the brewed plant material may be based on the weight of the stored material (or based on the calculated volume of the material), as well as a long-term anticipation of demand, in various embodiments.

Cold Beverages, Refrigeration and Pressure

In some embodiments, multiple elements of an automated beverage generation kiosk may require refrigeration or cooling, and the entire system may include multiple compressors for those purposes. In other embodiments, one or more subsystems that require cooling may share a common cooling source. In one example, a single compressor for refrigeration may create ice. The ice may be stored in a chamber that also contains the tubes used to convey and dispense various liquids stored in the refrigeration chamber. The refrigerated liquids may include one or more dairy products, such as milk or cream. In some embodiments, the ice generated by a single compressor may be dispensed into final drinks, and may also be used to maintain milk products (or other ingredients that require refrigeration) at a safe temperature. In some embodiments, the ice may also be used to cool the dairy dispensing mechanism in order to maintain a safe operating environment for the milk. In some embodiments, the ice may also be routed in the machine and/or stored in the machine in a manner in which it surrounds, or is stored adjacent to, a storage container (similar to an ice box). In this way, the ice may perform the function of cooling the ingredients in the container. In some embodiments, ice that is to be dispensed into a customer's cup may be maintained separately from ice used for other cooling functions, which may minimize the clean-in-place requirements.

In some embodiments, a heat exchanger may be attached to the structure that contains the ice. Air from the inside of the kiosk may be circulated through the heat exchanger. The heat exchanger may then act to both cool and dehumidify the ambient air in the kiosk. In other words, in some embodiments, all of the cooling requirements (generation of ice, milk temperature maintenance, cold storage, environmental air control, etc.) may be sourced through one compressor, which may be located outside of the kiosk. For example, the compressor may be mounted outside of a closed compartment that houses some or all of the other process modules making up the automated beverage generation system. The use of a single compressor for multiple functions may in some embodiments reduce the energy consumed by the system, and may simplify its maintenance and/or reduce the overall cost of the machine or its operations.

In some embodiments, an automated beverage generation kiosk may include mechanisms that enable multiple ingredients to be dispensed in liquid form. In existing systems, the complexity associated with many dispensing mechanisms can lead to a significant number of failure points. However, the machines described herein may utilize a compressed air source (e.g., one that is also used for the espresso process) for dispensing liquid ingredients. In some embodiments, the air may be regulated to provide pressure in one or more compartments (each of which may be under a different amount of pressure) through the use of additional regulators. In some embodiments, some or all of the liquid ingredients may be stored in an icebox or another type of cooler. In some embodiments, the system may use a single source of pressure (rather than multiple pumps) to provide a primary and secondary storage under pressure. Liquids may move between the two simply due to the difference in pressure. This mechanism may require fewer moving components than a mechanism that relies on multiple pumps. In some embodiments, the same pressure source that is used to dispense liquid ingredients and/or that is used in the espresso process may also be used to drive the actuator(s) for moving the cup and any other moving parts in the machine.

In some embodiments, the system may include a tank containing nitrous oxide that can used to dispense and/or make whipped cream via a simple actuator. This may provide the automated coffee/beverage kiosk with the ability to dispense whipped cream as an optional additive to any of the beverages it generates. In some embodiments, the pressure of the whipped cream dispenser may be monitored remotely.

Cleaning Process

In some embodiments, an automated espresso machine may employ an ultrasonic cleaning process for cleaning various components of the machine, including the filter and the chambers of the espresso unit. As described herein, the filter may be cleaned using a combination of a backflow of fluid and an application of ultrasound waves to dislodge any particles (e.g., coffee grinds) and flush them away. The fluid used in the cleaning process may be water or any other type of solution that is capable of accelerating or causing the dislodging or dissolving of the waste particles. In some embodiments, the cleaning process may be aided by the use of heat. For example, heating the filter may aid in cleaning and dislodging and dissolving of the waster particles.

In some embodiments, heating the brewing chamber during the cleaning cycle may result in the pre-heating of the chamber for the next brewing cycle. In some embodiments, the brewing chamber may be maintained at a specific temperature by means of a heating element. To maintain a consistent temperature across the length of the brew tube, multiple types of materials may be used to distribute the heat evenly, reducing the risk of hotspots in the brewing chamber. In some embodiments, the chamber may be constructed using multiple laminated layers of various metals. For example, the interior of the tube may be stainless steel, while the exterior may be wrapped in copper. In some embodiments, the energy introduced to the heating element may be controlled through a proportional-integral-derivative (PID) control loop that includes one or more temperature sensors on or in the brewing chamber.

In some embodiments, the cleaning process may be carried out in two or more phases, with the final phase being performed immediately before the next brewing cycle in order to achieve both the cleaning effect and the pre-heating of the chamber for the next brewing cycle. In some embodiments, the cleaning process may make use of a cleaning chamber that is common to the steam wand, the espresso chamber (including the filter) and the additive dispensers. The cleaning chamber may be on a rotating plate or an XYZ actuator that may be controlled (e.g., by the master controller) to move it into place for cleaning. The cleaning chamber may include one or more spraying jets that pre-spray the object being cleaned at an angle while filling the cleaning chamber and/or creating turbulence to aid in the cleaning process. In other words, the cleaning process may include a spraying process, turbulence, and/or ultrasonic processes. In some embodiments, the cleaning chamber and the mixing chamber may use the same actuator and/or may be co-located on the same rotating plate or XYZ actuator.

Figure 16:
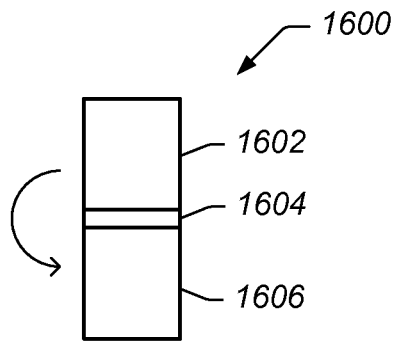
FIG. 16 is a block diagram illustrating the flipping motion of a brewing chamber from a brewing position to a cleaning position, according to one embodiment.
Figure 17:
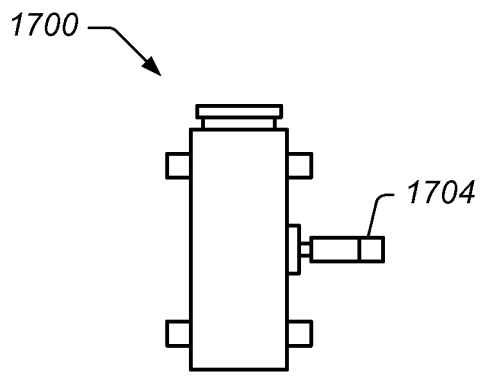
FIG. 17 is a block diagram illustrating a mechanism for rotating a brewing chamber, according to one embodiment.

FIG. 16 illustrates the flipping motion of a brewing chamber 1600 from a brewing position to a cleaning position, according to one embodiment. In this example, the brewing chamber includes an upper chamber (1602) and a lower chamber (1606) separated by a filter (1604). When the brewing chamber (1600) is flipped, the upper chamber for the brewing process becomes the lower chamber during the cleaning process, and the lower chamber for the brewing process becomes the upper chamber during the cleaning process. One mechanism for rotating the brewing chamber is illustrated in FIG. 17. In this example, the rotating mechanism (1704) may be used to rotate a brewing chamber 1700. The rotating mechanism may include a motor (e.g., a stepper motor or a DC motor) and a gearbox reducer (i.e. a rotary gear actuator), in some embodiments. The rotating mechanism may or may not include support on both sides of the brewing chamber, in different embodiments.

Figure 18:
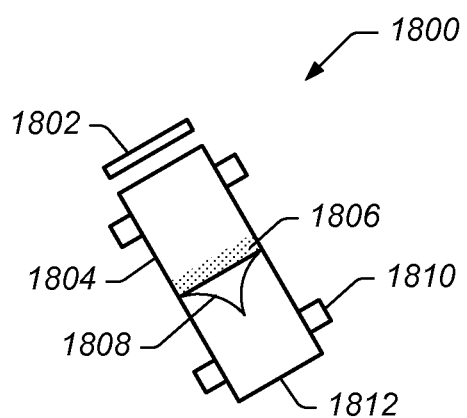
FIG. 18 is a block diagram illustrating a brewing chamber as it rotates, according to one embodiment.

FIG. 18 illustrates a brewing chamber 1800 (such as any of the brewing chambers described herein) as it rotates. In this example, the brewing chamber (1800), which includes an upper chamber 1804, a lower chamber 1812, and a sintered filter (1808), contains a coffee or espresso puck 1806. As in other examples, one or more ultrasonic transducers (e.g., transducer 1810) may be attached to the brewing chamber (1800) and may be activated to accelerate various operations involving the brewing chamber (1800). The brewing chamber 1800 may be rotated or otherwise maneuvered into one position to receive grinds, into a second position to be aligned with a tamper, and into a third position for performance of an extraction process. The upper chamber (1804) may become the lower chamber during a cleaning process if the brewing chamber (1800) if flipped upside down for the cleaning process.

Figure 19:
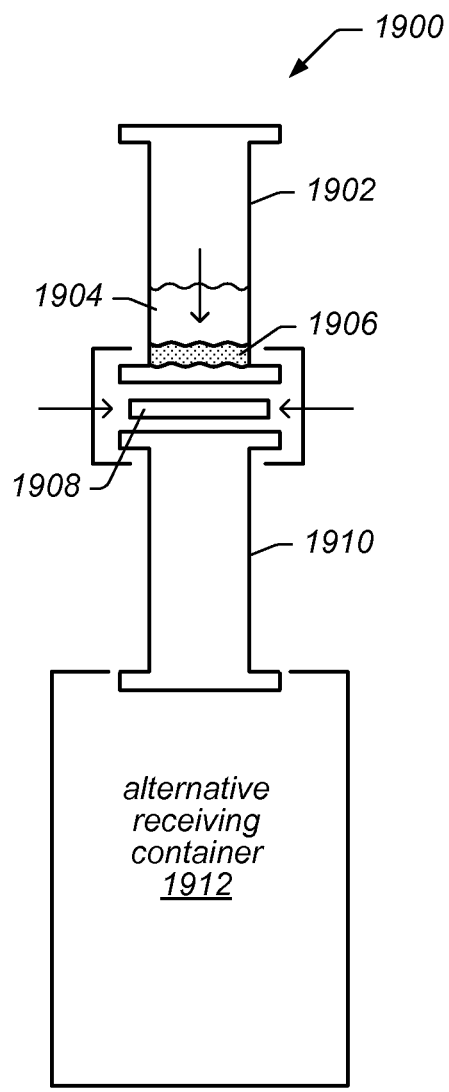
FIG. 19 is a block diagram illustrating an espresso unit in which the brewing chamber has been rotated in preparation for cleaning, according to one embodiment.

FIG. 19 illustrates an espresso unit 1900 after the brewing chamber has been rotated on the center axis (shown by the horizontal arrows in FIG. 19) in preparation for cleaning. As illustrated in this example, an alternate receiving container 1912, which may also be referred to as a CIP (clean-in-place) chamber or cleaning tank, is raised into position during the CIP process. In this example, the CIP process includes introducing additional water and/or a cleaning solution into the upper chamber 1902 (which was the lower chamber during the brewing step). Once the water or cleaning solution (1904) is introduced into the upper chamber (1902), water jets from the CIP chamber (1912) may be turned on, and high pressure (e.g., high-pressure air) may be introduced in the upper chamber (1902), shown as the downward arrow in FIG. 19. In some embodiments, ultrasonic transducers (not shown) may be attached to the exterior of the brew tube, and may be energized during the cleaning process (e.g., to accelerate the process). The coffee puck (1908) that was formed during the brewing cycle may be ejected from its location at the upper part of the lower chamber (1910) by high-pressure air. As the puck is expelled by the impulse of the high-pressure air, it may be pulverized by the CIP water jets, after which the grounds may be returned into a suspension in the CIP water, and expelled through a drain in the CIP chamber (not shown) to be delivered as waste (e.g., to a waste storage receptacle or to a waste water service system).

Figure 20:
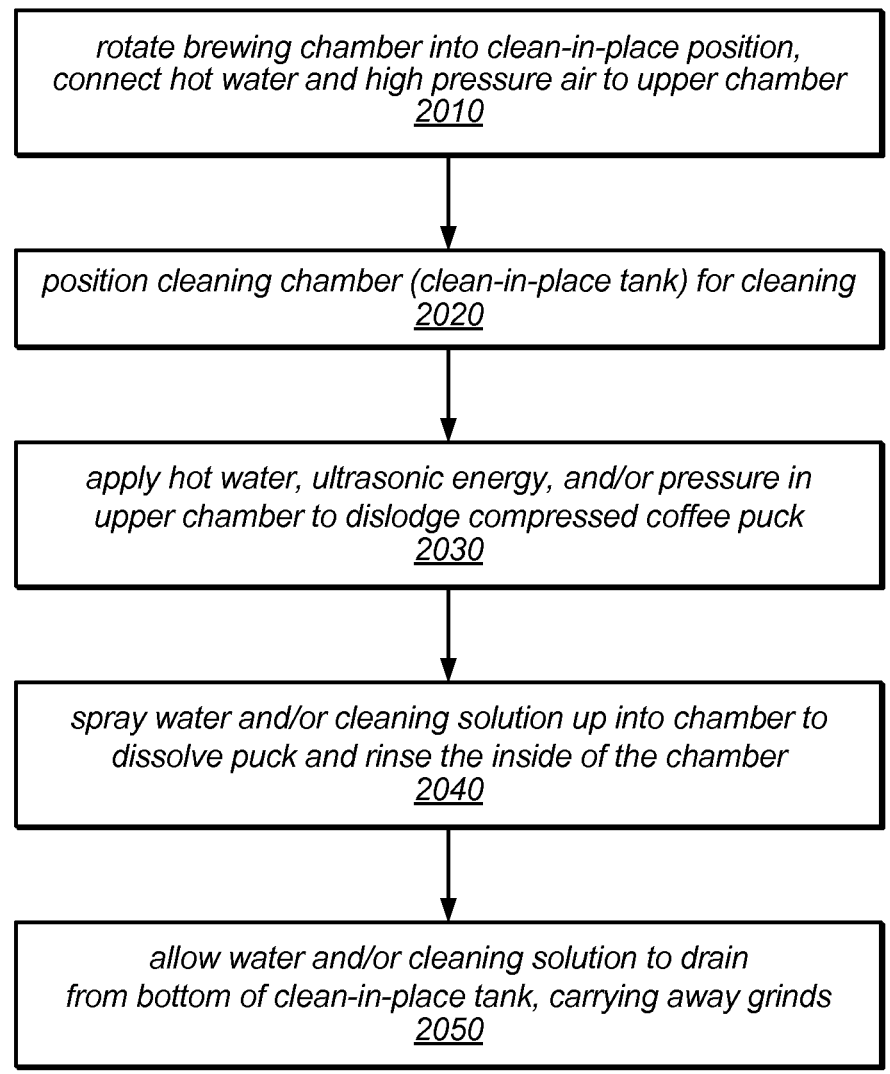
FIG. 20 is a flow diagram illustrating one embodiment of a method for performing a cleaning process in a beverage brewing system.

One embodiment of a method for performing a cleaning process in the beverage brewing system described herein is illustrated by the flow diagram in FIG. 20. As illustrated in this example, the method may include rotating a brewing chamber into a clean-in-place position, and connecting (or re-connecting) hot water and high-pressure air to the upper chamber, as in 2010. For example, in some embodiments, after a brewing cycle is complete, an espresso tube may be rotated (vertically) by 180 degrees in preparation for the clean-in-place (CIP) process. In some embodiments, the method may include positioning a cleaning chamber (which may also be referred to as a clean-in-place tank) for cleaning, as in 2020.

As illustrated at 2030, the method may include applying hot water, ultrasonic energy, and/or pressure in the upper chamber to dislodge the compressed coffee puck. The method may also include spraying water and/or cleaning solution up into the chamber to dissolve the compressed coffee puck and to rinse the inside of the chamber (as in 2040) and then allowing the water and/or cleaning solution to drain from the bottom of the clean-in-place tank, carrying away the grinds (as in 2050). In some embodiments, the method may include opening and closing a drain valve repeatedly and/or periodically during a cleaning operation to let the cleaning tank fill up and then drain, while in other embodiments the drain valve may be left open during the cleaning process such that the rinse water or cleaning solution is drained continuously as the apparatus is cleaned.

Figure 21:
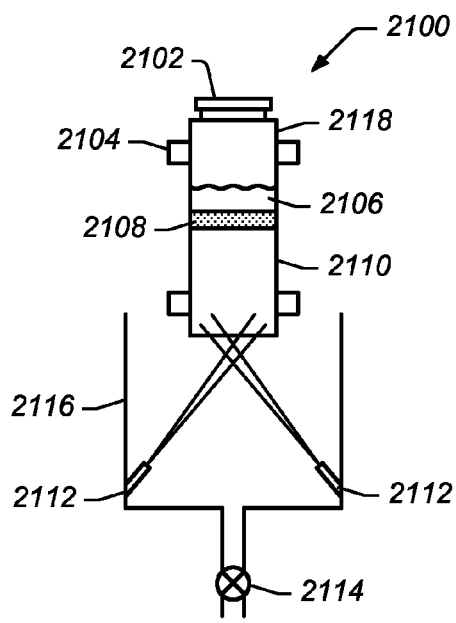
FIGS. 21 and 22 are block diagrams illustrating a clean-in-place process, according to one embodiment.
Figure 22:
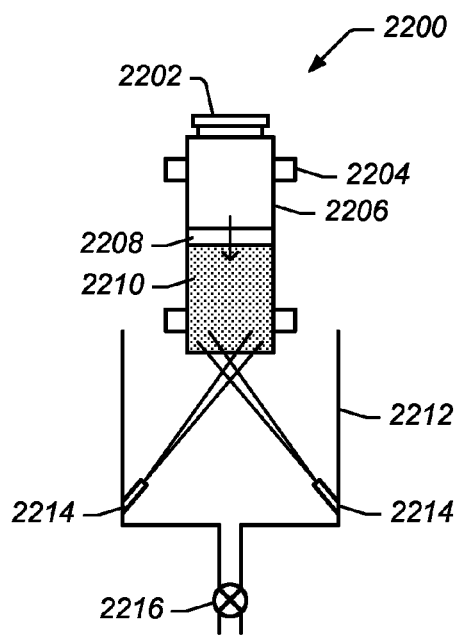

The clean-in-place process described above may be further illustrated by the block diagrams in FIGS. 21 and 22. For example, FIG. 21 illustrates a brew tube (2100) that has been rotated 180 degrees from its position during a brewing cycle in preparation for cleaning the apparatus between brewing cycles. In this example, the (now) upper chamber (2118) has been re-connected to the high temperature water source and the high-pressure air source used in the brewing process (not shown). In this example, hot water is dispensed into the upper chamber (2118) and is shown as 2106, ultrasonic transducers attached to the brew tube (e.g., four ultrasonic transducers, including 2104) are engaged, and the air pressure is increased in the upper chamber (2118) to the point at which the coffee puck (2108) produced during the previous brewing cycle is dislodged from the filter (not shown). Note that the upper chamber 2110 may be sealed (e.g., a seal 2102) during a cleaning cycle. At the same time, CIP jets, or cleaning spray nozzles (2112) direct streams of liquid (e.g., water, cleaning solution, or another liquid) up into the (now lower) chamber (2110). This water or other liquid dissolves the coffee puck (2108), allowing it to drain to waste (e.g., by opening drain valve 2114) or be pumped to waste. The CIP jets may continue to operate to rinse off the inside of the brewing chamber (2100), preparing it for the next brewing cycle. In various embodiments, the cleaning solution used may be water, a chemical solution, or a mixture of water and a chemical solution. In some embodiments, the cleaning solution may include a sequential combination of water and a chemical solution (i.e. one and then the other liquid may be sprayed inside brewing chamber 2100 in order to clean it). In some embodiments, as the brewing chamber is being cleaned, a drain valve (2114) may at some points be engaged to close off the flow of water, allowing the CIP jets to fill the cleaning chamber (2116) for additional cleaning.

FIG. 22 also illustrates a portion of the clean-in-place process, according to some embodiments. In this example, coffee grinds are being released from the filter 2208, and are being dispersed in the water or cleaning solution (2210) by the CIP jets 2214 in the cleaning chamber 2212. Note that these CIP jets (2214) may be used for other purposes after the brewing chamber 2200 is inverted following the cleaning cycle. Note also that in some embodiments, a cleaning process may include expelling the coffee puck using compressed air and sending it to a storage compartment (e.g., for later disposal to waste or recycling), and then performing a liquid rinse and or CIP process to remove the remaining grinds (e.g., through drain valve 2216). As illustrated in this example, the upper chamber (2206) of the brew tube 2200 may be sealed (e.g., by a seal 2202) during the cleaning cycle. As in previous examples, the cleaning process may in some embodiments be accelerated by engaging one or more ultrasonic transducers that are attached to the brew tube (e.g., transducer 2204). Once the cleaning cycle has been completed, the brew tube may be rotated back by 180 degrees, in preparation for the next brewing cycle.

Profiling of the Process

An espresso, coffee, or tea extraction process comprises a sequence of discrete and interrelated chemical and mechanical processes that result in the creation of multiple compounds in the resultant brewed beverage. Some of these processes result in beneficial or desirable taste and body/or properties of the final drink, while other processes may produce compounds that are generally not desirable in the final drink, such as the bitter flavors associated with poorly processed coffee or teas. Based on knowledge of when, how, and under what conditions each type of compound is created, a process may be developed to amplify the effects of specific beneficial chemical and/or mechanical processes and to de-emphasize (or mitigate the effects of) other processes whose results may be undesirable. In some embodiments, one or more of the chemical or mechanical process preformed by an automated beverage generation system (such as those described herein) may utilize varying pressures at various points in the process, as well as the application of ultrasonic energy (e.g., a particular points in time, frequencies, and/or intensities) to target specific processes whose effects should be emphasized. In some embodiments, these and other techniques to apply various adaptations to the basic chemical and/or mechanical processes of the system may enable the acceleration of some processes. For example, one or more ultrasound pulses may be applied in the system to accelerate the release and/or removal of $CO_2$ from the grinds early in the extraction process, which may allow the next step in the process to begin earlier in the extraction flow.

An extraction process includes a sequence of reactions and steps, some of which take longer than others. In some embodiments, the acceleration of some of those reactions or steps may increase the efficiency of extraction, which may result in a more complete extraction. By performing a more complete extraction, the system may use a smaller amount of coffee to create the same product than the amount of coffee that a process that includes a less efficient extraction would use. This acceleration of the extraction process may allow extraction to be performed in less time than an extraction process that has not been so accelerated. This may translate into a higher efficiency for the machine overall, and into a shorter wait for the customer. In some embodiments, by the acceleration of certain steps or processes, the particular results of those reactions or steps may be magnified. In some embodiments, the use of selective acceleration or other adaptations of various processes may allow the system to modify the resulting flavor of the drinks it produces to create multiple types of flavored drinks from the same bean source. For example, the system may produce darker and/or more acidic drinks using a more complete extraction process, or lighter drink using a less complete extraction process. In some embodiments, multiple-variable profiles may be developed and/or graphed for various processes, and may be used to optimize those processes in accordance with those profiles to achieve a desired result.

Figure 23:
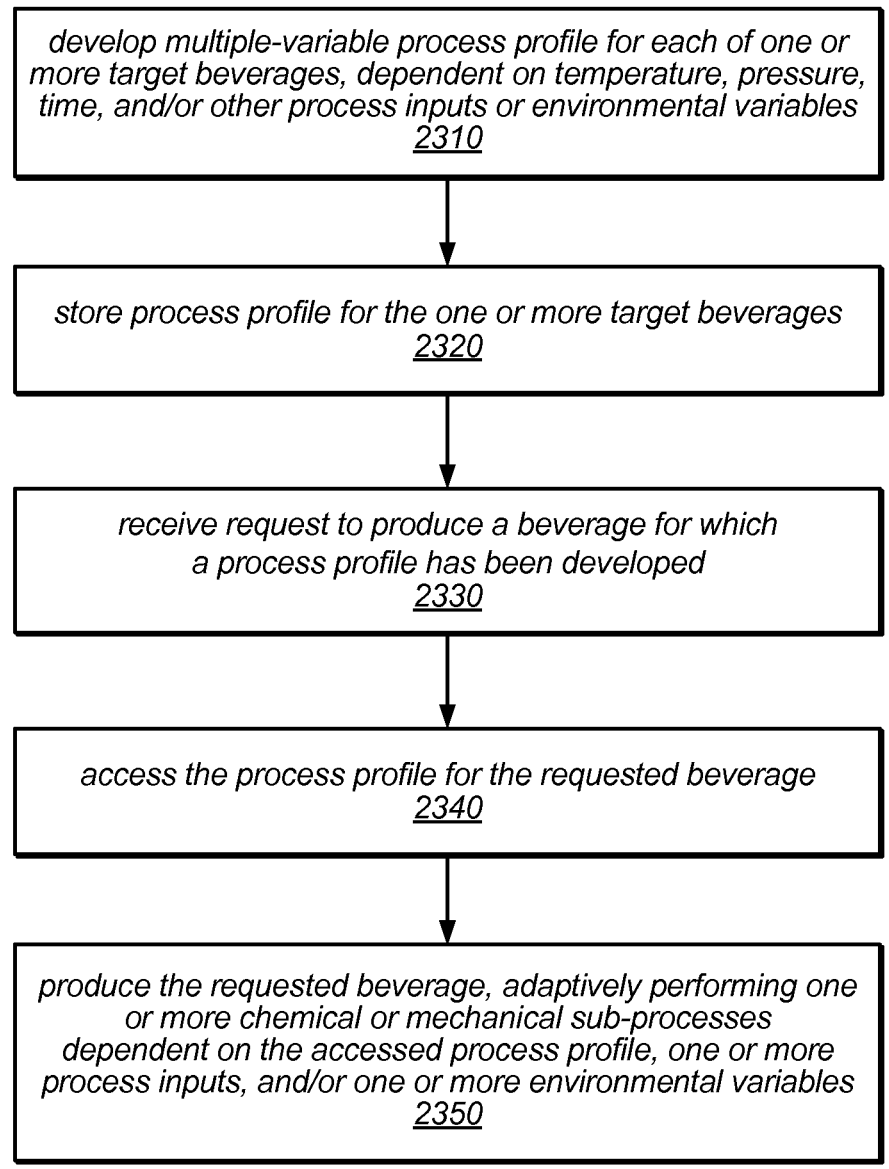
FIG. 23 is a flow diagram illustrating one embodiment of a method for producing brewed beverages according to a multiple-variable process profile.

One embodiment of a method for producing brewed beverages according to a multiple-variable process profile is illustrated by the flow diagram in FIG. 23. As illustrated as 2310 in this example, the method may include developing a multiple-variable process profile for each of one or more target beverages or for various processes used to produce those beverages, dependent on temperature, pressure, time, and/or other process inputs or environmental variables. For example, process profiles may be developed (e.g., empirically) for each of the processes involved in producing a beverage using a particular recipe and/or in order to achieve a desired qualitative result (e.g., a particular taste, such as bitter, dark, etc.). The method may include storing the process profile(s) for the one or more target beverages or processes, as in 2320.

In response to receiving a request to produce a beverage for which a process profile has been developed (as in 2330), the method may include accessing the process profile for the requested beverage as in 2340. The method may then include producing the requested beverage, adaptively performing one or more chemical or mechanical sub-processes dependent on the accessed process profile, one or more process inputs, and/or one or more environmental variables (e.g., as temperature, pressure, volume, milk fat, or other variables), as in 2350.

Figure 24:
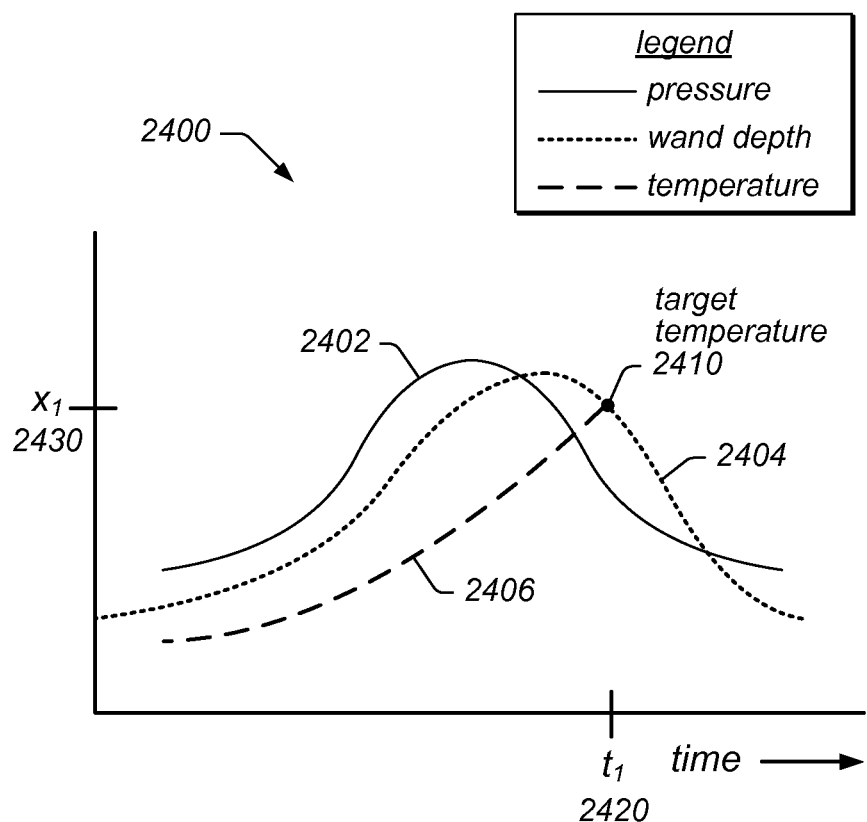
FIG. 24 is a process optimization graph illustrating a multiple-variable optimization profile for a frothing process, according to one embodiment.

FIG. 24 is a process optimization graph illustrating a multiple-variable optimization profile for a frothing process, which maps temperature vs. pressure and steam wand depth over time (e.g., during the time it takes to perform a frothing operation). In this example, to reach the target temperature $x_1$ (shown as 2430, and corresponding to the temperature at point 2410 on the dashed curve 2406), the steam wand depth may be varied over time according to the dotted curve 2404, and the pressure in the system (or in the steam wand) may be varied over time according to the solid curve 2402. By varying the wand depth and pressure according to this profile, the target temperature $x_1$ (2430) may be reached at time $t_1$ (2420) in this example. Similar multiple-variable process profiles may be developed and applied in the systems described herein to obtain a desired result of a profiled process (e.g., a target temperature) while the value of one or more of the variables changes during performance of the profiled process.

Interface/Communication

The beverage generation systems described herein may include an automated storefront that implements multiple innovative mechanisms for interfacing with customers, and for solving issues related to customers waiting in line for requested products to be produced. In some embodiments, the system may queue up a customer's order based on observed time patterns (e.g., the customer's demand history), or a pre-programmed desire (e.g., a pre-order that was placed remotely or a standing order). For example, a customer may have a regular schedule and may want a specific drink prepared at the same time or with the same time interval each day. In some embodiments, a software application accessed online, a mobile application (e.g., accessed through a smartphone), and/or a software application accessed through various input mechanisms at the automated kiosk or on other device may allow multiple customers to order beverages simultaneously. In some embodiments, multiple drinks may be ordered at once by one or more customers. In some embodiments, to keep track of multiple orders (e.g., while they are being processed or scheduled for processing), each individual drink (e.g., each cup of coffee or other beverage) may have its own identifier (ID). In addition, a unique ID may be created for each specific recipe, and these IDs may be used by customers to share their recipes using any type of electronic or physical means. For example, social networks or specific applications for desktop computer, or mobile phones or computers may allow customers to share drink recipes or to share their thoughts about a particular drink (e.g., while identifying the drink by the unique ID associated with its recipe).

In some embodiments, the system (or a software application associated with the system) may be configured to allow people to electronically send other people drinks (e.g., an electronic coupon, voucher, receipt, or gift certificate that allows the recipient to receive a specific drink or the drink of their choice). These electronic "drinks" may be gifts exchanged between individuals, or may be promotions by the owner or operator of the automated kiosk, or by a neighboring business as part of a promotion. For example, and nearby dry cleaner may run a promotion in which they offer a special on dry cleaning and buy their customer a drink at the kiosk. In some embodiments, customers may be able to share a celebrity drink. In other words, publicity may be crated for a celebrity by announcing that their favorite drink recipe is available either on at the kiosk, through a web or mobile application for the kiosk, or on the celebrity's social media or web site. Just as celebrities are often imitated in terms of their hairstyle, dress, etc, this may allow their public to taste just what the celebrity tastes.

In some embodiments, a customization option may allow an end customer to create their own latte art using commercially available or custom software and formatted data, or using a proprietary application that allows the customer to draw their own latte art (which may be output as a data file formatted for use at the kiosk). The file may be interpreted by the robot at the kiosk (e.g., by the controller that controls the actuators and/or other mechanical components that are manipulated to create the latte art). For example, the resultant art may be presented on the top of the foamed milk by moving the cup around below the stream of espresso as it is created or dispensed.

In some embodiments, the automated kiosk may include a chamber in which to perform the mixing of the fluids. After being mixed in the mixing chamber, the fluids may be poured into the final serving cup, which may be dispensed by the kiosk or may be supplied by the customer. In some embodiments, a customer may be able to their own cup, e.g., a cup that contains an RFID tag that identifies the customer, his or her drink formula or preferences, and/or any other customer specific information or preferences. In some embodiments, the system (or an owner or operator thereof) may issue proprietary cups that the kiosk recognizes without touching them (e.g., using RFID technology or other wireless or optical techniques). In general, the automated kiosk may be a coffee machine that recognizes the customer in one or more ways: using RFID tags on cups, using RFID tags in or on the customer's car (e.g., in a drive-through location), using plastic cards with magnetic stripes, using smart cards, using facial recognition, using voice recognition, using mobile device applications (such as "bump"), using optical recognition (such as license plate recognition software), and/or using a unique ID as entered on a keyboard or key pad.

There may be various potential opportunities for customer dissatisfaction relating to waiting in line at a kiosk. Of particular concern may be the situation in which a regular customer is standing in line while a new customer in front of them tries to figure out how or what to order. For some kiosks, the majority of sales may come in a small number (e.g., one or two) focused time slots of high demand, during which customers may have to wait longer for their drinks. In addition, it takes a certain amount of time to process espresso and other brewed drinks, and that time requirement may be detrimental to customer satisfaction, given the variety of combinations of different sizes and ingredients that may be available to each customer. Some kiosks may include only a single touch screen on which customers can place an order at the kiosk itself. However, one element of redundancy in the system may be its Internet connection, through which multiple orders may be received.

The systems described herein may provide a variety of mechanisms to reduce or mitigate customer dissatisfaction due to these and other inconveniences. For example, in some embodiments, the system may be configured to allow customers to order ahead (e.g., to pre-order before arriving at the kiosk or while standing in line) on the web, through a smartphone application, by sending a text message, or using other electronic, wired, or wireless communication methods. Allowing customers to utilize their own screens for placing orders, in addition to those provided at the kiosk, may allow multiple orders to be placed at once. In some embodiments, the system may include one presenter for delivering walk-up orders (e.g., in the order in which they were entered at the kiosk) and a second presenter (e.g., a "will-call" presenter) configured to deliver drinks ordered remotely.

In some embodiments, the system may include multiple instances of the process sub-modules for the slower process (e.g., steamers and espresso tubes) in any one kiosk. These sub-modules may also form redundancy in case of the malfunction of any one instance of the sub-modules. In some embodiments, the system may implement any of a variety of scheduling and prioritizing algorithms (which may be reminiscent of scheduling algorithms used in multi-thread, multi-core computer processing) that allow one kiosk to process multiple drinks at once. For example, in these systems, resources may be shared between two or more process modules and/or for the production of different types of beverages (at the same time or at different times). The system may include one or more shared staging areas in which partially and/or fully completed drinks may be stored.

In some embodiments, in addition to storing information about their favorite drinks (e.g., the identifiers of the recipes of their favorite drinks) in a local or remote database that is accessible to the kiosk, customers may be able to store information about their preferred delivery time(s) and/or favorite location(s). In some embodiments, the system may speculatively or preemptively schedule the production of a beverage for a regular customer or for an anticipated demand based on customer-specific, or location-specific (e.g., kiosk-specific) demand history. For example, a commuter who always takes the 8:15 train may have their favorite drink ready and waiting for them at 8:43 at the top of the escalator at their subway stop. In this case, the processing time from the customer's perspective may be on the order of 10 seconds. For example, when they reach the kiosk, they bump their smartphone, and the drink (which was already generated and then stored in a staging area) is presented.

In some embodiments, the response time for a walk-up customer may not be impacted by the variety of ordering options described above, because the system may prioritize walk-up orders over speculative orders and pre-orders (i.e. "will-call" orders). In such embodiments, walk-up orders may receive the highest priority, and production of any "will-call" orders that are being processed when a walk-up order is placed may be paused to allow production of the walk-up order to advance quickly through the required steps. In some embodiments, the priority of time sensitive drinks (such as espresso) may be raised as their target delivery time approaches.

Figure 25:
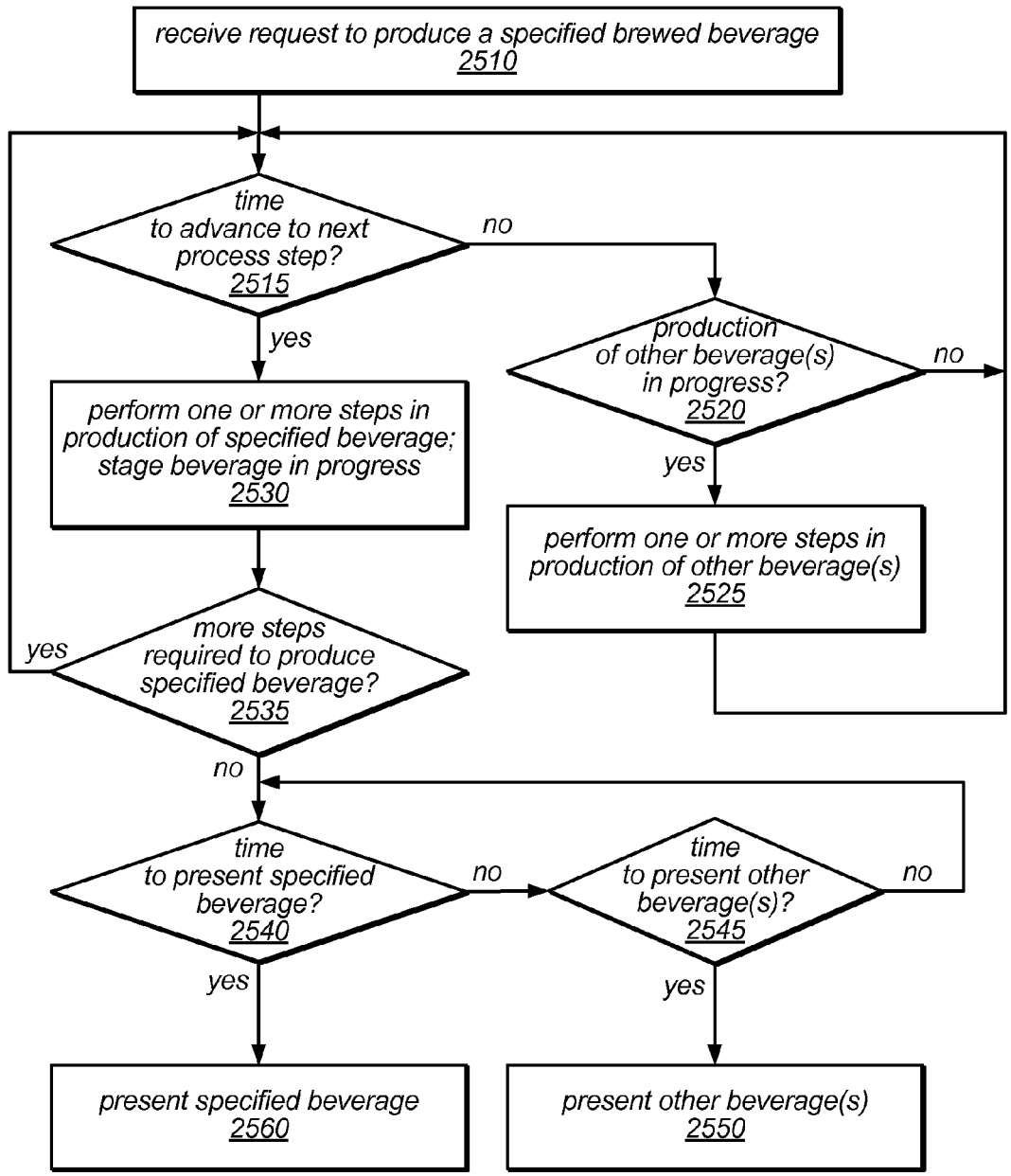
FIG. 25 is a flow diagram illustrating one embodiment of a method for scheduling and carrying out the production of brewed beverages.

One embodiment of a method for scheduling and carrying out the production of brewed beverages in a system such as those described herein is illustrated by the flow diagram in FIG. 25. As illustrated in this example, the method may include the system receiving a request to produce a specified brewed beverage, as in 2510. For example, a request to produce a beverage may be received through a user interface on an automated kiosk (e.g., by a walk-up customer) or may be received through an Internet connection (e.g., as an order placed remotely from a computer or smartphone through a web browser or ordering application). As illustrated in this example, the method may include the system (or a scheduler or master controller thereof) determining whether it is time to advance production of the requested beverage to the next process step (e.g., the next chemical or mechanical process) in its production flow, as in 2515. For example, if the order has just been received, the system (or the scheduler or master controller thereof) may be configured to determine whether it is time to begin processing the request dependent on a requested delivery time, the status of the system, the availability of the necessary raw ingredients, the number and/or type of other beverages currently being produced by the system (if any), the availability of resources needed to begin processing the request, and/or other factors.

If the system (or a scheduler or master controller thereof) determines that it is not time to advance production of the requested beverage (shown as the negative exit from 2515), but the production of other beverage(s) is in progress (shown as the positive exit from 2520), the method may include performing one or more steps involved in the production of one or more of the other beverage(s) in the meantime, as in 2525. If the system (or a scheduler or master controller thereof) determines that it is not time to advance production of the requested beverage (shown as the negative exit from 2515), but no other beverage production operations are in progress (shown as the negative exit from 2520), the method may include waiting for the system to determine that it is time to advance production of the requested beverage without performing any other beverage production processes. This is illustrated in FIG. 25 by the feedback from 2525 to 2515.

If the system (or a scheduler or master controller thereof) determines that it is time to advance production of the requested beverage (shown as the positive exit from 2515), the method may include performing one or more steps involved in the production of the specified beverage, as in 2530, and (in some cases) staging the beverage in progress (e.g., in a WIP staging area). If there are more steps required to produce the specified beverage (shown as the positive exit from 2535), the method may include repeating the operations shown as 2515-2535 until all of the steps required to produce the specified beverage have been performed. This is shown in FIG. 25 as the feedback from 2535 to 2515.

If, once the specified beverage has been produced (shown as the positive exit from 2540), the system (or a scheduler or master controller thereof) determines that it is not time to present the requested beverage (e.g., if the customer is not yet available to receive the specified beverage), but the system (or a scheduler or master controller thereof) determines that it is time to present other beverages (e.g., to other customers), the method may include presenting one or more other beverages for pick up. This is illustrated in FIG. 25 as the negative exit from 2540, the positive exit from 2545, and element 2550. If the system (or a scheduler or master controller thereof) determines that it is not time to present the requested beverage (e.g., if the customer is not yet available to receive the specified beverage), and that it is not time to present any other beverages, the method may include waiting until it can determine that it is time to present the requested beverage or one or more other beverages for pick up. This is illustrated in FIG. 25 as the negative exit from 2540, the negative exit from 2545, and the feedback to element 2540. If the system (or a scheduler or master controller thereof) determines that it is time to present the requested beverage, the specified beverage may be presented, as in 2560.

Remote Order Software

As previously noted, customers may interact with the automated beverage generation systems described herein using customer applications (e.g., applications for the web and/or for smartphones). In various embodiments, such applications may perform (or enable the system to provide) any of a variety of scheduling related functions, including any or all of those described below. For example, these applications may allow a customer to choose either the closest kiosk, or their favorite kiosk, as the kiosk to produce their requested beverage(s). The applications may allow a customer to place an order for a single drink or for multiple drinks based on their own ordering history and favorite drinks, or from a menu of drinks available from the selected kiosk. In some embodiments, the applications may, based on GPS distance, routing, and/or traffic congestion information, enable the system to recommend a time and/or a location at which the drink(s) should be prepared and ready for pick up. The applications may allow a customer to select either their favorite time/location, or a time/location that was proposed by the system based on their location and other information (as described above). If no GPS information is available, or in the case of a web application, the customer may simply select from a list of favorite times/locations or may input that information directly or through a map based kiosk finder, in some embodiments.

In some embodiments, the applications may enable the system to take into account any lack of availability of the particular ingredients and additives or functions (e.g., due to the configuration of the equipment or the status or availability of various process modules) needed to process a specific drink at any location when recommending or accepting a particular kiosk order. In some embodiments, the information stored in a local or remote database about a customer's favorite drink may include a preferred location and/or retrieval time, which may be accessed by the applications to speed up a regular order (e.g., in the case of a commuter that has a regular schedule). Based on an algorithm that takes into account historical and current loads (e.g., current and historical demand for beverages), the scheduler software executing in (or on behalf of) the kiosk may determine when to start processing the drink in order to meet the scheduled delivery time. In some embodiments, the scheduling software may cause a text message to be sent to a customer when their order is complete and waiting, or the web or smartphone application may provide an indication to the customer when the order is complete and waiting. In some embodiments, the web or smartphone application may communicate the progress of a customer's order to the customer (e.g., the application may display this information graphically on the smartphone) or may communicate other information to the customer related to their order (e.g., it may suggest an alternative retrieval time to make sure the coffee is created shortly before they arrive).

In some embodiments, when a customer arrives at the kiosk, they may approach a "will-call" presenter (which may be a different presenter than a presenter under a touch-screen or other local ordering mechanism at which beverages for any walk-up customers are presented). To retrieve their order, they may swipe their loyalty card or bump their smartphone (for example, an iPhone® device) and the prepared drink may be presented right away in the "will-call" presenter. In some embodiments, if a "will-call" order includes multiple drinks, a load-cell in the presenter may recognize when each drink is picked up, and may retrieve the next drink from the staging area. This may allow someone to pick up a multiple drink order with no delay, and without causing a delay to any other customers in line. In some embodiments, when the load-cell recognizes the retrieval of a drink (or the last drink in a multiple drink order), this may trigger the display of a thank you message at the bottom of the digital signage on the kiosk to thank the "will-call" customer for their business.

As previously noted, there may be two or more lines or queues for the customers at the kiosk location. One or more may be for "will-call" customers, while the other(s) may be for retrieval of orders placed at the kiosk (e.g., on a local touch screen). In some embodiments, if for some reason, an order that has been staged for pick up is not picked up after a certain period of time, the order may be discarded, and a message may be sent to the customer (e.g. by text or through a web or smartphone application). If this is the first time this has happened for an order placed by a particular customer, a credit may be issued to the customer. If the customer who did not retrieve the order is a repeat offender, their account may be charged for the drink even though they did not pick it up. In some embodiments, if a customer arrives ahead of time (e.g., if they arrive prior to the target pick up time) and their order is not yet ready, the scheduler may raise the priority of their order so that it can be processed though the rest of the steps quickly.

Figure 26:
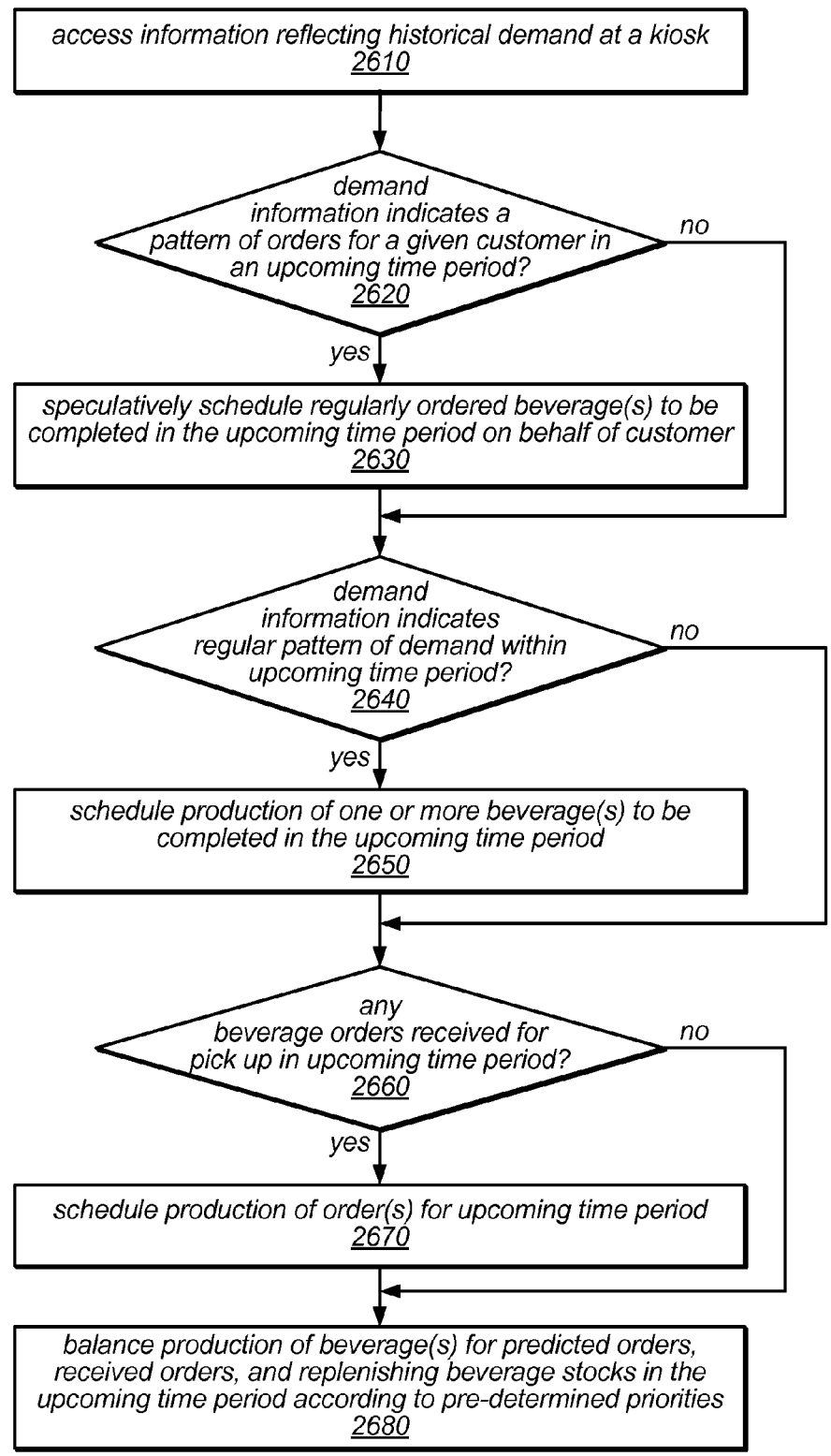
FIG. 26 is a flow diagram illustrating one embodiment of a method for scheduling and carrying out the production of brewed beverages based on demand history.

One embodiment of a method for scheduling and carrying out the production of brewed beverages based on demand history is illustrated by the flow diagram in FIG. 26. As illustrated in this example, the method may include accessing information reflecting historical demand at a given automated beverage kiosk, as in 2610. For example, in some embodiments, a local or remote database may store information about patterns of requests (e.g., the types of requests received and the times at which they are placed or are requested to be delivered) for each of a plurality of customers and/or for the system or kiosk overall). If the demand information indicates a regular pattern of orders for a given customer in an upcoming time period (shown as the positive exit from 2620), the system may be configured to speculatively schedule (or queue for scheduling) one or more regularly ordered beverage(s) to be completed in the upcoming time period on behalf of the customer, as in 2630. In other words, in some embodiments, the method may include speculatively placing an order on behalf of a customer if the system predicts that the customer will be placing the order (based on the customer's recent order history). For example, if the customer has placed an order for his favorite beverage to be delivered between 8:35 and 8:40 am on 10 consecutive days, the method may include preemptively adding an order for the favorite beverage into the scheduling queue with an expected delivery time of 8:35 am. If the demand information does not indicate a regular pattern of orders for any customers in an upcoming time period (shown as the negative exit from 2620), the system may not schedule any such speculative orders for delivery in the upcoming time period.

As illustrated in this example, if the demand information indicates a regular pattern of demand (for the kiosk as a whole) within an upcoming time period (shown as the positive exit from 2640), the method may include scheduling (or queuing for scheduling) a request to produce one or more beverage(s) to be completed in the upcoming time period, as in 2650. For example, if the demand information indicates that at least a given number of beverages of a particular type have been ordered between 7:00 am and 7:20 am every weekday for the past two weeks, the system may be configured to preemptively schedule the given number of beverages of the particular type to be ready for delivery at 7:00 am (e.g., to be stored in a finished product staging area in the case of cold drinks), or to preemptively schedule the given number of beverages of the particular type to be partially completed (e.g., to be stored in a WIP staging area by 7:00 am in the case of hot beverages or any beverage with a particularly time-sensitive recipe or finishing process). Similarly, if the demand information indicates that at least a given number of beverages that include the same base coffee have been ordered between 8:00 am and 8:30 am every day for the past three weeks, the system may be configured to preemptively schedule and produce enough of the common base coffee before 8:00 to satisfy the expected demand. If the demand information does not indicate a regular pattern of demand (for the kiosk as a whole) within an upcoming time period (shown as the negative exit from 2640), the system may not preemptively schedule or produce any beverages or base coffee for delivery in the upcoming time period.

As illustrated in FIG. 26, if any beverage orders have been received for pick up or delivery in an upcoming time period (shown as the positive exit from 2660), the method may include scheduling (or queuing for scheduling) production of one or more beverages for those orders for delivery in the upcoming time period, as in 2670. If no beverage orders have been received for pick up or delivery in an upcoming time period (shown as the negative exit from 2660), no requests for beverages may be scheduled (or queued for scheduling) based on explicitly received orders for beverages to be ready for pick up in the upcoming time period. As illustrated in FIG. 26, the method may include balance the production of beverage (s) for predicted customer orders, preemptive restocking of common orders, and/or received orders to be ready for pick up in the upcoming time period according to pre-determined priorities, as in 2680. For example, in some embodiments, the system may assign a higher priority to the production of beverages for walk-up customers and orders placed remotely than to beverages being speculatively or preemptively produced based on customer-specific or kiosk-specific demand history (e.g., drinks being made to stock an inventory of commonly ordered iced drinks, or coffee base being produced prior to an anticipate period of high demand). In other embodiments, a high priority may be assigned to stock production if demand is historically high or the stock is being rapidly depleted.

Kiosk Hardware and Software

In some embodiments, the systems described herein may be configured to process multiple beverage orders concurrently, rather than implementing a single thread coffee production process. This coffee production process may be reminiscent of the multithread processing performed by computer processors or computer operating systems. In some embodiments, when shared resources are idle because the production of one beverage cannot proceed until a particular resource is available, the scheduler may cause the machine to apply available resources to the production of another beverage or to production of one or more drinks for another order, and production of the other drink(s) may proceed until the particular resource is available and production of the beverage whose progress was stalled is able to continue (i.e. advance). In some embodiments, various elements of the espresso brewer (e.g., the frother, the liquid filler, and the ice handler) may be shared resources that may be required for the production of multiple beverages at a time.

Given the targeted demand for beverages (which may be based on historical demand information), some kiosks may include multiple instances of particular resources available to assist in balancing the work to be performed and to maximize overall throughput. For example, a given kiosk may include multiple espresso brewers and/or frothing units. In some embodiments, the master controller or scheduler may manage the efficiency of the process by correctly (and judiciously) allocating the appropriate amount of hardware to each order (or drink thereof) in order to optimize the performance and economics (e.g., in terms of resource utilization and throughput capacity) of the machine. In some embodiments, a kiosk may include multiple instances of those elements that are most likely to fail, adding redundancy into the system.

In some embodiments, the kiosk may include an in-process staging area and a completed order staging area for finished or partially finished drinks. In such embodiments, as the master controller or scheduler allocates resources to production of one drink and then another, the partially completed drinks may be retrieved from the in-process staging area so that production of those drinks can continue. In some embodiments, each order may be assigned to a specific location in the staging area by the scheduler. In some embodiments, the in-process staging area may resemble (or be thought of as) a grid of static cup holders (e.g., one with 2 rows and 8 columns of cup holders) in which partially completed drinks may be staged between process steps. A completed order staging area may have an arrangement similar to that of the in-process staging area or a different arrangement. A single order for multiple drinks (e.g., one placed by an office administrator on behalf of the office staff) may be assigned multiple locations in the staging area, and each drink may follow its own production process thread (multiple ones of which may be processed concurrently). Each of the staging areas may be divided into heated and cooled staging areas.

In some embodiments, each coffee processing function may be considered a sub-module resource, and the machine may be constructed as a modular framework in which multiple instances of a particular resource could be installed. For example, an espresso sub-module may include a rotary actuator, one or more ultrasonic transducers, a tamper, and a mechanism to access to the output of one or more coffee grinders. A example machine may include four espresso modules, three frothing stations, one ice handler, one filler, two empty cup storage modules, and one clean-in-place module.

In some embodiments, the master controller (or control software) for the kiosk may be configured to continuously assess the inventory of resources that are functioning and available, as well as the available consumable ingredients. In other embodiments, another controller (or microcontroller) may control all the functions within the kiosk (e.g., the scheduler). The scheduler may communicate with all of the available sub-module controllers, may issue commands to those controllers, may direct the movement of cups and/or may control various functions of the sub-modules.

The operations of the scheduled may be further illustrated by the following example scenario. In this example, there are multiple orders queued up, and a customer is working through the touch screen interface to place an order. The scheduler may look at the available resources, and may determine, for example, that one frother is busy, that a second frother is available, and that one cup has had milk dispensed into it and is sitting in the staging area, but it is not yet been frothed. The scheduler may directs the XYZ actuator to pick up the cup with the dispensed milk from the staging area and move it to the second idle frothing module. It may then send a command to that second frothing module to froth the milk to the prescribed temperature. Meanwhile, the first frothing unit that was busy, may issue a communication back to the scheduler that the frothing that was in progress is now done. In this example, once the scheduler sees that the first frothing unit has completed frothing, and that the XYZ transporter is free, it may send a command to the XYZ transporter to pick up the cup from the first frother, and (if an espresso resource is available and ready to receive a cup) take the cup to that espresso resource. If no espresso resource is available or ready, then XYZ transporter may be commanded to take the cup to the staging area.

As previously noted, the scheduler may prioritize certain jobs over others. For example, a customer that is standing at the machine may place his/her order, and once it is placed, orders that are being prepared ahead of time for "will-call" customers may be placed in the staging area partially finished. The new order placed at the kiosk may then be assigned a high (or the highest) priority and be rushed through the process. Once that order has gone through its critical steps, processing of any "will-call" orders that were staged to allow that order to be rushed through processing may resume. In some embodiments, the scheduler may notice that an order is in the process of being placed and may reserve an available resource (e.g., a frother) in anticipation of the order, rather than starting a "will-call" frothing operation using that resource. A similar approach may be taken for background processing of iced coffee or tea. It may be desirable for the machine to build up stock of iced coffee or tea, which may be cooled and stored for later dispensing. However, those processes may be assigned a lower priority than customer orders, except in the case that the cold stock is rapidly being depleted, in which case they may actually be given a higher priority to maintain a safe level of inventory.

Figure 27:
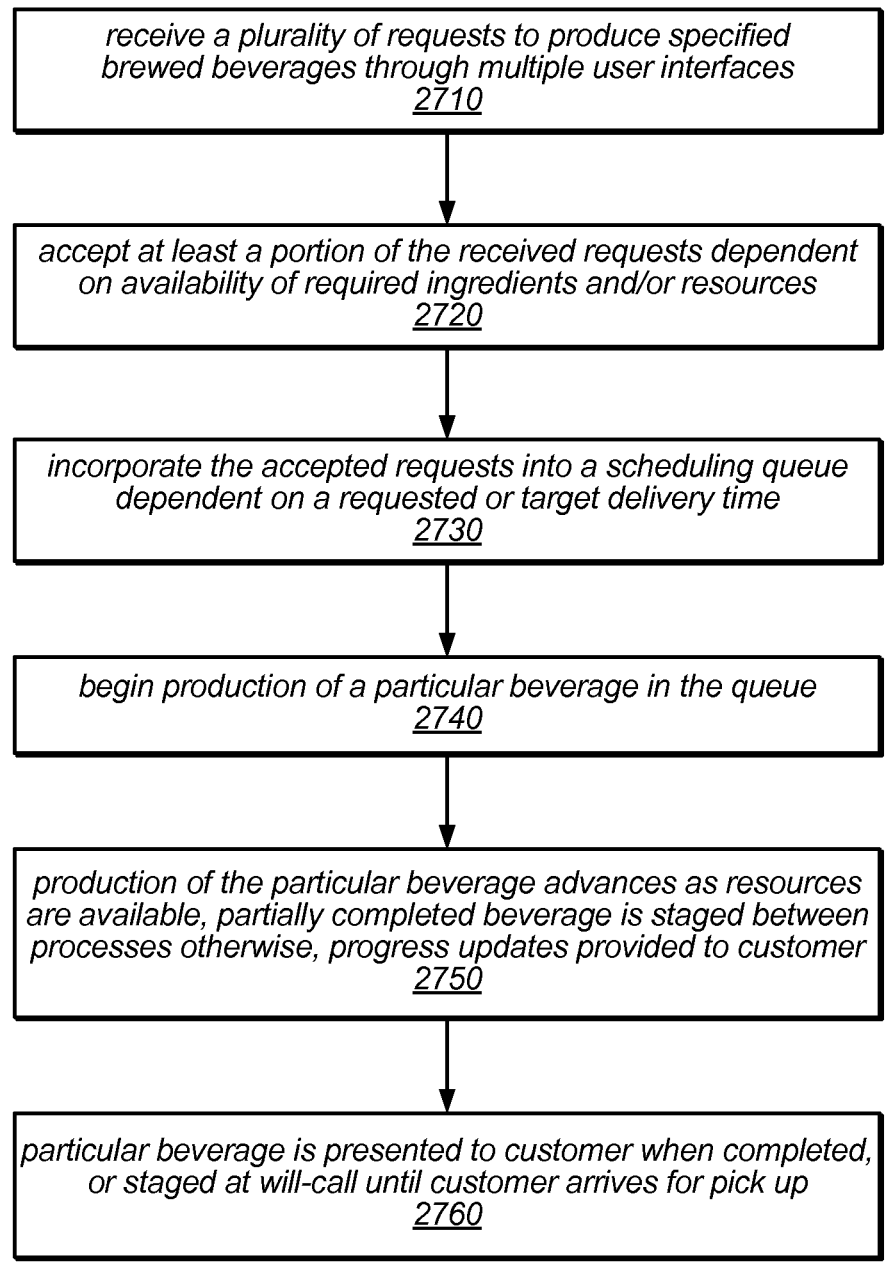
FIG. 27 is a flow diagram illustrating one embodiment of a method for utilizing shared resources when producing a brewed beverage.

One embodiment of a method for utilizing shared resources when producing a brewed beverage in a system such as that described herein is illustrated by the flow diagram in FIG. 27. As illustrated in this example, the method may include receiving a plurality of requests to produce specified brewed beverages through multiple user interfaces (e.g., at a kiosk or remotely), as in 2710. The method may include accepting at least a portion of the received requests dependent on the availability of required ingredients and/or resources needed to perform the various chemical and/or mechanical processes to produce the specified beverages, as in 2720. In various embodiments, if the automated kiosk does not have required ingredients and/or available resources needed to produce a requested beverage at the requested delivery time, the request may be declined, or the customer may be asked for authorization to direct the order to a different kiosk that is able to produce the beverage in the desired timeframe (e.g., if it is a remotely place order).

As illustrated in FIG. 27, the method may include incorporating the accepted requests into a scheduling queue dependent on a requested or target delivery or pick up time for each request (e.g., a delivery or pick up time requested by customer or a target delivery time for a speculative or preemptive order request made by the master controller/scheduler), as in 2730.

The method may include beginning production of a particular beverage in the queue, as in 2740, and advancing production of the particular beverage, as resources are available (as in 2750). As illustrated in this example, a partially completed beverage may be staged between processes until resources are available for the next required step. In some embodiments, progress updates may be provided to the customer as production of the beverage advances. For example, updates may be displayed at the kiosk or provided to the customer remotely (e.g., through a web browser or ordering application on a remote computer or smartphone). The particular beverage may be presented to the customer when it is completed, or staged at a "will-call" area until customer arrives for pick up (or is otherwise available to take delivery of the beverage), as in 2760.

In various embodiments, an overall production process for a specific kiosk may include any or all of the features that follow. Multiple orders may be placed at the same time on multiple screens owned by the customers. There may be a queue of orders, each with a specified delivery time (e.g., a requested or target delivery time). There may be an inventory of available resources (e.g., 2 espresso units, 3 frothers, 2 cup dispensers, etc.) in the particular kiosk. There may be a certain WIP (work-in-progress) inventory of drinks in various states of completion, with varying levels of priority. There may be a staging area for both in-process drinks and finished drinks. Each may include two staging areas, e.g., one for hot drinks, and one for cold drinks. There may be two "presenters". One may be near the touch screen (e.g., under it or next to it), and one may be near the digital signage display (e.g., under it). The presenter under the digital signage may be the "will-call" presenter In some embodiments, the lower few inches of the digital signage display may be reserved for one-way communications with customers when they pick up their orders at the "will-call" presenter. In some embodiments, there may be a second card reader (or another means to identify the customer, such as a bump module or RFID reader) next to the digital signage where people may identify themselves for orders in the "will-call" processing or pick up queue. In some cases, a particular kiosk may be equipped so that it can handle a specific traffic pattern. For example, if a kiosk is chronically over-utilized or under-utilized, the configuration of sub-modules may be adjusted and/or re-deployed to another kiosk to balance capacity with demand. One or more of the most expensive components of the kiosk (e.g., the ice maker) may be leveraged by multiple instances of lower-cost and/or critical path components such as frothers and espresso units.

In a location in which there is seating in the vicinity of the kiosk, customers may be able to order from their seats and be prompted when the drink is ready for pick up through, for example, two way or broadcast communication with a mobile device. This communication may be a text message or another type of communication made through a proprietary mobile phone or computer application. In a restaurant in which the kiosk provides the coffee solution, the machine may be tied to (i.e. integrated with) the point-of-sale (POS) ordering system of the restaurant. For example, a waiter may enter an order for espresso, coffee, tea, or chai in the POS along with the rest of the order, and the drink order may be delivered to the coffee machine just as the main dish order is issued to the kitchen. In a retail application (such as a convenience store or retail outlet such as Home Depot, Wal-Mart, or any other retail outlet), a drink order made at a kiosk in the store (and its cost) may be communicated to the POS system in the store, so that it may be paid for along with other purchases using a single payment. This communication may be implemented with a paper receipt or may be an electronic communication, and it may include unique information, such as a loyalty card or credit card swipe, or other identification of the customer or the drink order, using, for example, an RFID tag or phone bump. In some embodiments, a POS/self-service checkout station may be combined with the kiosk. For example, a customer at a convenience store or supermarket may be able pay for items purchased in combination with their coffee purchase, or the kiosk may produce a printed or an electronic message/transaction to an alternative POS (for example the checkout at a convenience store or a supermarket). The cost of a drink obtained from the kiosk may be added to the loyalty program for either the kiosk owner or alternatively to the supermarket/convenience owner.

In some embodiments, cup storage may be divided into sub-modules that are specific to particular cup sizes and/or that are adjustable based on demand. For example, a particular kiosk may be outfitted to handle 800 cups between services, while another kiosk may only be outfitted to handle 300 cups. The mix of cup sub-modules (e.g., the mix of small, medium and/or large cups) may be site-specific or season-specific. For example, more large and/or plastic cups may be needed in the summer to handle iced drinks, while more paper handlers may be needed in the winter for hot drinks. In some embodiments, the kiosk may include a commercially available cup handler. For example, in one such commercial cup handler, each module may include a fixed number of tubes that swing on an axis. The cup dispenser actuator may move under the appropriate stack and may move the stack through the opposing "teeth" fixed at the bottom of each stack. In some embodiments, the scheduler may know how many cups are in each stack at any given time.

In some embodiments, an additional function of the scheduler may be to manage the clean-in-place (CIP) process, which may be a shared resource just like the drink production process modules (e.g., the espresso and frothing modules). As with some of the other modules, the CIP module may have the ability to travel using an XYZ actuator. In various embodiments, each process module may require periodic self-washing and/or self-cleaning. The scheduler may be configured to determine whether there is an upcoming requirement to clean a particular element (e.g., an espresso unit) between functional cycles. For example, when there is a gap in demand from customers, the scheduler may direct that a particular resource should be washed or cleaned. In some embodiments, this may be done before the cleaning is absolutely required so that the resource may not need to be pulled out of service due to cleaning requirements. The scheduler may also be configured to look at demand patterns and to recognize that a particular resource may be pulled off-line for service (e.g., that it is currently idle and may be serviced without disrupting production).

Figure 28:
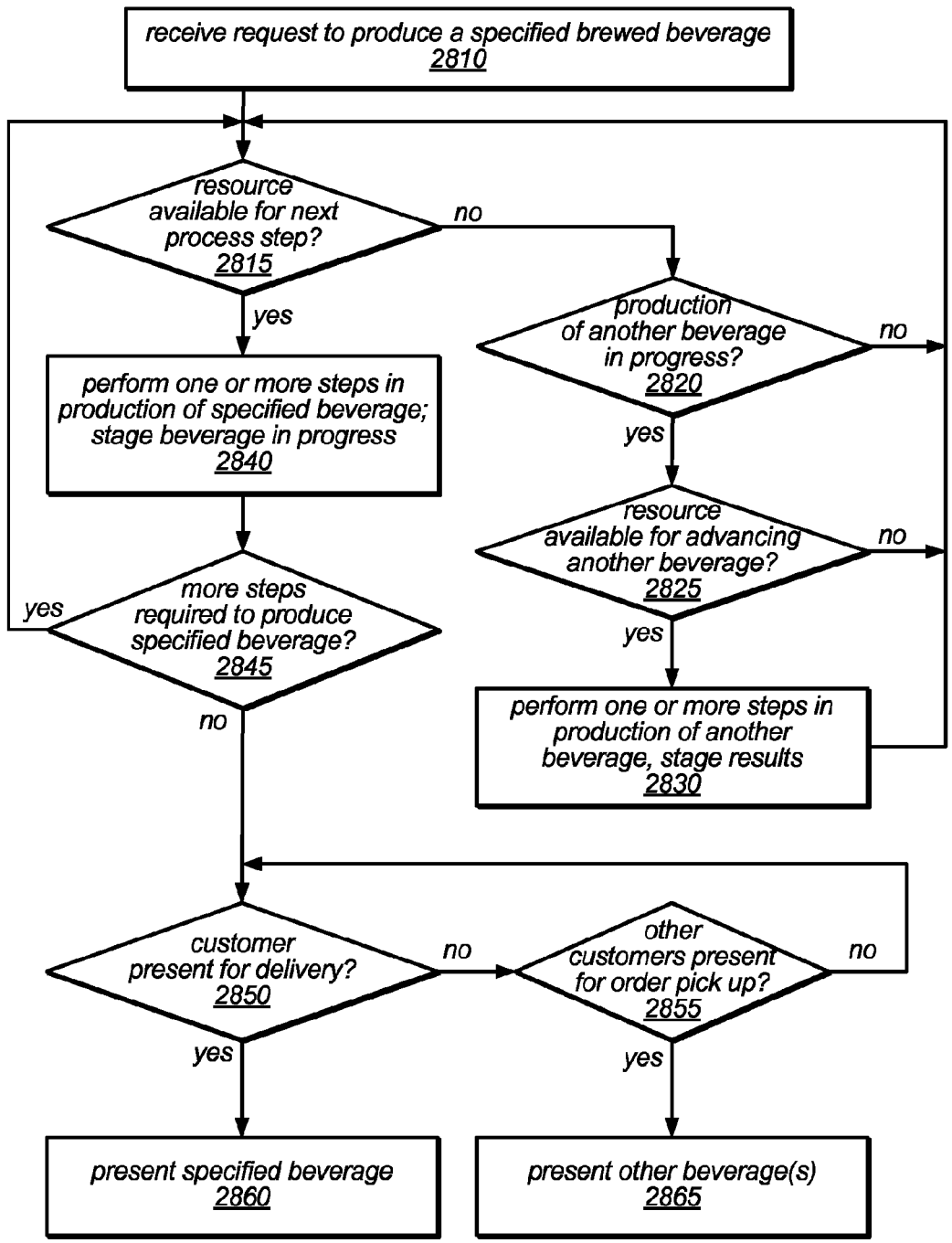
FIG. 28 is a flow diagram illustrating one embodiment of a method for sharing system resources when producing multiple brewed beverages.

One embodiment of a method for sharing resources when producing multiple brewed beverages in a system such as that described herein is illustrated by the flow diagram in FIG. 28. As illustrated at 2810, in this example, the method may include receiving a request to produce a specified brewed beverage. For example, a request to produce a beverage may be received through a user interface on an automated kiosk (e.g., by a walk-up customer), may be received through an Internet connection (e.g., as an order placed remotely from a computer or smartphone through a web browser or ordering application), or may be received from the master controller/scheduler (e.g., as a predicted or preemptive order). As illustrated in this example, the method may include the system (or a scheduler or master controller thereof) determining whether one or more required resources are available for the next process step (e.g., the next chemical or mechanical process) in its production flow, as in 2815. For example, if the order has just been received, the system (or the scheduler or master controller thereof) may be configured to determine whether resources are available to begin processing the request dependent on the status of the system, the availability of the necessary raw ingredients, the number and/or type of other beverages currently being produced by the system (if any), the availability of resources needed to begin processing the request, and/or other factors.

If the system (or a scheduler or master controller thereof) determines that resources are not available to perform the next step (shown as the negative exit from 2815), but the production of another beverage is in progress (shown as the positive exit from 2820), and a resource is available for advancing production of the other beverage (shown as the positive exit from 2825), the method may include performing one or more steps involved in the production of the other beverage in the meantime, as in 2830, and staging the results. For example, a lower priority beverage may be able to make progress if resources needed to perform one or more next steps in its production are available while resources needed to perform a next step in the production of a higher priority beverage are not available.

If the system (or a scheduler or master controller thereof) determines that resources are not available to perform the next step (shown as the negative exit from 2815), that the production of another beverage is in progress (shown as the positive exit from 2820), but that no resources are available for advancing production of the other beverage (shown as the negative exit from 2825), the method may include waiting for resources to become available for advancing production of the specified beverage or the other beverage. Similarly, if the system (or a scheduler or master controller thereof) determines that resources are not available to perform the next step (shown as the negative exit from 2815), but no other beverage production operations are in progress (shown as the negative exit from 2820), the method may include waiting for resources to become available for advancing production of the specified beverage without performing any other beverage production processes. This is illustrated in FIG. 28 by the feedback from 2820 or 2825 to element 2815.

As illustrated in this example, if the system (or a scheduler or master controller thereof) determines that resources are available to perform the next step (shown as the positive exit from 2815), the method may include performing one or more next steps involved in the production of the specified beverage, and (in some cases) staging the beverage in progress (e.g., in a WIP staging area). If there are more steps required to produce the specified beverage (shown as the positive exit from 2845), the method may include repeating the operations shown as 2815-2845 until all of the steps required to produce the specified beverage have been performed. This is shown in FIG. 28 as the feedback from 2845 to 2815.

If, once the specified beverage has been produced (shown as the positive exit from 2845), the system (or a scheduler or master controller thereof) determines that the customer is not yet present and available to take delivery of the specified beverage, but the system (or a scheduler or master controller thereof) determines that one or more other customers are present for order pick up, the method may include presenting one or more other completed beverages for pick up. This is illustrated in FIG. 28 as the negative exit from 2850, the positive exit from 2855, and element 2865. If the system (or a scheduler or master controller thereof) determines that the customer is not yet present and available to take delivery of the specified beverage, and that no other customers are present for order pick up, the method may include waiting until it can determine the customer is present and available to take delivery of the specified beverage. This is illustrated in FIG. 28 as the negative exit from 2850, the negative exit from 2855, and the feedback to element 2850. If the system (or a scheduler or master controller thereof) determines that the customer is present and available to take delivery of the specified beverage, the specified beverage may be presented, as in 2860.

As previously noted the automated beverage generation systems described herein may be implemented as modular coffee kiosks, and may, in various embodiments, include one or more instances of any of the components described herein in any of a variety of configurations. For example, they may include any number and/or configuration of schedulers, espresso unit(s) (each of which may include one or more rotary actuators, ultrasonic transducers, tampers, and mechanisms to access the output of one or more coffee grinder), frothing station(s), ice maker/handler(s), liquid filler(s), cup storage/dispenser module(s), clean-in-place modules(s), XYZ actuator/transporter(s), display/UI module(s), presenter(s), WIP staging area(s), completed order staging area(s), ingredient storage modules (for dry, wet, hot, and/or cold ingredients), compressor(s), or any other functional components.

Figure 29:
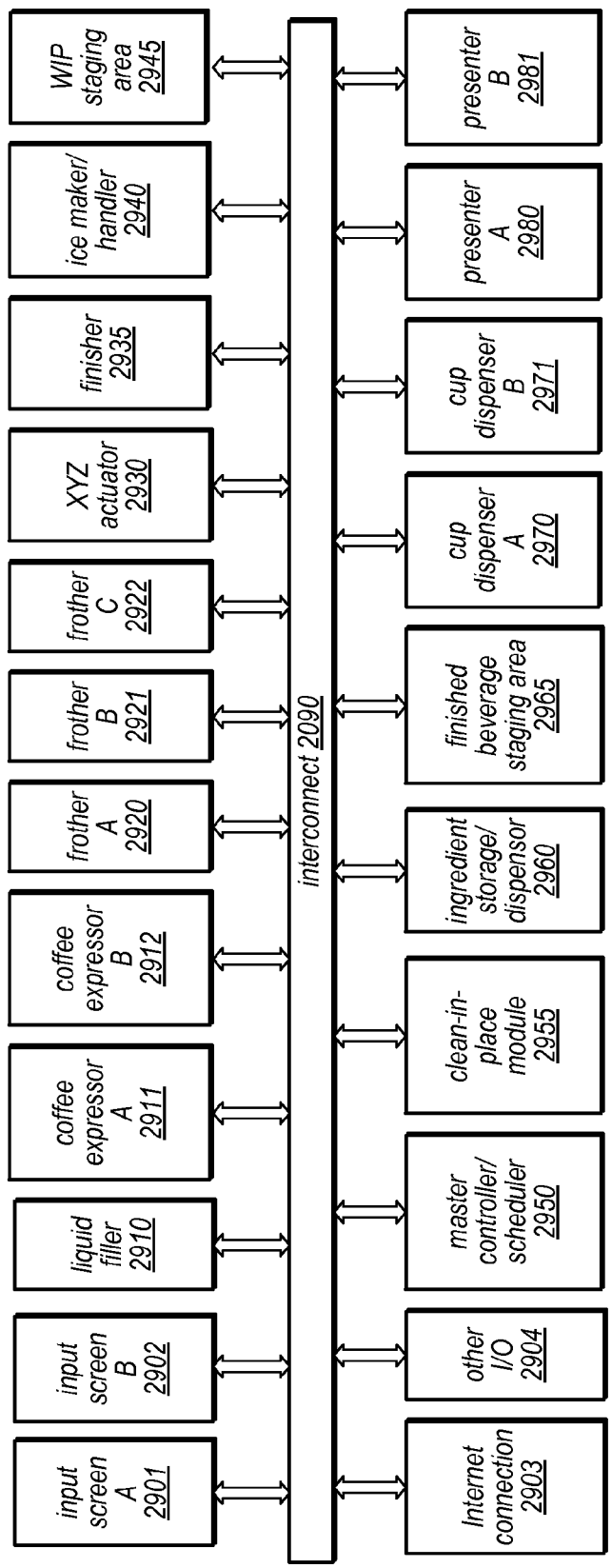
FIG. 29 is a block diagram illustrating various interconnected modules of an automated coffee kiosk, according to one embodiment.

FIG. 29 is a block diagram illustrating various interconnected modules of an example automated coffee kiosk, according to one embodiment. As illustrated in this example, a single modular coffee kiosk may include two input screens (2901 and 2902), an Internet connection module (2903), and one or more other input/output (I/O) components (2904) for communication between the machine and customers, between the machine and a remote computing system and/or database stored thereon, etc. In various embodiments, additional I/O devices 2904 may include one or more of: a credit card/loyalty card and/or RFID reader, proximity sensor, loyalty card dispenser, coin/bill acceptor/changer, receipt printer, video capture, audio interface (microphone and/or speaker), or other I/O devices.

As illustrated in this example, the modular coffee kiosk may include a single liquid filler (2910), two espresso units (coffee expressors 2911 and 2912), three frothing units (frothers 2920, 2921, and 2922), an XYZ actuator (2930), a single finisher (2935), and a single ice maker/handler (2940). As described above, any of the modules may be considered shared resources that may be assigned at different times by the master controller or scheduler to the production of drinks for various orders. As illustrated in FIG. 29, the modular coffee kiosk may include a single master controller/scheduler (2950), a single clean-in-place module (2955), a single ingredient storage/dispenser module (2960), a work-in-progress (WIP) staging area (2945), two cup dispensers (2970 and 2971), a finished beverage staging area (2965), and two presenters (2980 and 2981).

Figure 30:
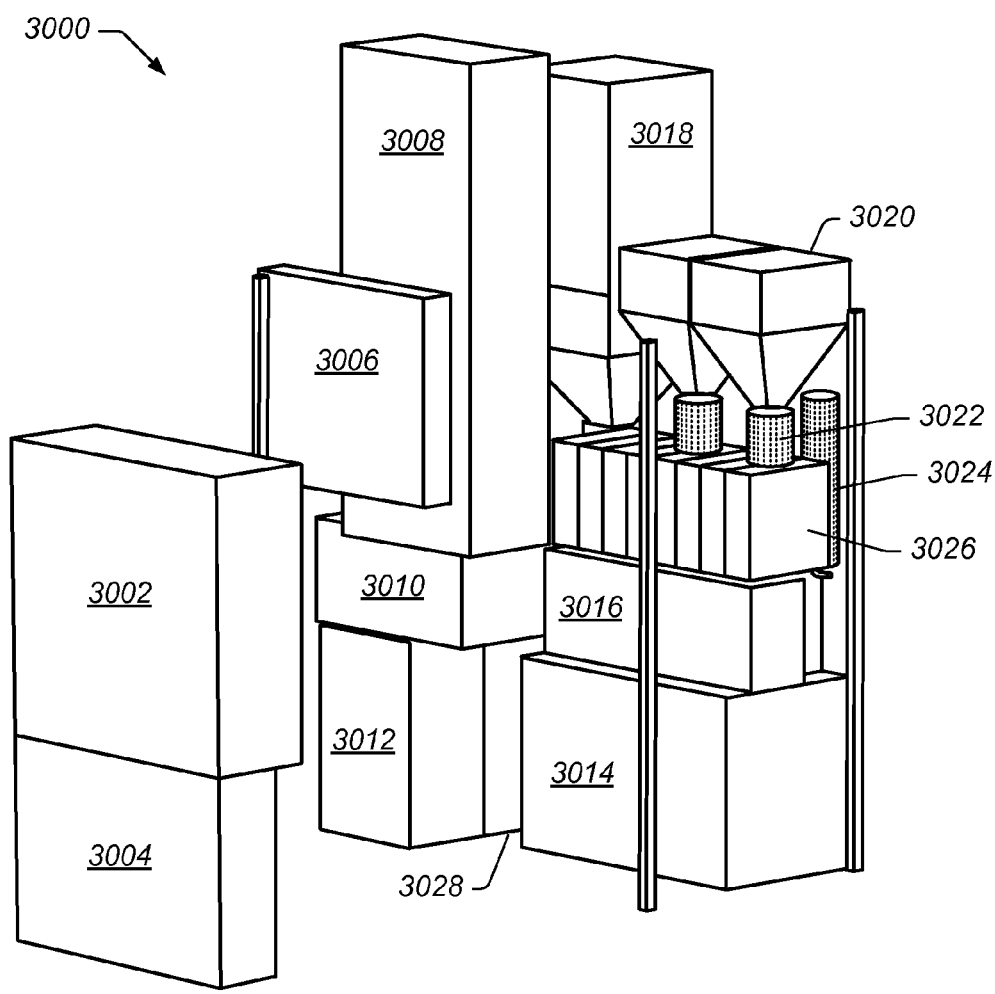
FIG. 30 is a block diagram illustrating a representation of a front view of the configuration of modular components in an automated coffee kiosk, according to one embodiment.

FIG. 30 is a block diagram illustrating a representation of the front view of the configuration of modular components in an automated coffee kiosk, according to one embodiment. Visible in this view are: the electrical service panel 3006, the sump pump 3012, the cooler 3014, a steam generator (3024), the display module 3002, two XYZ actuators (3010 and 3016), a collection of process modules 3026 (e.g., espresso units, frothers, etc.), a dispensing module (presenter) 3004, a compressor 3028, a cup handler 3008, an ice head 3018, several grinders 3022, several hoppers 3020 (for dispensing ingredients), and a steam generator 3024.

The representation illustrated in FIG. 30 depicts the normal operating positions of the interior modules, while the display module is shown as having been moved forward for servicing of one or more interior modules. In this example, the XYZ actuator 3010 travels to each functional module to deliver and retrieve cups. Another XYZ actuator (3016) is shown below the collection of process modules 3026. In various embodiments, display module 3002 may include a combination of one or more digital signage displays, touch screens, card readers, card dispensers, and/or keypads, and may also include associated computer hardware to support the user interface components. In some embodiments, display module 3002 may include or be a component of an industrial-grade computer, which may include a media player, firewall, router, modem, and/or other components.

Figure 31:
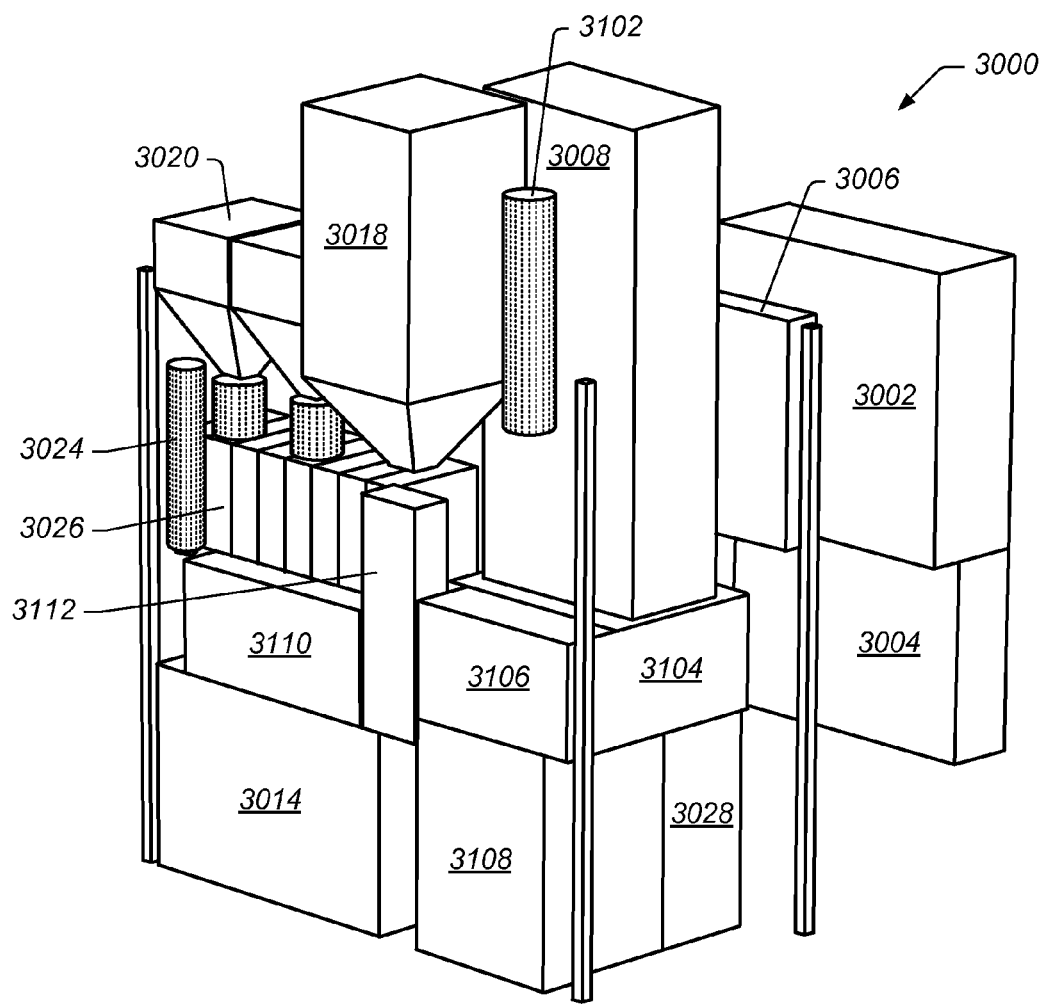
FIG. 31 is a block diagram illustrating a representation of a rear view of the configuration of modular components in an automated coffee kiosk, according to one embodiment.

FIG. 31 is a block diagram illustrating a representation of a rear view of the configuration of modular components in the automated coffee kiosk depicted in FIG. 30, according to one embodiment. Visible in this view (in addition to some of the modules described above in reference to FIG. 30) are: a hot water cylinder (3102), the WIP staging area (3106), a cooling heat exchanger 3108, an additional XYZ actuator 3104, a CIP module 3110, and an ice tower 3112.

In this example, the cylinder (3102) represents the hot water loop, which may be maintained at 200° F. using a pump circulating water through both an industrial instant heater and a storage tank. The WIP staging area (3106) is the area in which cups may be stored for product that is in process, and/or for product that is complete and ready for pick up by a "will-call" customer. The WIP staging area may be divided into different sections for hot and cold drinks. The cooling heat exchanger 3108 may perform air-cooling and dehumidifying functions. In some embodiments, it may use ice from the ice head 3018. In this example, XYZ actuator 3104 is shown in the area under the cup handler 3008. This actuator may travel to accept cups and to store and/or retrieve drinks that are in-process (e.g., WIP).

In some embodiments, any or all of the hoppers 3020 may be on an actuator that can move them forward, and then lower them (e.g., to enable servicing). As previously noted, the series of adjacent boxes 3026 represents an array of modules that perform the various drink production functions, such as espresso generation and milk foaming. In this example, there are two hoppers 3020 for coffee beans, and the cylinders below them represent the grinders 3022 (shown in FIG. 30). Below the array of process modules 3026 is a CIP module 3110 that services the modules above. Ice tower 3112 performs the cooling function for the tubes of fluids coming from the storage cooler 3014 to the dispensing module 3004. In some embodiments, the cup holder module 3008 may be articulated to the right and down to allow service personnel to load cups into the holder. After loading, it may be re-positioned by raising it and moving it to the left.

In some embodiments, the system may respond to host requests and control the coffee expressor while waiting for a new customer. When a customer is detected, the system may prompt the customer to insert a loyalty card if it is not already inserted. If the customer will use a loyalty card, the system may retrieve customer data from database on the host server. For example, the system may read the card identification number, and send the card number to the host server. The host may respond by sending the customer's recent purchase history and card balance. The purchase history may then be displayed on an LCD or another display device as a series (or list) of descriptive links, and each of the links may show specific drink customizations made by the customer in a prior order. In some embodiments, the inventory may be checked by the master controller to make sure that the beverage corresponding to each link can be produced. If not, the user may be warned that a particular selection is not available.

In some embodiments, the master controller may be configured to determine one or more alternate drink recipes (e.g., standard, custom, or new drink recipes) to be suggested or recommended to the customer (e.g., by displaying these options on the screen) based, for example, on stored customer profile information for the customer, drink preferences of customers with similar customer profiles, popularity of drink recipes, or recommendations from friends of the customer. In some embodiments, the master controller may be configured to select alternate drink recipes to be suggested or recommended to the customer based on the collective preferences of customers who visit the kiosk (e.g., based on the most frequently ordered drinks or customizations selected) or the collective preferences of all or any subset of customers whose profiles are stored together in a shared database accessible to the master controller. In some embodiments, the customer may touch an intuitive link in the list displayed on the touch screen that describes a previously ordered beverage (or group of beverages) that the customer would like to order again. In various embodiments, the user may select one of the links (e.g., to order a favorite drink), select an option to enter a new order (e.g., by choosing a different drink from a standard or default menu, or creating a new recipe by customizing a selection from a standard or default menu), or cancel the transaction. If the customer is not using a loyalty card, a default menu of available drinks may be displayed as a series of descriptive links.

Once a link has been pressed, the selected link may be highlighted and a display may prompt the customer to indicate whether they would like to further customize the order, or accept the same options as last time. If they choose to customize the drink, a new screen may be presented graphically showing the selection and customization options. For example, slider bars presented on a touch screen may indicate current, prior, default, minimum, and/or maximum levels of strength, sweeteners, flavoring, and other customizable options for a selected drink, along with their costs, and various drink customizations may be selected by changing the position of one or more sliders on their respective slider bars. In some embodiments, an addition user interface mechanism (e.g., a radio button) may be selected in order to override a default, minimum, or maximum setting for a customizable option. Selecting a "back" button may allow the customer to go back to the list drinks and/or customization options. In some embodiments, the customer may also be prompted to indicate whether they would like to order another drink. If so, any or all of the selection and/or customization steps described above may be repeated for one or more additional drinks. In some embodiments the user may be prompted to confirm the drink or drinks that have been selected and/or customized. For example, a button on the touch screen may be pressed by the customer to confirm that the drink (or drinks) should be produced.

Once the customer has confirmed the selection of one or more drinks, the price of the selected drink(s) may be displayed and the customer may be prompted for payment method desired, and payment may be collected. In some embodiments, benefits of the loyalty debit card may also be displayed. In this example, the payment process may be completed by paying with a credit card, debit card, or cash, or the loyalty debit card value may be reduced by the appropriate amount for the selected drink(s). In other embodiments, the customer may select a third party web-based payment service (e.g., a payment service provided by PayPal, Inc.) through which to make payment. In such embodiment, the user interface mechanism may be configured to prompt the customer to input account information for the payment service or to navigate to a login screen for that service in order for the customer to complete the payment process. If the loyalty card value is not sufficient to cover the order, the user may be prompted to add money to the card. For example, in one embodiment, if the loyalty card balance is or will be below a pre-set minimum threshold (e.g., $2.00) after a drink purchase, the customer may be prompted to indicate whether they would like to refill it now or set up an automatic refill of the debit card based on a credit card on file for the customer's account.

Once the order is placed, a master controller (such as that described herein) may issue a sequence of controls to effect the creation of the end product (i.e. the selected drink or drinks). In some embodiments, a processing screen may be presented displaying one or more message while the selected drink or drinks are being produced. In some embodiments, one or more messages (e.g., the story boards and/or non-profit information described above) may be presented to the user while the order is being processed. In some embodiments, selected drink parameters may be sent to the drink fulfillment controller (i.e. the master controller) and the processing screen may display the progress of the order fulfillment operation. Once order fulfillment is completed, the user may be prompted to take the drink and to be careful. The storage tank temperature may be read and the exact temperature may be displayed to show the customer the drink temperature. In some embodiments, the presenter may be configured to label the cup with the customer's name, a recipe name, the customization contents (i.e. drink recipe), one or more standard or personalized messages or advertisements, a receipt for the cost of the drink, and/or any other information in text or graphics. Once a sensor detects that the cup has been taken, confirming that the customer has retrieved the order, a "Thank you!" prompt may be displayed. In various embodiments, the customer may be prompted to indicate whether they would like to order another drink, add money to their loyalty card, purchase an additional card as a gift card, and/or print a receipt and take their card. In some embodiments, if the customer has ordered multiple drinks, the operations described above may be repeated to produce and dispense all of the selected drinks. If there were no other drinks ordered by this customer, the system may return to waiting for (another) new customer.

In some embodiments, the process described above may be invoked in response to sensing an RFID tag on the customer to obtain the unique identifier (customer ID) of the customer. In response to detecting the RFID, the system may prompt the customer to enter a PIN to continue the process of ordering. In other embodiments, a customer may be detected by a proximity sensor or by a touch on an LCD touch screen. In some embodiments, a "Welcome Screen" may be a display offering options in response to detection of a new customer. The system may be configured to determine that the customer elects to use a loyalty Debit Card in response to the customer inserting the card or selecting a button indicating this intent. In some embodiments, the system may be configured to accept payment from a mobile phone application.

In some embodiments, a method for finishing a beverage may include receiving drink parameters from a master controller, and, in response, dispensing an appropriate quantity of the beverage into a mixing chamber. The method may also include adding one or more sweeteners or syrups, water, and/or a hot or cold dairy product (e.g., cream, whole milk, half-and-half, low-fat milk, or non-fat milk) to the mixing chamber, based on the selections indicated by the received drink parameters. Finally, the method may include delivering the contents of the mixing chamber to a cup, as directed by the master controller Note that in some embodiments, the customer may wish to use their own cup. In this case they may be asked to insert the cup into the machine (e.g., the customer may be prompted to insert the cup by a message displayed by the user interface mechanism). In some such embodiments, the customer may be prompted to indicate the container size (e.g., using the user interface mechanism) and the system may be configured to dispense an appropriate quantity of a selected beverage for the size of the cup. The system may prepare and present the drink according to drink parameters received from the master controller (e.g., in response to various user inputs). In some embodiments, the system may be configured to deliver the selected beverage as long as the touch screen button is pressed. Data indicating the volume delivered may then be stored on the loyalty card database and made available for use on the next order.

In some embodiments, a method for dispensing a beverage may include receiving drink parameters from a master controller. If the drink parameters indicate that the user has selected to use their own cup, the method may include loading the user's cup with the contents of the mixing chamber. For example, the mixing chamber may contain a beverage that has been customized by the finished according to one or more customer-specified drink parameters, as described herein.

If the customer did not indicate that they would use their own cup, the method may include dispensing a cup to a carrousel, and loading the cup with the contents of the mixing chamber. In some embodiments, the method may include applying a lid to the cup, and placing the cup on a conveyor belt, ready to be delivered to the presenter. In some embodiments, after the contents of the mixing chamber have been dispensed into a cup provided by the system or the user's cup, the method may include the mixing chamber performing a self-cleaning operation.

As previously noted, an automated beverage generation system may include multiple presenters for conveying the final product to the customer. In some embodiments, a method for presenting a beverage to a customer may include determining which presenter is to be used dependent on a command from the master controller. In some embodiments, the method may include elevating the next cup in line from the cup and lid dispenser to the appropriate conveyor. The method may include the conveyor bringing the cup to the customer and the customer retrieving the final product. In some embodiments, the method may include a sensor determining if and when the customer retrieves the cup, and alerting the master controller.

In some embodiments, a soft keyboard may be available for use in capturing a customer's email address when they purchase or use a loyalty card. Comments and feedback may be captured orally (e.g., via a microphone) and stored and transmitted digitally back to the host computer. Video capture and security may also be tied into the master controller and may be observable by the master controller and/or remotely. For example, in some embodiments, video images and/or other security data (e.g., evidence of attempts to break into or otherwise tamper with the kiosk) may be communicated to and monitored by a remote server. In some embodiments, a video capture device may capture an image that is input to a face recognition mechanism to identify the customer. In still other embodiments, a user interface mechanism comprising a touch screen or an optical, ultrasonic, or capacitance sensor may be configured to capture a customer's fingerprint that is input to a fingerprint identification mechanism to identify the customer. In some embodiments, the design of the kiosk itself may resemble or have design components that suggest an Italian Espresso machine.

As described herein, some embodiments of a system for brewing and dispensing coffee may include a coffee expressor containing two or more gravity filters configured to separate grounds from a brewed beverage, and a selection box configured (in a first position) to allow the brewed beverage to flow through the two or more gravity filters to produce filtered expressed coffee, and (in a second position) to interrupt the flow of the brewed beverage to the two or more gravity filters and allow waste products to be removed from the system. The system may also include a master controller configured to determine whether conditions of the system indicate that the system should transition from a brewing cycle to a cleaning cycle, and in response, to cause the selection box to move from the first position to the second position. In some embodiments, the master controller may include a processor and a memory configured to store program instructions executable by the processor to implement receiving one or more user or sensor inputs, and performing the determining operating dependent on the one or more user or sensor inputs.

In some embodiments, the system may include an initial gold filter configured to receive a mixture of water and grounds, and to filter the mixture to produce the brewed beverage. The system may also include a precision heater configured to heat the water to a temperature suitable for brewing the brewed beverage. In some embodiments, the system may include a user interface mechanism configured to receive input specifying one of more of: a beverage type, a beverage additive, a serving temperature, a customer identifier, a cup preference, or a payment type. In some embodiments, the system may include an ice machine and/or an ice delivery system, and may be configured to create iced drinks (e.g., iced coffee drinks), in addition to hot beverages. In some embodiments, the system may also include support for the production of other drink types, including, but not limited to, iced tea, and chai. In some embodiments, the master controller (or another component of the system) may be configured to calculate nutritional information for a selected drink, dependent on a base drink recipe and/or on any customizations selected by the customer.

Figure 32:
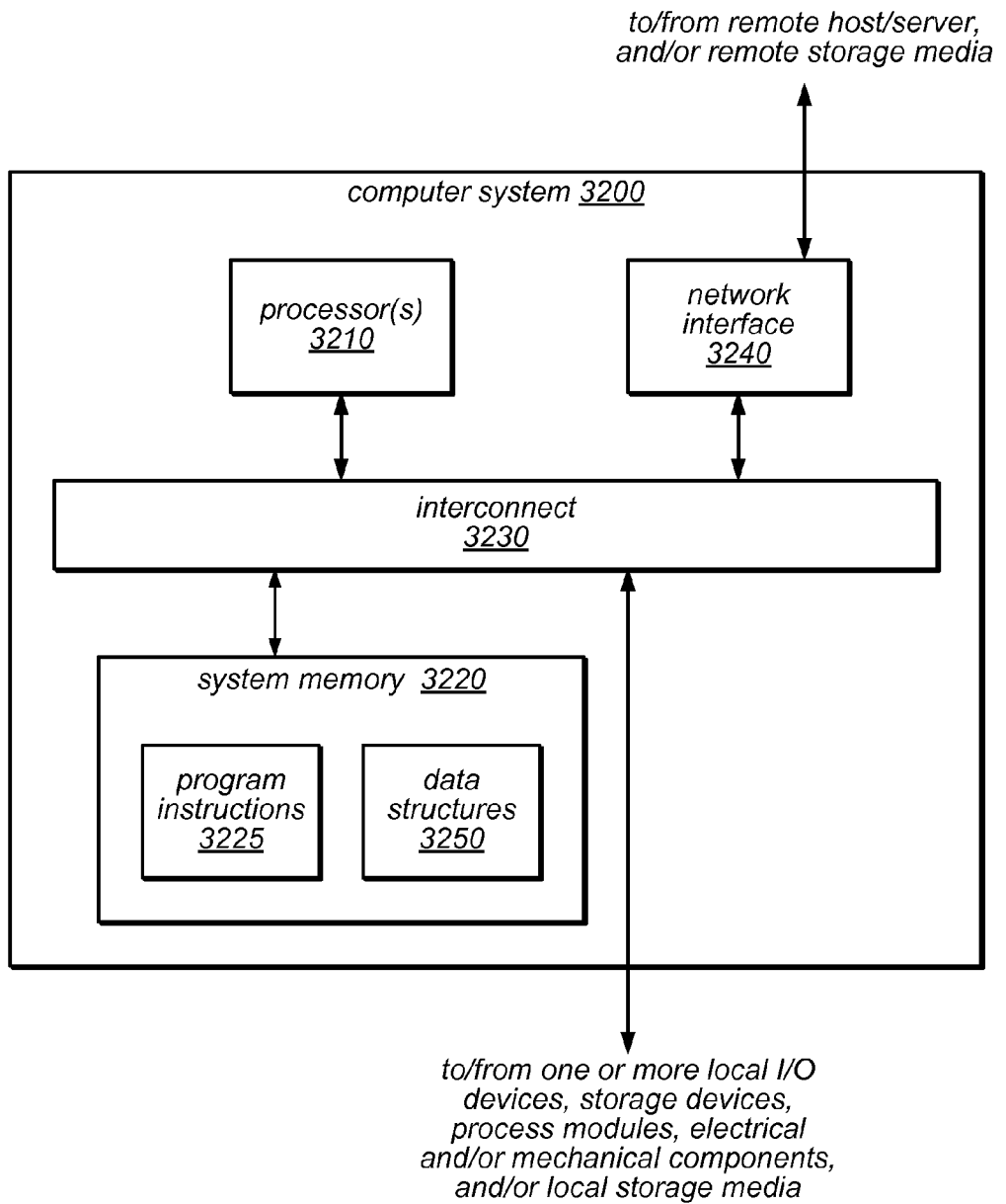
FIG. 32 is a block diagram of a computer system configured to control a system for brewing and dispensing coffee, according to one embodiment.

The methods described herein for controlling an automated coffee brewing and dispensing system may be implemented by a computer system configured to provide the functionality described. FIG. 32 is a block diagram illustrating one embodiment of a computer system 3200 configured to implement a master controller and/or scheduler, a customer application for communicating with an automated coffee brewing and dispensing system, or a remote host that stores customer and/or process-related information for one or more automated coffee brewing and dispensing kiosks and/or communicates with those kiosks and/or manage their operation, and/or to provide other functionality for efficiently operating one or more automated coffee brewing and dispensing kiosks. In various embodiments, computer system 3200 may be any of various types of devices, including, but not limited to, a personal computer system, desktop computer, laptop or notebook computer, mainframe computer system, handheld computer, smartphone, workstation, network computer, a consumer device, application server, storage device, a peripheral device such as a switch, modem, router, a standard or custom embedded controller, a standard or custom microcontroller-based system, or in general any type of computing device. In the example illustrated in FIG. 32, one such computer system 3200 may be located in the same physical location as other components of the system (e.g., in an automated kiosk itself or in the vicinity of such a kiosk). In other embodiments, all or a portion of computer system 3200 may be implemented as a remote host or server configured to communicate with the rest of the system (which may include one or more automated kiosks and/or customer applications executing on customer devices) through one or more communication interfaces. For example, in some embodiments, all or a portion of the master controller may be implemented on a remote host, rather than being implemented on a computer system physically located within an individual expressed coffee kiosk.

As illustrated in FIG. 32, computer system 3200 may include one or more processor units (CPUs) 3210. Processors 3210 may be implemented using any desired architecture or chip set, such as an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 3200, such as various versions of Unix, Linux, Windows™ from Microsoft Corporation, MacOS™ from Apple Corporation, or any other operating system that enables the operation of software on a hardware platform.

The computer system 3200 may also include one or more system memories 3220 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 3200 via interconnect 3230. Memory 3220 may include other types of memory as well, or combinations thereof. One or more of memories 3220 may include program instructions 3225 executable by one or more of processors 3210 to implement various aspects of the techniques described herein. Program instructions 3225 may be implemented in various embodiments using any desired programming language, scripting language, or combination of programming languages and/or scripting languages, e.g., C, C++, C#, Java™, Perl, etc.

Program instructions 3225 may be partly or fully resident within the memory 3220 of a computer system 3200 at any point in time. All or a portion of program instructions 3225 may be stored on an external storage device (not shown) accessible by the processor(s) 3210, in some embodiments. Any of a variety of such storage devices may be used to store the program instructions 3225 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 3210 through one or more storage or I/O interfaces including, but not limited to, interconnect 3230 or network interface 3240, as described herein. Memory 3220 may also be configured to implement one or more data structures 3250, such as one or more data structures configured to store drink recipes; advertisements, story boards, and other messages; status information for the system; inventory information for the system; an order log or purchase history for the system; one or more order queues, customer-specific, kiosk-specific, or system-wide demand information; one or more multiple-variable process profiles; or a maintenance or service log for the system. Data structures 3250 may also include one or more data structures configure to store, for each of a plurality of customers: a customer identifier, drink preferences, account information, a purchase history, one or more custom drink recipes, one or more preferred standard drink recipes, a history of received messages, an email address, and/or any other information that may be collectively referred to as a "customer profile". Similar information may also be stored on a loyalty debit card, in some embodiments. All or a portion of data structures 3250 may be stored on an external storage device (not shown) accessible by the processor(s) 3210, in some embodiments. Data structures 3250 may be accessible by processor(s) 3210 when executing program instructions 3225. Other information not described herein may be included in system memory 3220 and may be used to implement the methods described herein and/or other functionality of computer system 3200.

In the example illustrated in FIG. 32, program instructions 3225 may include instructions executable by processor(s) 3210 to receive and act on various user inputs, and to control various components of the system, as described herein. In some embodiments, program instructions 3225 may also include instructions executable to implement a user interface. For example, these instructions may be executable to provide a graphical user interface displayed on a touch screen or other type of monitor, to receive inputs from a coin/bill acceptor/changer, credit/loyalty card reader, RFID reader, video capture device, microphone, and/or proximity sensor, and/or to provide feedback through a display on a touch screen or other type of monitor. In some embodiments, program instructions 3225 may include instructions executable by processor(s) 3210 to control any or all of the process modules, communication mechanisms, and other components of an automated kiosk, including those described herein, and to schedule and effect the production of drinks through the performance of various chemical and electrical processes.

Program instructions 3225 may be provided as a computer program product, or software, that may include a non-transitory, computer-readable storage medium having stored thereon instructions, which may be used to program a computer system (or other electronic devices) to implement the control functions described herein. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As shown in FIG. 32, processor(s) 3210 may be coupled to one or more of the other illustrated components by at least one communications bus, such as interconnect 3230 (e.g., a system bus, LDT, PCI, ISA, or other communication bus type), and a network interface 3240 (e.g., an ATM interface, an Ethernet interface, a Frame Relay interface, or other interface). Processor(s) 3210, the network interface 3240, and the system memory 3220 may be coupled to the interconnect 3230. It should also be noted that one or more components of system 3200 might be located remotely and accessed via a network (e.g., through network interface 3240).

Network interface 3240 may be configured to enable computer system 3200 to communicate with other computers, systems or machines, such as across a network. For example, in some embodiments, computer system 3200 may communicate with a host server or other networked devices over a network in order to allow data to be exchanged between computer system 3200 and these devices. In various embodiments, network interface 3240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol (e.g., LAN, WAN, etc.). Network interface 3240 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 3200 is interconnected may include multi-protocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 3240 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

Computer system 3200 may also include one or more I/O input/output devices, in various embodiments. For example, computer system 3200 may include a touch screen or other type of monitor, a coin/bill acceptor/changer, a credit/loyalty card reader, an RFID reader, an image capture device (e.g. a video camera or still camera), a microphone, a proximity sensor, a receipt printer, a loyalty card dispenser, a speaker, a keyboard, a mouse or other cursor control device, a joystick, or other input/output devices, or such devices may be coupled to computer system 3200 via interconnect 3230 and/or network interface 3240. Such input/output devices may be configured to allow a user to interact with the system to request or invoke various operations, such as dispensing a beverage or loyalty card, adding money to a loyalty card, configuring or modifying user preferences, etc. It will be apparent to those having ordinary skill in the art that computer system 3200 may also include numerous other elements not shown in FIG. 32.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims.

While various techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

What is claimed is:

1. An apparatus, comprising:
an input mechanism that is configured to receive requests to produce brewed beverages;
a controller that is configured to control the performance of a plurality of chemical or mechanical processes, each of which contributes to the production of a brewed beverage or a component thereof; and
a plurality of mechanical components, each of which is configured for use during the performance of at least one of the plurality of chemical or mechanical processes;
wherein in response to receiving a request to produce a specified brewed beverage through the input mechanism, the controller is configured to effect the production of the specified brewed beverage, wherein producing the specified brewed beverage comprises performing one or more of the chemical or mechanical processes, and wherein at least one of the one or more of the plurality of chemical or mechanical processes can be performed while one of the plurality of chemical or mechanical processes is being performed as a contributing process in the production of the specified brewed beverage or another brewed beverage; and
wherein in effecting the production of the specified brewed beverage, the controller is further configured to determine, dependent on an actual or expected demand for brewed beverages, a time at which to perform one of the one or more of the plurality of chemical or mechanical processes, and further wherein in response to determining that the one of the one or more of the plurality of chemical or mechanical processes should be performed at a particular time in the future, the controller is further configured to effect the movement of the specified brewed beverage in a partially completed form to a staging area where the specified brewed beverage is stored until the particular time.

2. The apparatus of claim 1, wherein the request comprises an order that was placed from a remote location, and wherein the request indicates a time at which the specified brewed beverage is expected to be retrieved.

3. The apparatus of claim 1, wherein the request comprises a previously submitted order for multiple instances of the specified brewed beverage, and wherein the order comprises a pre-determined schedule of two or more times at which an instance of the specified brewed beverage is to be retrieved.

4. The apparatus of claim 1, wherein in response to determining that production of the specified brewed beverage is complete, the controller is further configured to send an indication to a customer on whose behalf the beverage was produced that the beverage is ready to be retrieved.

5. The apparatus of claim 1, wherein the request comprises an order that was speculatively placed by the controller on behalf of a customer dependent on an order history for the customer, or an order that was speculatively placed by the controller dependent on a demand history for the apparatus.

6. The apparatus of claim 1,
wherein the apparatus comprises or is communicatively coupled to a data store;
wherein the data store comprises, for each of one or more customers, information indicating one or more of: an order history, one or more drink preferences, one or more location preferences, or one or more delivery time preferences; and
wherein the specified brewed beverage is selected from among beverages identified in the order history of the customer on whose behalf the request is made or in the one or more drink preferences of the customer on whose behalf the request is made.

7. The apparatus of claim 1, wherein determining a time at which to perform one or more of the plurality of chemical or mechanical processes comprises determining a priority of the request with respect to a priority of one or more other requests for brewed beverages that have been received but for which production of the requested brewed beverages have not yet been completed.

8. The apparatus of claim 1, wherein the request indicates a time at which the specified brewed beverage is expected to be retrieved, and wherein determining a time at which to perform one of the one or more of the plurality of chemical or mechanical processes is dependent on the indicated time.

9. The apparatus of claim 1, wherein the controller is configured to determine, dependent on an actual or expected demand for brewed beverages, a time at which to present the specified brewed beverage subsequent to its production, and further wherein determining a time at which to present the specified brewed beverage comprises determining whether a customer on whose behalf the request was made is currently in the vicinity of the apparatus.

10. The apparatus of claim 1, wherein the controller is configured to determine, dependent on an actual or expected demand for brewed beverages, a time at which to present the specified brewed beverage subsequent to its production, and further wherein determining a time at which to present the specified brewed beverage comprises:
storing the specified brewed beverage in a staging area; and
in response to receiving an indication that a customer on whose behalf the request was made is ready to retrieve the specified brewed beverage, determining that the specified brewed beverage should be presented.

11. The apparatus of claim 10, wherein the staging area within which the specified brewed beverage is stored has a temperature within a pre-determined range of temperatures that encompasses a temperature at which the specified brewed beverage should be held until it is presented.

12. The apparatus of claim 1, wherein the controller is further configured to effect discarding the specified brewed beverage in response to determining that the specified brewed beverage has not been retrieved within a pre-determined time period following its production or in response to determining that the temperature of the specified brewed beverage is no longer within an acceptable range of temperatures for presentation of the specified brewed beverage.

13. The apparatus of claim 1, wherein the controller is further configured to communicate a status of the production of the specified brewed beverage or an expected completion time for production of the specified brewed beverage to a customer on whose behalf the beverage is being produced prior to production of the specified brewed beverage being completed.

14. The apparatus of claim 1, wherein the controller is further configured to determine a time at which to perform a clean-in-place process for one or more of the mechanical components.

15. A method, comprising:
performing by a computer:
receiving a request to produce a specified brewed beverage;
effecting the production of the specified brewed beverage by a beverage generation apparatus;
wherein producing the specified beverage comprises performing one or more chemical or mechanical processes, and wherein at least one of the one or more chemical or mechanical processes can be performed while one of the chemical or mechanical processes is being performed as a contributing process in the production of the specified brewed beverage or another brewed beverage; and
effecting the presentation of the specified brewed beverage by the beverage generation apparatus subsequent to completion of the production of the specified brewed beverage;
wherein effecting the production of the specified brewed beverage comprises determining, dependent on an actual or expected demand for brewed beverage, a time at which to perform one of the one or more chemical or mechanical processes and further wherein in response to determining that the one of the one or more chemical or mechanical processes should be performed at a particular time in the future, the effecting production of the specified brewed beverage further comprises moving the specified brewed beverage in a partially completed form to a staging area and storing the specified brewed beverage therein until the particular time.

16. The method of claim 15, wherein determining a time at which to perform one or more chemical or mechanical processes is dependent on a priority of the request with respect to a priority of one or more other requests for brewed beverages that have been received but for which production of the requested brewed beverages have not yet been completed or is dependent on an indication of a target time for retrieval of the specified brewed beverage.

17. The method of claim 15, wherein effecting the production of the specified brewed beverage further comprises determining, dependent on an actual or expected demand, a time at which to present the specified brewed beverage subsequent to its production, and further wherein determining a time at which to present the specified brewed beverage comprises determining whether a customer on whose behalf the request was made is currently in the vicinity of the beverage generation apparatus.

18. A non-transitory, computer-readable storage medium storing program instructions that when executed on one or more computers cause the one or more computers to perform:
receiving a request to produce a specified brewed beverage;
effecting the production of the specified brewed beverage by a beverage generation apparatus, wherein producing the specified beverage comprises performing one or more chemical or mechanical processes, and wherein at least one of the one or more chemical or mechanical processes can be performed while one of the chemical or mechanical processes is being performed as a contributing process in the production of the specified brewed beverage or another brewed beverage; and
effecting the presentation of the specified brewed beverage by the beverage generation apparatus subsequent to completion of the production of the specified brewed beverage;
wherein effecting the production of the specified brewed beverage comprises determining, dependent on an actual or expected demand for brewed beverages, a time at which to perform one of the one or more chemical or mechanical processes, and further wherein in response to determining that the one of the one or more chemical or mechanical processes should be performed at a particular time in the future, the effecting production of the specified brewed beverage further comprises moving the specified brewed beverage in a partially completed form to a staging area and storing the specified brewed beverage therein until the particular time.

19. The storage medium of claim 18, wherein effecting the production of the specified brewed beverage further comprises determining, dependent on an actual or expected demand, a time at which to present the specified brewed beverage subsequent to its production, and further wherein determining a time at which to perform one of the one or more chemical or mechanical processes is dependent on one or more of:
a priority of the request with respect to a priority of the one or more other requests for brewed beverages that have been received but for which production of the request brewed beverages that have been received but for which production of the requested brewed beverages have not yet been completed;
an indication of a target time for retrieval of the specified brewed beverage; or
a determination that resources are not available to perform the one of the one or more of the plurality of chemical or mechanical processes.

* * * * *